(12) United States Patent
Kusters et al.

(10) Patent No.: US 11,941,278 B2
(45) Date of Patent: *Mar. 26, 2024

(54) DATA STORAGE SYSTEM WITH METADATA CHECK-POINTING

(71) Applicant: Amazon Technologies, Inc., Seattle, WA (US)

(72) Inventors: Norbert Paul Kusters, Seattle, WA (US); Jianhua Fan, Issaquah, WA (US); Shuvabrata Ganguly, Kirkland, WA (US); Danny Wei, Seattle, WA (US); Avram Israel Blaszka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/520,537

(22) Filed: Nov. 5, 2021

(65) Prior Publication Data
US 2022/0057951 A1    Feb. 24, 2022

Related U.S. Application Data

(63) Continuation of application No. 16/457,008, filed on Jun. 28, 2019, now Pat. No. 11,169,723.

(51) Int. Cl.
*G06F 3/06*     (2006.01)
*G06F 11/16*    (2006.01)
*G06F 11/30*    (2006.01)

(52) U.S. Cl.
CPC .......... *G06F 3/0644* (2013.01); *G06F 3/0617* (2013.01); *G06F 3/0631* (2013.01);
(Continued)

(58) Field of Classification Search
CPC .. G06F 3/0644; G06F 3/0617; G06F 11/1612; G06F 3/0631; G06F 3/067; G06F 11/3034; G06F 3/065
See application file for complete search history.

(56) References Cited

U.S. PATENT DOCUMENTS 6,061,600 A    5/2000  Ying
6,456,599 B1   9/2002  Elliott
(Continued)

FOREIGN PATENT DOCUMENTS

WO    2014039922    3/2014
WO    2016130301    8/2016

OTHER PUBLICATIONS

U.S. Appl. No. 16/457,095, filed Jun. 28, 2019, Norbert P. Kusters et al.
U.S. Appl. No. 16/684,992, filed Nov. 15, 2019, Norbert P. Kusters et al.
U.S. Appl. No. 14/625,535, filed Feb. 18, 2015, Surya Prakash Dhoolam.
U.S. Appl. No. 14/643,479, filed Mar. 10, 2015, Christopher Magee Greenwood.
(Continued)

*Primary Examiner* — Tasnima Matin
(74) *Attorney, Agent, or Firm* — Alexander A. Knapp; Kowert, Hood, Munyon, Rankin & Goetzel, P.C.

(57) ABSTRACT

A data storage system includes multiple head nodes and data storage sleds. Volume data is replicated between a primary and one or more secondary head nodes for a volume partition and is further flushed to a set of mass storage devices of the data storage sleds. Volume metadata is maintained in a primary and one or more secondary head nodes for a volume partition and is updated in response to volume data being flushed to the data storage sleds. Also, the primary and secondary head nodes store check-points of volume metadata to the data storage sleds, wherein in response to a failure of a primary or secondary head node for a volume partition, a replacement secondary head node for (Continued)

the volume partition recreates a secondary replica for the volume partition based, at least in part, on a stored volume metadata checkpoint.

20 Claims, 27 Drawing Sheets

(52) U.S. Cl.
CPC ............ *G06F 3/065* (2013.01); *G06F 3/067* (2013.01); *G06F 11/1612* (2013.01); *G06F 11/3034* (2013.01)

(56) References Cited

U.S. PATENT DOCUMENTS

| | | |
|---|---|---|
| 6,910,214 B1 | 6/2005 | Reed |
| 7,254,682 B1 | 8/2007 | Arbon |
| 7,596,712 B1 | 9/2009 | Gole et al. |
| 7,702,618 B1 | 4/2010 | Patterson |
| 7,734,867 B1 | 6/2010 | Keeton et al. |
| 7,752,180 B1 | 7/2010 | Fair et al. |
| 7,941,621 B1 | 5/2011 | Gipp et al. |
| 8,589,550 B1 | 11/2013 | Faibish et al. |
| 8,612,701 B1 | 12/2013 | Park et al. |
| 8,688,660 B1 | 4/2014 | Sivasubramanian et al. |
| 9,075,773 B1 | 7/2015 | Rakitzis et al. |
| 9,170,891 B1 | 10/2015 | Vincent |
| 9,304,867 B2 | 4/2016 | Sivasubramanian et al. |
| 9,342,457 B2 | 5/2016 | Wei et al. |
| 9,563,385 B1 | 2/2017 | Kowalski et al. |
| 9,619,429 B1 | 4/2017 | Wang et al. |
| 9,690,791 B1 | 6/2017 | Chopra |
| 9,722,976 B1 | 8/2017 | Li et al. |
| 9,733,862 B1 | 8/2017 | Klemm et al. |
| 9,785,510 B1* | 10/2017 | Madhavarapu ..... G06F 11/1471 |
| 9,787,654 B2 | 10/2017 | Vincent et al. |
| 9,985,904 B2 | 5/2018 | Shalev et al. |
| 10,013,324 B2 | 7/2018 | Blea |
| 10,055,352 B2 | 8/2018 | Wei et al. |
| 10,057,187 B1 | 8/2018 | Dhoolam et al. |
| 10,148,570 B2 | 12/2018 | Shalev et al. |
| 10,404,547 B2 | 9/2019 | Bartfai-Walcott |
| 10,484,015 B2 | 11/2019 | Kusters et al. |
| 10,509,601 B2 | 12/2019 | Kusters et al. |
| 10,514,847 B2 | 12/2019 | Kusters et al. |
| 10,521,135 B2 | 12/2019 | Kusters et al. |
| 10,771,550 B2 | 9/2020 | Kusters et al. |
| 11,010,064 B2 | 5/2021 | Kusters et al. |
| 11,169,723 B2 | 11/2021 | Kusters et al. |
| 2001/0044879 A1* | 11/2001 | Moulton ............... G06F 3/0689 709/213 |
| 2002/0108017 A1 | 8/2002 | Kenchammana-Hoskote et al. |
| 2002/0112178 A1 | 8/2002 | Scherr |
| 2004/0111557 A1 | 6/2004 | Nakatani et al. |
| 2004/0127277 A1 | 7/2004 | Walker et al. |
| 2005/0138461 A1 | 6/2005 | Allen et al. |
| 2005/0193244 A1 | 9/2005 | Stager |
| 2006/0155946 A1 | 7/2006 | Ji |
| 2007/0038900 A1 | 2/2007 | Kisel et al. |
| 2007/0106868 A1 | 5/2007 | Moore et al. |
| 2007/0130424 A1 | 6/2007 | Hashimoto et al. |
| 2007/0174660 A1 | 7/2007 | Peddada |
| 2008/0002580 A1 | 1/2008 | Kawada et al. |
| 2008/0059697 A1 | 3/2008 | Sakaki et al. |
| 2008/0072000 A1 | 3/2008 | Osaki et al. |
| 2008/0181382 A1 | 7/2008 | Lean et al. |
| 2009/0034377 A1 | 2/2009 | English et al. |
| 2009/0172816 A1 | 7/2009 | Maino et al. |
| 2009/0217067 A1 | 8/2009 | Radhakrishnan et al. |
| 2009/0254702 A1 | 10/2009 | Kumano et al. |
| 2009/0271412 A1 | 10/2009 | Lacapra |
| 2010/0017647 A1 | 1/2010 | Callaway |
| 2010/0036850 A1* | 2/2010 | Garman ............... G06F 9/5016 707/E17.032 |
| 2010/0074157 A1 | 3/2010 | Doh et al. |
| 2010/0153638 A1 | 6/2010 | Yochai et al. |
| 2010/0180153 A1 | 7/2010 | Jernigan, IV |
| 2010/0198972 A1 | 8/2010 | Umbehocker |
| 2011/0022574 A1 | 1/2011 | Hansen |
| 2011/0078108 A1 | 3/2011 | Kumar |
| 2011/0179231 A1 | 7/2011 | Roush |
| 2011/0289049 A1* | 11/2011 | Zeng ........................ G06F 16/22 707/769 |
| 2012/0030426 A1 | 2/2012 | Satran |
| 2012/0179771 A1 | 7/2012 | Ganti et al. |
| 2013/0067159 A1 | 3/2013 | Mehra |
| 2013/0067187 A1 | 3/2013 | Moss et al. |
| 2013/0115915 A1 | 5/2013 | Tipton et al. |
| 2013/0173955 A1 | 7/2013 | Hallak et al. |
| 2013/0282978 A1 | 10/2013 | Kumar et al. |
| 2013/0311539 A1 | 11/2013 | Ngai et al. |
| 2014/0006543 A1 | 1/2014 | Pitts |
| 2014/0047263 A1* | 2/2014 | Coatney ............... G06F 11/2092 711/119 |
| 2014/0081927 A1 | 3/2014 | Lipcon et al. |
| 2014/0089264 A1 | 3/2014 | Talagala |
| 2014/0092833 A1 | 4/2014 | Vannithamby et al. |
| 2014/0096139 A1 | 4/2014 | Alshinnawi |
| 2014/0108755 A1 | 4/2014 | Lue et al. |
| 2014/0164694 A1 | 6/2014 | Storer |
| 2014/0173185 A1 | 6/2014 | Belluomini et al. |
| 2014/0201483 A1 | 7/2014 | Min |
| 2014/0282993 A1 | 9/2014 | Van Till et al. |
| 2014/0304383 A1 | 10/2014 | Guo et al. |
| 2014/0304469 A1 | 10/2014 | Wu |
| 2015/0026508 A1 | 1/2015 | Jacobs et al. |
| 2015/0036284 A1 | 2/2015 | Ross et al. |
| 2015/0058475 A1 | 2/2015 | Earl et al. |
| 2015/0106549 A1 | 4/2015 | Brown et al. |
| 2015/0113314 A1 | 4/2015 | Bulkowski |
| 2015/0121028 A1 | 4/2015 | Gupta et al. |
| 2015/0127975 A1 | 5/2015 | Patterson et al. |
| 2015/0222705 A1 | 8/2015 | Stephens |
| 2015/0261443 A1 | 9/2015 | Wei et al. |
| 2015/0261674 A1 | 9/2015 | Wei et al. |
| 2015/0277797 A1 | 10/2015 | Lv et al. |
| 2015/0278243 A1 | 10/2015 | Vincent et al. |
| 2015/0301906 A1 | 10/2015 | Crockett |
| 2015/0309892 A1 | 10/2015 | Ramasubramaniam et al. |
| 2015/0313028 A1 | 10/2015 | Bell et al. |
| 2015/0324123 A1 | 11/2015 | Storer et al. |
| 2015/0362983 A1 | 12/2015 | Frick |
| 2015/0378762 A1 | 12/2015 | Saladi et al. |
| 2015/0379009 A1 | 12/2015 | Reddy et al. |
| 2016/0062685 A1 | 3/2016 | Sundararajan et al. |
| 2016/0073544 A1 | 3/2016 | Heyd et al. |
| 2016/0080495 A1* | 3/2016 | Bilas ................... H04L 67/1097 709/224 |
| 2016/0085674 A1 | 3/2016 | Sterns et al. |
| 2016/0092263 A1 | 3/2016 | Gleyzer et al. |
| 2016/0124669 A1 | 5/2016 | Harris et al. |
| 2016/0139823 A1 | 5/2016 | Costea |
| 2016/0162787 A1 | 6/2016 | Kumaran et al. |
| 2016/0182305 A1 | 6/2016 | Martin et al. |
| 2016/0182399 A1 | 6/2016 | Zadka et al. |
| 2016/0188691 A1 | 6/2016 | Horowitz |
| 2016/0217823 A1 | 7/2016 | Arslan et al. |
| 2016/0239384 A1 | 8/2016 | Slik et al. |
| 2016/0246677 A1 | 8/2016 | Sangamkar et al. |
| 2016/0246719 A1 | 8/2016 | Teletia et al. |
| 2016/0259693 A1* | 9/2016 | Sundararaman .... G06F 16/2365 |
| 2016/0278067 A1 | 9/2016 | Badam et al. |
| 2016/0292025 A1 | 10/2016 | Gupta et al. |
| 2016/0320978 A1 | 11/2016 | Barve et al. |
| 2016/0328168 A1 | 11/2016 | Wei et al. |
| 2016/0342349 A1 | 11/2016 | Borlick et al. |
| 2016/0371145 A1 | 12/2016 | Akutsu et al. |
| 2016/0371222 A1 | 12/2016 | Yifrach et al. |
| 2017/0054626 A1 | 2/2017 | Sivabalan et al. |
| 2017/0063397 A1 | 3/2017 | Richardson et al. |
| 2017/0132091 A1* | 5/2017 | Leshinsky ............... G06F 3/067 |
| 2017/0149883 A1 | 5/2017 | Joshi et al. |
| 2017/0161162 A1 | 6/2017 | Blea et al. |

(56) References Cited

U.S. PATENT DOCUMENTS

| | | |
|---|---|---|
| 2017/0177222 A1 | 6/2017 | Singh et al. |
| 2017/0223717 A1 | 8/2017 | Athani |
| 2017/0262191 A1 | 9/2017 | Dewakar et al. |
| 2017/0277590 A1 | 9/2017 | Luse et al. |
| 2017/0344285 A1 | 11/2017 | Choi et al. |
| 2017/0364295 A1 | 12/2017 | Sardinha et al. |
| 2017/0371573 A1 | 12/2017 | Kim et al. |
| 2017/0371580 A1 | 12/2017 | Kowles |
| 2018/0004414 A1 | 1/2018 | Danilov et al. |
| 2018/0011642 A1 | 1/2018 | Koseki et al. |
| 2018/0018235 A1 | 1/2018 | Arslan et al. |
| 2018/0074973 A1 | 3/2018 | Chan et al. |
| 2018/0096066 A1 | 4/2018 | Venkataramanappa et al. |
| 2018/0131633 A1 | 5/2018 | Li |
| 2018/0150256 A1 | 5/2018 | Kumar et al. |
| 2018/0176302 A1 | 6/2018 | Lewis et al. |
| 2018/0183868 A1 | 6/2018 | Kusters et al. |
| 2018/0239677 A1* | 8/2018 | Chen .................. G06F 11/203 |
| 2019/0324666 A1 | 10/2019 | Kusters et al. |
| 2020/0083909 A1 | 3/2020 | Kusters et al. |
| 2020/0117399 A1 | 4/2020 | Kusters et al. |
| 2020/0125271 A1 | 4/2020 | Kusters et al. |
| 2020/0404055 A1 | 12/2020 | Kusters et al. |
| 2021/0263658 A1 | 8/2021 | Kusters et al. |

OTHER PUBLICATIONS

U.S. Appl. No. 14/642,445, filed Mar. 9, 2015, Marc John Brooker.

U.S. Appl. No. 12/749,449, filed Mar. 29, 2010, Tate Andrew Certain.

Salvador Esparza et al "Oracle Exalogic Elastic Cloud Machine Owner's Guide" Apr. 30, 2015, pp. 1-302.

U.S. Appl. No. 15/392,806, filed Dec. 28, 2016, Norbert P. Kusters.

U.S. Appl. No. 15/392,835, filed Dec. 28, 2016, Norbert P. Kusters.

U.S. Appl. No. 15/392,857, filed Dec. 28, 2016, Norbert P. Kusters.

U.S. Appl. No. 15/392,878, filed Dec. 28, 2016, Norbert P. Kusters.

U.S. Appl. No. 15/433,951, filed Feb. 15, 2017, Norbert Paul Kusters.

U.S. Appl. No. 15/433,956, filed Feb. 15, 2017, Norbert Paul Kusters.

U.S. Appl. No. 17/013,430, filed Sep. 4, 2020, Norbert P. Kusters et al.

U.S. Appl. No. 16/8723,391, filed Dec. 20, 2019, Norbert P. Kusters et al.

U.S. Appl. No. 16/714,589, filed Dec. 13, 2019, Norbert P. Kusters et al.

U.S. Appl. No. 17/319,020, filed May 12, 2021, Norbert P. Kusters et al.

* cited by examiner

DATA STORAGE SYSTEM WITH METADATA CHECK-POINTING

This application is a continuation of U.S. patent application Ser. No. 16/457,008, filed Jun. 28, 2019, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability.

Some block-based storage systems utilize a server node and multiple storage nodes that are serviced by the server node or dual server nodes that service multiple storage nodes. For example, a storage area network (SAN) may include such an architecture. However, in such systems, a failure of one or more of the server nodes may result in a large amount of storage capacity served by the server node(s) being rendered unusable or may result in significant decreases in the ability of the storage system to service read and write requests.

In order to increase durability of data, some block-based storage systems may store data across multiple devices in multiple locations. For example, a SAN may span multiple locations such as different facilities or different geographic locations. Such systems may utilize a common control plane to manage data in the multiple locations. However, in such systems, a failure of a component of the common control plane may impact a large quantity of storage capacity and render the large quantity of storage capacity unavailable. Also, such systems may require extensive networks to move data between the multiple locations and may also result in high latencies for data recovery due to data being located across the multiple locations.

BRIEF DESCRIPTION OF THE DRAWINGS

FIG. 1A also illustrates primary and secondary head nodes storing volume metadata check-points to the data storage sleds and the primary head nodes additionally flushing volume data to the data storage sleds, according to some embodiments.

Figure 1A:
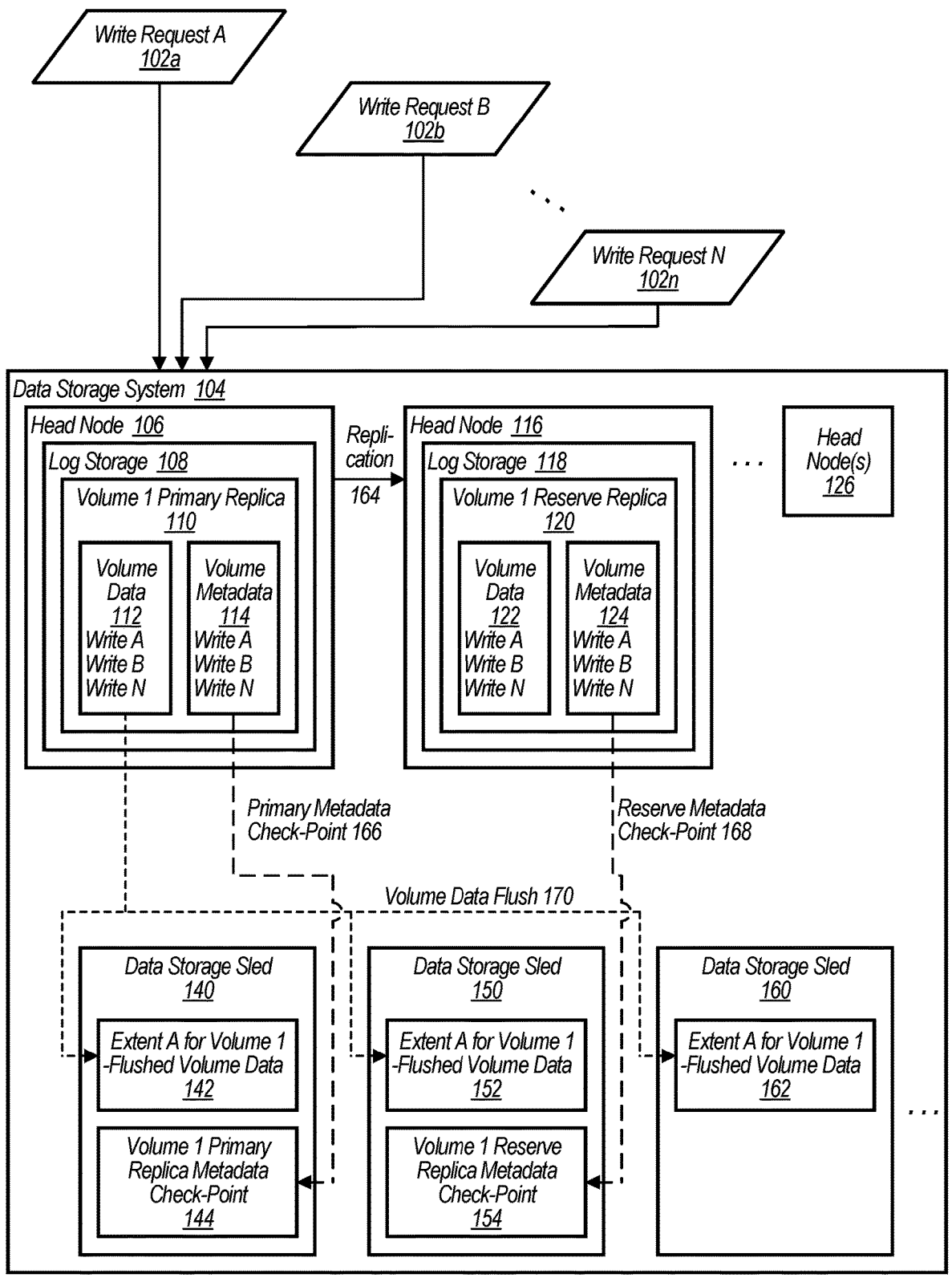
FIG. 1A illustrates a data storage unit comprising head nodes and data storage sleds, wherein head nodes serving as primary head nodes replicate volume data and volume metadata to secondary head nodes of the data storage unit.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In some embodiments, a data storage system includes a rack, a plurality of head nodes mounted in the rack, and a plurality of data storage sleds mounted in the rack. For a partition of a volume to be stored in the data storage system, a particular one of the head nodes is designated as a primary head node for the volume partition and another one of the head nodes is designated as a secondary, or reserve, head node for the volume partition. In response to receiving a write request for the volume partition, the head node designated as the primary head node for the volume partition is configured to write volume data included with the write request to a storage of the head node designated as the primary head node and cause the volume data included with the write request to be replicated to the other head node designated as the secondary head node. Additionally, the primary head node stores volume metadata for the volume partition indicating a current state of the volume partition and previous states. In some embodiments, the volume metadata may include pointers to where volume data is stored, operations records, and checksums for the volume data. In some embodiments, the volume metadata may be formatted in other ways.

In some embodiments, the head node designated as the primary head node for the volume partition is further configured to cause respective parts of the volume data stored in the storage of the head node to be stored in a plurality of respective mass storage devices each in different ones of the plurality of data storage sleds of the data storage system. Additionally, the primary head node is configured to update the volume metadata for the volume partition stored by the primary head node to indicate the new storage locations for the volume data. Also, the primary head node is configured to cause the metadata stored for the volume partition by the secondary, or reserve, head node to be updated to indicate the new storage locations for the volume data in the data storage sleds.

For example, a data storage system may store volume data in a storage of a primary head node and replicate the volume data to a storage of a secondary head node. Then, after a certain amount of time has passed, a certain amount of volume data has been written for the volume partition, or in response to another trigger, the head node may cause the volume data stored in the storage of the head node to be stored in multiple mass storage devices of different ones of the data storage sleds of the data storage system.

For example, volume data may be stored in mass storage devices of different data storage sleds of a data storage system in a RAID array and may be erasure encoded across the multiple mass storage devices. Such a system may provide varying latencies for accessing stored volume data and different durabilities of the stored volume data based on whether the volume data is stored in storages of the primary and secondary head nodes or stored in multiple mass storage devices of multiple data storage sleds of the data storage system. For example, volume data stored in a storage of a primary head node may be accessed with lower latencies than volume data stored across multiple data storage sleds of a data storage system. However, volume data stored across multiple data storage sleds of a data storage system may have higher durability than volume data replicated between storages of a primary and secondary head node. Thus, a data storage system may provide low latencies for recently or frequently accessed volume data while providing high durability for long term storage of volume data or for volume data less frequently accessed. In some embodiments, durability of volume data stored and replicated in head nodes may be adjusted by varying a number of head nodes that replicate the data. Also, durability of volume data stored in mass storage devices of data storage sleds of a data storage system may be adjusted by varying a RAID scheme or data encoding procedure used to store the data amongst other techniques to increase data durability.

Furthermore, in some embodiments in order to increase durability of the data storage system, check points of volume metadata may be durably stored to the data storage sleds, for example using a RAID scheme, erasure encoding scheme, as is used to store volume data in the data storage sleds, or using one or more other durable storage schemes. The volume metadata may indicate a current state of a volume partition and operations that have been performed for the volume partition. Additionally, the volume metadata may indicate where volume data referenced by a particular volume state entry or operation entry is stored. For example, volume metadata may indicate storage locations in a head node for yet-to be flushed volume data and may subsequently indicate storage locations in the data storage sleds for volume data that has already been flushed.

In some embodiments, a durability of data stored in head nodes of a data storage unit may be affected by an amount of time a volume partition stored in the data storage unit is in a "solo" state, meaning that data for the volume is stored on a single head node without being stored on a secondary, or reserve, head node (note that at least some data for a volume partition in a "solo" state may have already been flushed to the data storage sleds and is thus durably stored on multiple data storage sleds). As an example, in embodiments wherein data for a volume partition is stored on a primary head node and replicated to a secondary head node, the volume partition may enter a "solo" state if either the primary or secondary head node fails. Additionally, once a new replacement secondary head node has been implemented, the volume partition may exit the "solo" state and thus have greater durability because the data storage system can tolerate a failure of either the primary or replacement secondary head node without losing data for the volume partition.

In some embodiments, an amount of time a volume partition is in a "solo" state may be reduced by more quickly identifying a failure of a head node storing a primary or secondary replica for the volume partition, more quickly initiating a re-mirroring operation to implement a replacement secondary head node, and reducing an amount of time between the initiation of a re-mirroring operation and when a replacement secondary head node is available to receive replicated writes and store data, such as volume metadata, that is stored only on the remaining primary head node.

In some embodiments, a data storage unit may implement a head node failure detection agent that regularly pings each head node of the data storage unit to identify a failed head node. This may reduce failure detection times, by proactively identifying a failed head node storing a replica for a volume partition as opposed to a failed operation for a volume partition causing a failed head node to be identified. For example, in some embodiments, a ping and response may occur every second, half second, tenth of a second, etc. In comparison, for infrequently accessed volume partitions, several minutes, hours, or days may pass between operations directed at the volume partition. Thus a head node failure detection agent may identify that a head node storing a replica for a volume partition has failed more quickly than would occur if failure was identified based on a failed operation directed to the volume partition. In some embodiments, a ping may be a "shallow" ping that verifies there is an active network connection to a head node being pinged. In some embodiments, a deeper ping, such as an intermediate ping, may be used that queries an operating system of a head node being pinged. Also, in some embodiments a "deep" ping may be used wherein the "deep" ping is directed to individual replicas for volume partitions stored on a head node being pinged. In some embodiments, a "shallow" ping may not interact with each replica stored on a head node being pinged and may thus utilize less head node overhead capacity and network capacity than a "deep" ping. For example, a "shallow" ping may not appreciably interfere with a capacity of a head node to service read and write requests, perform replications, or store metadata. In some embodiments, an intermediate ping, such as the deeper ping discussed above, may query a log drive, but not query each replica stored in the log drive individually.

Additionally, in some embodiments, a head node failure detection agent may inform all non-failed head nodes of a data storage unit of a failure of a particular head node of the data storage unit. In response, each of the head nodes may identify volume partitions stored on the respective head node that also have a replica stored on the failed head node. Also, for these volume partitions, the respective head nodes may initiate a fail-over processes, wherein new replacement head nodes are designated and re-mirroring operations are performed to generate replacement reserve replicas for the affected volume partitions. This may also reduce an amount of time between when a failed head node is identified with regard to the volume partition and when a re-mirroring process is initiated to re-mirror data to a replacement head node for the volume partition.

Moreover, as discussed in more detail below, check-pointing of volume metadata stored in a primary head node and check-pointing of volume metadata stored in a secondary, or reserve, head node to data storage sleds of a data storage unit, may further reduce an overall amount of volume metadata that needs to be re-mirrored before a replacement head node can start accepting replicated writes and enable a volume partition to exit a "solo" state.

According to one embodiment, a data storage system includes multiple head nodes and multiple mass storage devices, such as mass storage devices included in respective data storage sleds of a data storage unit. For a volume partition stored in the data storage system, a first head node of the data storage system is configured to store data for a primary replica of the volume partition in a log-structured storage of the first head node, wherein the log-structured storage of the first head node comprises a volume data portion and a metadata portion. The first head node is also configured to store, to one or more of the plurality of mass storage devices, a copy of the metadata portion for the primary replica of the volume partition. A second head node of the data storage system is configured to, for the volume partition, store data for a reserve replica of the volume partition in a log-structured storage of the second head node, wherein the log-structured storage of the second head node comprises a volume data portion and a metadata portion. Additionally, the second head node is configured to store to one or more of the plurality of mass storage devices, a copy of the metadata portion for the reserve replica of the volume partition. In response to a failure of the first head node or a failure of the second head node, a control plane of the data storage system is configured to designate a third head node of the plurality of head nodes to store a replacement reserve replica for the volume partition. In response, the third head node is configured to generate a log-structured storage for the replacement reserve replica based on one or more copies of the metadata portion for the primary replica stored on the one or more mass storage devices or one or more copies of the metadata portion for the reserve replica stored on the one or more mass storage devices.

According to one embodiment, a data storage system includes a head node wherein for a first volume partition stored in the data storage system, the head node is configured to store data in a log-structured storage of the head node for a replica of the first volume partition, wherein the log-structured storage of the head node comprises a volume data portion and a metadata portion and store, to one or more mass storage devices of the data storage system, a copy of the metadata portion for the replica of the first volume partition. Additionally, for another volume partition stored in the data storage system, the head node is configured to, in response to being designated to store a replacement reserve replica of the other volume partition, generate a log-structured storage for the replacement reserve replica based on one or more copies of metadata portions of a primary replica or reserve replica for the other volume partition stored on one or more of the mass storage devices of the data storage system.

According to one embodiment, a method includes, for a first volume partition, storing data in a log-structured storage of a head node for a replica of the first volume partition, wherein the log-structured storage of the head node comprises a volume data portion and a metadata portion and storing, to one or more mass storage devices, a copy of the metadata portion for the replica of the first volume partition. The method also includes in response to failure of a primary replica or a secondary replica of another volume partition, generating a log-structured storage for a replacement secondary replica based on one or more copies of metadata portions of the primary replica or the secondary replica for the other volume partition stored on one or more of the mass storage devices.

Some data storage systems, such as storage area networks (SAN) may allow a server or a pair of servers to access a shared set of storage resources. However, such systems may be susceptible to significant losses in performance due to a server failure. Also, in such systems, data may be durably stored in storage devices of the SAN network, but not durably stored in the servers accessing the SAN network.

In order to provide high durability data storage and low latencies for accessing data, a data storage unit may store data in local storages of head nodes that function as servers for the data storage system, replicate the data to another head node of the data storage unit, and also store the data across multiple mass storage devices in multiple data storage sleds of the data storage unit. Thus, a data storage system that includes a data storage unit may provide low latency input/output operations for data stored in a storage of a head node, while still providing data durability due to the data being replicated to another head node. Furthermore, the data storage system may provide even higher durability for the data once the data is stored in multiple mass storage devices in different data storage sleds of the data storage unit.

In some embodiments, data may be initially stored in a storage of a head node and replicated to a storage of another head node, and may be asynchronously moved to multiple mass storage devices in different data storage sleds that form a RAID array (random array of independent disks) to store the data. In some embodiments, recently stored data or frequently accessed data may remain in a head node storage to allow for low latency access to the data. The data may then be moved to mass storage devices in data storage sleds of a data storage unit of the data storage system after a certain amount of time has elapsed since the data was last accessed or stored. Moving the data to the mass storage devices may increase the durability of the data as compared to being stored in a storage of a primary head node and being replicated to a storage of a secondary, or reserve, head node. For example, data may be collected in a log of a head node and upon an amount of data being stored in the log exceeding a threshold amount, the data may be moved to mass storage devices of data storage sleds of a data storage unit of the data storage system.

In some embodiments, a data storage unit of a data storage system may include multiple head nodes, multiple data storage sleds, and at least two networking devices. The data storage unit may further include connectors for coupling the data storage unit with at least two separate power sources. The data storage unit may also include at least two power distribution systems within the data storage unit to provide redundant power to the head nodes, the data storage sleds, and the networking devices of the data storage unit. Furthermore, the at least two networking devices of the data storage unit may implement at least two redundant networks within the data storage unit that enable communications between the head nodes of the data storage unit and the data storage sleds of the data storage unit. Furthermore, the at least two networking devices of the data storage unit may implement at least two redundant networks within the data storage unit that enable communications between the head nodes of the data storage unit and external clients of the data storage unit. In some embodiments, a data storage unit that includes redundant networks and redundant power may provide high reliability and data durability for data storage and access while storing data locally within devices mounted within a single rack.

In some embodiments, a data storage unit of a data storage system may include multiple head nodes that are assigned network addresses that are routable from devices external to the data storage unit. Thus, external clients may communicate directly with head nodes of a data storage unit without the communications being routed through a control plane of the data storage system that is external to the data storage unit, such as a zonal control plane. Also, a data storage system that includes multiple data storage units may implement a zonal control plane that assigns volumes or volume partitions to particular ones of the data storage units of the data storage system. Also, a zonal control plane may coordinate operations between data storage units, such as rebalancing loads by moving volumes between data storage units. However, a data storage unit may also implement a local control plane configured to manage fail over operations for head nodes and mass storage devices of data storage sleds of the data storage unit. Because head nodes of a data storage unit may communicate directly with client devices and because a local control plane may manage fail over operations within a data storage unit, the data storage unit may operate autonomously without relying on a zonal control plane once a volume has been created on the data storage unit.

In some embodiments, in order to prevent corruption of data stored in mass storage devices of a data storage system, a data control plane may be at least partially implemented on a sled controller of a data storage sled of the data storage system. The data storage sled may include multiple mass storage devices serviced by the sled controller. Also, portions of respective mass storage devices of a particular data storage sled may be reserved for a particular volume serviced by a particular head node functioning as a primary head node for the particular volume. In order to reserve the portions for the particular volume or a volume partition of the particular volume, a sled controller of a data storage sled may provide a token to a head node requesting to reserve the portions. Once the portions are reserved for the particular volume by the head node acting as the primary head node, the head node while acting as a primary head node for the particular volume, may provide the token to the sled controller along with a write request when writing new data to the portions. The sled controller may verify the token and determine the head node is authorized to write to the portions. Also, the sled controller may be configured to prevent writes from head nodes that are not authorized to write to the particular portions of the mass storage devices of the data storage sled that includes the sled controller. The sled controller may refuse to perform a write request based on being presented an invalid token or based on a token not being included with a write request.

In some embodiments, a control plane such as a local control plane or a zonal control plane of a data storage system may issue unique sequence numbers to head nodes of the data storage system to indicate which head node is a primary head node for a particular volume or volume partition. A primary head node may present a sequence number issued from a control plane to respective ones of the sled controllers of respective ones of the data storage sleds to reserve, for a particular volume or volume partition, respective portions of mass storage devices serviced by the respective ones of the respective sled controllers. In response, the sled controllers may issue a token to the primary head node to be included with future write requests directed to the respective portions.

In order to facilitate a failover operation between a primary head node and a secondary head node, a control plane may issue new credentials, e.g. a new sequence number, to a head node assuming a role of primary head node for a volume or volume partition. The newly assigned primary head node may present the credentials, e.g. new sequence number, to respective sled controllers to receive respective tokens that supersede tokens previously issued to a previous head node acting as a primary head node for a particular volume or volume partition that had data stored in portions of mass storage devices service by the sled controller. Thus, during a fail over event, a previous primary head node may be fenced off from portions of mass storage devices to prevent corruption of data stored on the mass storage devices during the failover event.

In some embodiments, storing volume metadata checkpoints to data storage sleds may reduce an amount of data and therefore time required to generate a replacement replica on a head node designated to implement the replacement replica in response to a failure of a primary head node or secondary (e.g. reserve) head node. For example, instead of re-mirroring all metadata from a surviving head node, a head node designated to implement a replacement replica may only be required to re-mirror volume metadata from a surviving head node for operations performed since the most recent check point of volume metadata performed by the surviving head node. Additionally, because the volume metadata checkpoints are stored to data storage sleds, which have independent failure modes from head nodes, volume metadata checkpoints for a failed head node most likely survive the failure of the head node and may be used by a head node implementing a replacement reserve replica to re-create the volume metadata of the failed head node. In some embodiments, a head node designated to implement a replacement reserve replica may be available to receive write requests, such as replicated writes from a primary head node, while simultaneously reading volume metadata from a checkpoint copy stored on a data storage sled. In some embodiments, the head node implementing the replacement reserve replica, when receiving a write request that implicates volume metadata not yet populated into the replacement head node, may read the relevant volume metadata from a volume metadata checkpoint of the data storage sleds.

In some embodiments, the use of volume metadata checkpoints may reduce an amount of time during which a data storage system operates without a secondary head node for a volume partition in response to a failure of a head node implementing a primary or secondary replica for the volume partition. For example, because a head node serving as a replacement reserve head node can simultaneously accept replication writes while continuing to populate itself with volume metadata from volume metadata checkpoints stored to data storage sleds of the data storage system, the head node can quickly serve as a secondary head node such that incoming writes are durably stored to both the primary head node and the replacement secondary, or reserve, head node. Also, previously stored volume data and metadata is durably stored over multiple data storage sleds (for already flushed volume data or already check-pointed volume metadata). Additionally, because the amount of volume metadata not yet check-pointed may be limited and because the amount of volume data stored on a primary head node may be limited, a replacement secondary, or reserve, head node may more quickly re-mirror volume data (that has not yet been flushed) and volume metadata (that has not yet been check-pointed) from a primary head node. For example there would be less volume metadata to re-mirror than would be the case if all volume metadata was stored on the primary head node without volume metadata checkpoints.

Check-Pointing of Volume Metadata

FIG. 1A illustrates a data storage unit comprising head nodes and data storage sleds, wherein head nodes serving as primary head nodes replicate volume data and volume metadata to secondary head nodes of the data storage unit. FIG. 1A also illustrates primary and secondary head nodes storing volume metadata check-points to the data storage sleds and the primary head nodes additionally flushing volume data to the data storage sleds, according to some embodiments.

In some embodiments, a data storage system, such as data storage system 104, includes multiple head nodes, such as head nodes 106, 116, and 126. In some embodiments, a data storage system or data storage unit, may include more head nodes than illustrated in FIG. 1A, for example in some embodiments a data storage system or data storage unit may include twelve head nodes, as an example.

In some embodiments, a data storage system or data storage unit, such as data storage system 104, may further include data storage sleds, such as data storage sleds 140, 150, and 160. In some embodiments, a data storage system or data storage unit may include more data storage sleds than illustrated in FIG. 1A. Additionally, as discussed below, in some embodiments, each data storage sled may include a storage controller and a plurality of mass storage devices. Additionally, in some embodiments the data storage sleds may be organized into shelves that are separately supplied redundant power. Also, as discuss below in more detail, in some embodiments a data storage system or data storage unit, such as data storage system 104, may implement redundant networks between the head nodes and the data storage sleds.

In some embodiments, head nodes of a data storage system or data storage unit may include log-structured storages that include a volume data portion and a volume metadata portion for each volume partition stored in the log-structured storage of the head node. For example, head node 106 includes log storage 108 and log storage 108 stores a primary replica for volume partition 1 (110). The primary replica for volume partition 1 (110) includes a volume data portion 112 and a volume metadata portion 114.

In some embodiments, a head node that acts as a primary head node for a volume partition, such as head node 106, may cause volume data for the volume partition to be replicated to a secondary, or reserve head node, for the volume partition. For example, head node 106 receives write requests 102a, and 102b through 102n. For each write request, head node 106 adds volume data included with the write request to volume data portion 112 of log storage 108 and updates volume metadata portion 114 of log storage 108 to indicate the write operation has been performed and to indicate a current state of the volume partition. For example, the volume metadata for write A may indicate an operation number for write A (e.g. write A was the $10^{th}$ operation performed for the volume partition), the volume metadata may further include a checksum for the volume data associated with the operation (e.g. write A) and a pointer to where the volume data associated with the operation is stored, either on the head node or in the data storage sleds.

In some embodiments, a head node that acts as a secondary, or reserve, head node for a volume partition, such as head node 116, may receive a replicated write 164 from a primary head node. In response, the secondary, or reserve head node, may store volume data associated with the replicated write to a volume data portion of a log-structured storage of the secondary, or reserve, head node. Additionally, the secondary, or reserve, head node may update a volume metadata portion of the log-structured storage of the secondary, or reserve, head node to indicate the replicated write has been performed. For example, head node 116 may receive replicated write 164 from head node 106. Head node 116 may add the replicated write to volume data portion 122 of log storage 118 for volume 1 reserve replica 120. Additionally, head node 116 may add a new operation for the replicated write to volume metadata portion 124. In some embodiments, a primary head node and a secondary head node may maintain independent volume metadata portions for their respective replicas. For example, a pointer to where the volume data is stored on a secondary head node may be different than a pointer to where volume data is stored on a primary head node. However, in some embodiments, operation numbers for a volume partition may follow a common scheme between a primary and secondary, or reserve, head node. For example a $10^{th}$ operation performed for a volume partition may be identified as the $10^{th}$ operation on both the primary head node and the secondary, or reserve, head node. In this way, a replacement head node that takes over for a failed head node, can determine which operations require metadata to be replicated from a surviving head node and which operations are included in check-pointed metadata.

As shown in FIG. 1A volume metadata 114 of head volume 1 primary replica 110 may be stored to a data storage sled or sleds, such as data storage sled 140. For example, primary metadata checkpoint operation 166 may cause metadata stored since a last check point for the primary replica to be stored to volume 1 primary metadata checkpoint copies 144 stored on data storage sled 140. While not shown in FIG. 1A, in some embodiments check pointed metadata may be durably stored on multiple independent data storage sleds, and/or erasure encoded. Also, as a separate independent checkpoint operation, volume metadata 124 of volume 1 reserve replica 120 may be stored to data storage sled 150. For example, reserve metadata checkpoint operation 168 may cause metadata sored since a last check point for the reserve replica to be stored to volume 1 reserve replica metadata checkpoints copies 154.

Additionally, a primary head node for a volume partition, such as head node 106, may periodically flush volume data such that the flushed volume data is stored on an extent spanning multiple data storage sleds of a data storage system. For example, volume data flush operation 170 may cause volume data 112 for primary replica 110 to be erasure encoded into a plurality of striped columns and a plurality of parity columns. In some embodiments, the striped columns and parity columns may each be stored in a different data storage sled of a data storage system. For example, Extent A is implemented on data storage sleds 140, 150, and 160 and includes flushed data volume segments 142, 152, and 162.

Figure 1B:
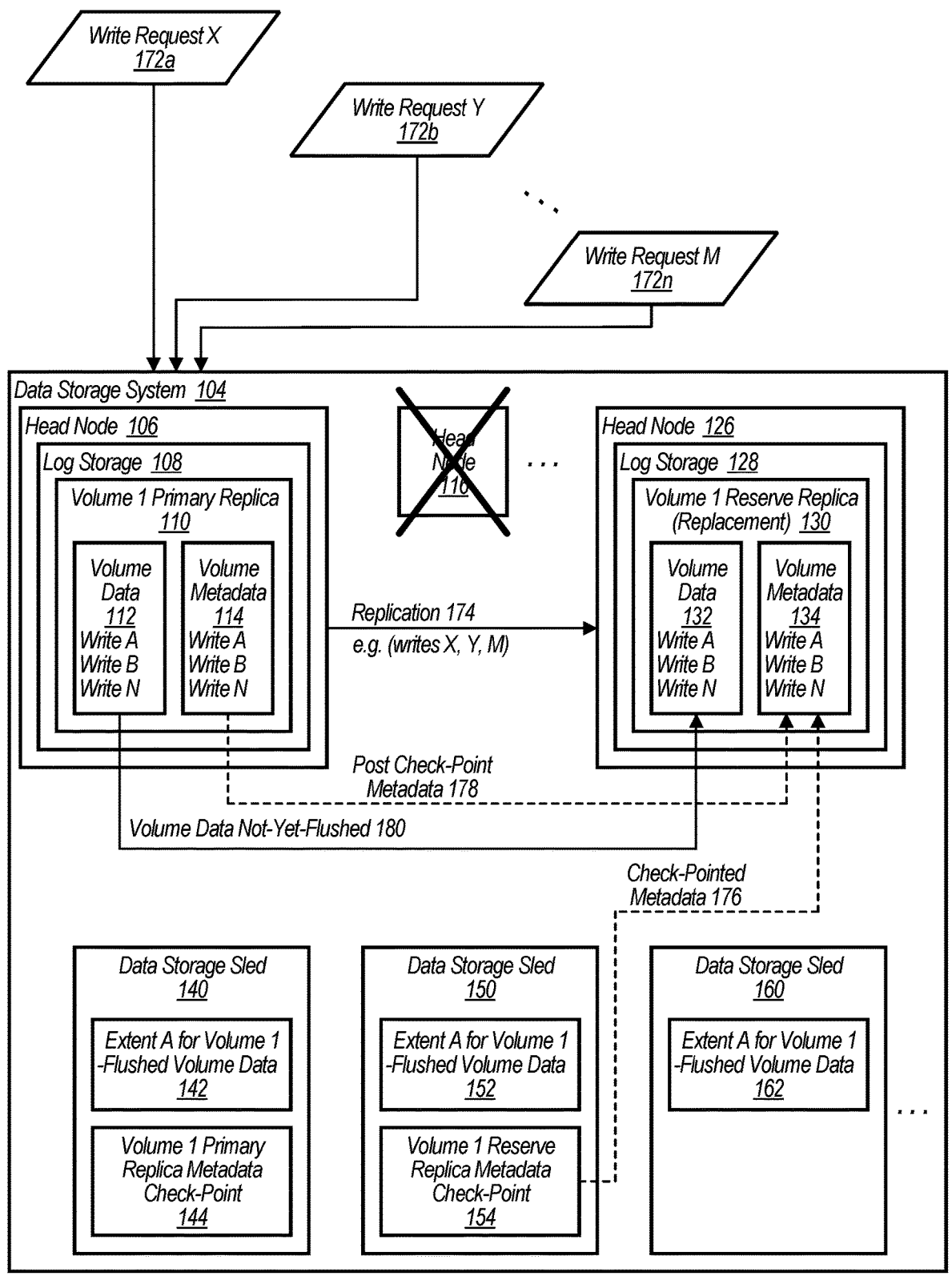
FIG. 1B illustrates a data storage unit performing a re-mirroring operation using one or more volume metadata check-points in response to the failure of one of the head nodes of the data storage unit, according to some embodiments.

FIG. 1B illustrates a data storage unit performing a re-mirroring operation using one or more volume metadata check-points in response to the failure of one of the head nodes of the data storage unit, according to some embodiments.

As shown in FIG. 1B, in response to a failure of a primary or reserve head node for a volume partition, such as secondary head node 116, a control plane of a data storage unit may designate another head node of the data storage unit as a replacement secondary, or reserve, head node for the volume partition. For example, in FIG. 1B head node 116 has failed and head node 126 has been designated as a replacement reserve head node for volume partition 1. Subsequent to being designated as a replacement reserve head node for a volume partition, a replacement reserve replica may be generated on the replacement reserve head node. For example, a primary head node, such as head node 106, may receive an indication from the control plane that head node 126 has been designated as a replacement reserve head node for volume partition 1. The primary head node may further indicate a storage location for a metadata checkpoint of the failed head node for which the replacement reserve head node is a replacement. For example, head node 106 may indicate to head node 126 that volume 1 reserve replica metadata checkpoint copies are stored on data storage sled 150. Note, in some embodiments, a primary head node and a secondary head node may indicate storage locations for metadata checkpoints in replicated write requests and replicated write acknowledgements, or via other means. Thus, a surviving head node can inform a new replacement head node where to find checkpoint metadata for a failed head node. For example, head node 116 may have indicated to head node 106 that volume 1 reserve replica metadata checkpoint copies 154 are stored on data storage sled 150 in a reply to one of replicated writes 164.

Further in example, head node 126 may access (176) volume 1 reserve replica metadata checkpoint 154 to populate volume 1 reserve replica replacement 130. Additionally, head node 126 may re-mirror post check point metadata 178 (e.g. metadata stored since the last checkpoint to volume 1 reserve replica metadata checkpoint 154). As discussed above, since a primary head node and a secondary head node may utilize common operation numbers for operations performed for a volume partition, a replacement head node, such as head node 126, may be able to determine which operations included in volume metadata 114 are not included in volume 1 reserve replica metadata checkpoint 154, and which, if any, are duplicate operations. Additionally, volume 1 reserve replica 130 may be populated with volume data not-yet-flushed 180 by copying volume data from volume data portion 112 of surviving head node 106 to replacement head node 126. In some embodiments, replacement head node 126 may re-play operations included in check pointed metadata 176 or post check point metadata 178 to populate volume data portion 132 with volume data stored in a surviving replica, but not yet flushed to the data storage sleds (e.g. volume data not-yet-flushed 180).

Additionally, check pointed metadata 176 may be transferred to log storage 128 as a batch, instead of being transferred as individual pieces of metadata for individual operations. This may further speed up a re-mirroring process for a replacement reserve replica. Also, a replacement reserve replica may continue to service replicated writes while reading in volume metadata from a checkpoint copy. For example, data storage system 104 may receive write requests 172a and 172b through 172n subsequent to the failure of head node 116. In such a situation, head node 106 may process the writes as described above and send replicated writes 174 to replacement reserve head node 126. The replacement reserve head node may process the replicated writes while continuing to populate volume metadata portion 134 with checkpoint metadata from volume 1 reserve replica metadata check point copies 154. To the extent the replicated writes 174 implicate metadata stored in volume 1 reserve replica metadata checkpoint copies 154, but not yet populated into volume metadata portion 134, the replacement head node 126 may read the volume metadata from data storage sled 150 in order to process the replicated writes 174 while continuing to populate volume metadata portion 134 of volume 1 reserve replica 130.

Example Data Storage Unit Configuration

Figure 2:
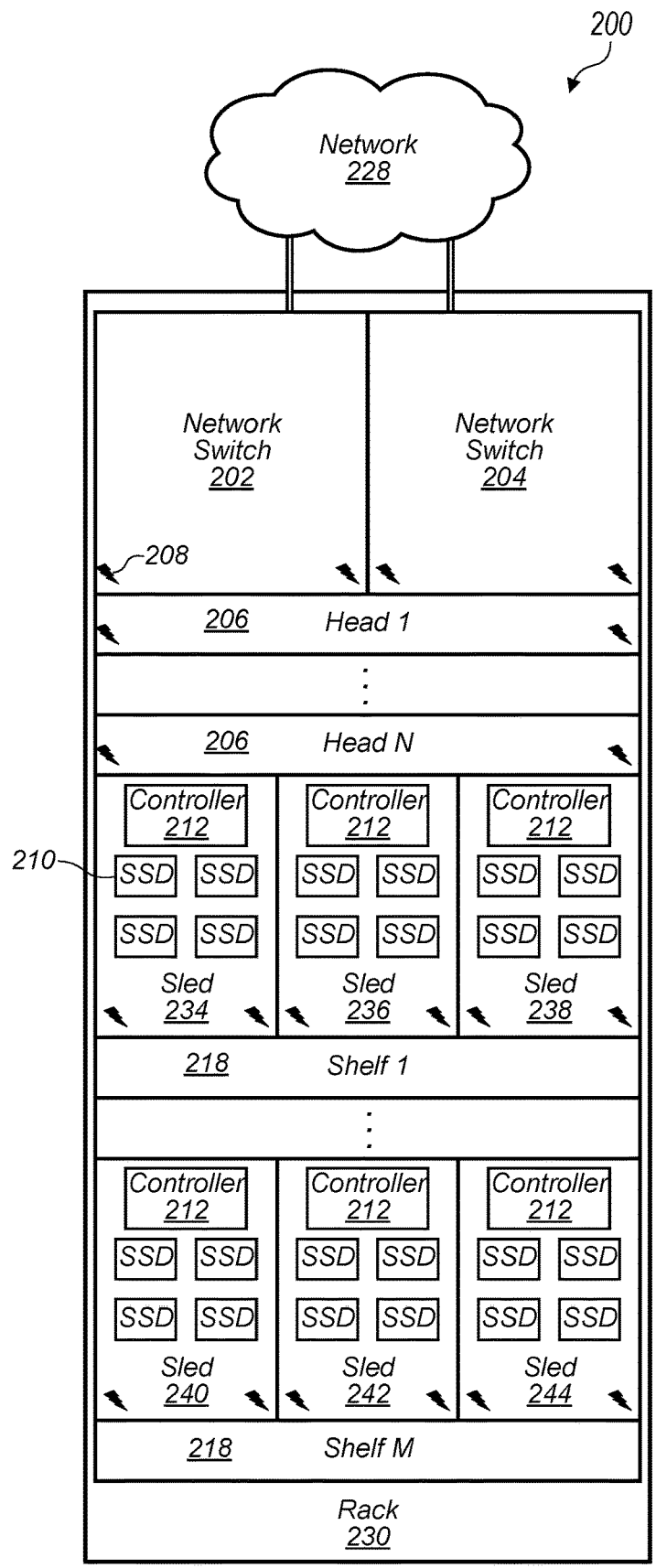
FIG. 2 is a block diagram of a data storage unit comprising head nodes and data storage sleds, according to some embodiments.

FIG. 2 illustrates a data storage unit comprising head nodes and data storage sleds, according to some embodiments. Data storage unit 200, which may be included in a data storage system, such as data storage system 104 described in FIGS. 1A and 1B, includes network switches 202 and 204, head nodes 206 and data storage sleds 234-244 on shelves 218. Each data storage sled 234-244 includes a sled controller 212 and mass storage devices 210. The head nodes 206, data storage sleds 234-244, and network switches 202 and 204 are mounted in rack 230. In some embodiments, networking devices, such as network switches 202 and 204, may be mounted in a position adjacent to and external from a rack of a data storage unit, such as rack 230 of data storage unit 200. A data storage unit may have redundant network connections to a network external to the data storage unit, such as network 228 that is connected to both network switch 202 and network switch 204. In some embodiments, components of a data storage unit, such as network switches 202 and 204, head nodes 206, and data storage sleds 234-244 may be connected to redundant power sources. For example, power connections 208 indicate power connections for network switches 202 and 204, head nodes 206, and data storage sleds 234-244. Note that power connections 208 are illustrated as a power symbol for simplicity of illustration, but may include various types of power connectors and power distribution systems. For example, power connectors of data storage unit components, such as head nodes and data storage sleds, may couple to dual power distribution systems within a data storage unit that receive power from dual power sources. In some embodiments, a data storage unit may include more than two redundant power distribution systems from more than two redundant power sources.

Each head node of a data storage unit, such as each of head nodes 206, may include a local data storage and multiple network interface cards. For example, a head node may include four network ports, wherein two network ports are used for internal communications with data storage sleds of a data storage unit, such as data storage sleds 234-244, and two of the network ports are used for external communications, for example via network 228. In some embodiments, each head node may be assigned two publicly routable network addresses that are routable from client devices in network 228 and may also be assigned two local network addresses that are local to a data storage unit and are routable for communications between the head node and data storage sleds of the data storage unit. Thus, a data storage unit, such as data storage unit 200, may include multiple redundant networks for communications within the data storage unit. In some embodiments, publicly routable network addresses may be used for internal communications between head nodes and data storage sleds and a head node may be assigned four publicly routable network addresses that are routable from client devices in network 228. The data storage unit may also include redundant power distribution throughout the data storage unit. These redundancies may reduce risks of data loss or downtime due to power or network failures. Because power and network failure risks are reduced via redundant power and network systems, volumes may be placed totally or at least partially within a single data storage unit while still meeting customer requirements for reliability and data durability.

Also, one or more head nodes of a data storage unit, such as one or more of head nodes 206, may function as a head node and additionally implement a local control plane for a data storage unit. In some embodiments, a local control plane may be implemented in a logical container separate from other control and storage elements of a head node. A local control plane of a data storage unit may select amongst any of the head nodes, such as any of head nodes 206, of the data storage unit when selecting a head node to designate as a primary head node for a volume or volume partition and may select amongst any of the remaining head nodes of the data storage unit when selecting a head node to designate as a secondary, or reserve, head node for the volume or volume partition. For example a first one of head nodes 206 may be designated as a primary head node for a volume or volume partition and any of the remaining head nodes 206 may be selected as a secondary, or reserve, head node for the volume or volume partition. In some embodiments, a given one of the head nodes 206 may be designated as a primary head node for a given volume or volume partition and may also be designated as a secondary head node for another volume or volume partition.

Additionally, any head node may be assigned or select columns of space on mass storage devices in any of the data storage sleds of a data storage unit for storing data for a particular volume or volume partition, such as flushed volume data or check-pointed volume metadata. For example, any of head nodes 206 may reserve columns of space in mass storage devices 210 in any of data storage sleds 234-244. However, any particular column of space of a mass storage device may only be assigned to a single volume or volume partition at a time.

Because multiple head nodes and multiple data storage sleds are available for selection, a failure of a particular head node or a failure of a mass storage device in a particular data storage sled may not significantly reduce durability of data stored in the data storage unit. This is because, upon failure of a head node, a local control plane may designate another head node of the data storage unit to function as secondary, or reserve, head node for a volume or volume partition. Thus, the volume is only without a secondary head node for a short period of time during which a new secondary head node is being designated and volume metadata data and yet-to-be flushed volume data is being replicated from the primary head node to the secondary head node. Furthermore, when a head node of a data storage unit fails, other head nodes of the data storage unit may still be able to access data in all of the storage sleds of the data storage unit. This is because no single data storage sled is exclusively assigned to any particular head node, but instead columns of space on individual mass storage devices of the data storage sleds are assigned to particular head nodes for particular volumes or volume partitions. This arrangement greatly reduces the blast radius of a head node failure or a disk failure as compared to other storage systems in which each server has a dedicated set of storage devices. Moreover, volume metadata check-pointed to the data storage sleds reduces an amount of volume metadata that is at risk of loss which a volume partition is in a "solo" mode due to a loss of a primary or secondary head node. Additionally, a replacement reserve head node can access the volume metadata stored in the checkpoint copies for the volume partition and more quickly become available to accept replicated write operations, thus reducing the amount of time the volume is vulnerable to data loss by operating with a single "solo" head node.

As discussed in more detail below, in some embodiments, a head node or control plane of a data storage unit may be configured to replicate data stored on mass storage devices that are located in a data storage sled to other mass storage devices in other data storage sleds. Thus, for example, when a data storage sled with a failed mass storage device is removed from a data storage unit for replacement or repair, data from one or more non-failed mass storage devices in a data storage sled may still be available because the data has been replicated to other data storage sleds of the data storage unit. For example, if a single mass storage device 210 in data storage sled 234 failed, data stored in the remaining mass storage devices 210 of data storage sled 234 may be replicated to mass storage devices 210 in any of data storage sleds 236-244. Thus while data storage sled 234 is removed from data storage unit 200 for repair or replacement of the failed mass storage device 210, data previously stored on the non-failed mass storage devices 210 of data storage sled 234 may still be available to head nodes 206.

Also, a data storage unit, such as data storage unit 200, may perform read and write operations independent of a zonal control plane. For example, each of head nodes 206 may be assigned one or more network addresses, such as IP addresses, that are advertised outside of data storage unit 200. Read and write requests may be routed to individual head nodes at the assigned network addresses of the individual head nodes via networking devices of the data storage unit, such as network switches 202 and 204, without the read and write requests being routed through a control plane external to the data storage unit, such as a control plane external to data storage unit 200.

In some embodiments, a data storage sled, such as one of data storage sleds 234-244, may include a sled controller, such as one of sled controllers 212. A sled controller may present the mass storage devices of the data storage sled to the head nodes as storage destination targets. For example head nodes and data storage sleds may be connected over an Ethernet network. In some embodiments, head nodes, such as head nodes 206 may communicate with mass storage devices 210 and vice versa via sled controllers 212 using a Non-volatile Memory Express (NVMe) protocol, or other suitable protocols. In some embodiments, each head node may be assigned multiple private network addresses for communication with data storage sleds over redundant internal Ethernet networks internal to a data storage unit. In some embodiments, a head node at an I/O processing software layer may perform a local disk operation to write or read from a mass storage device of a data storage sled and another software layer of the head node may encapsulate or convert the I/O operation into an Ethernet communication that goes through a networking device of the data storage unit to a sled controller in one of the data storage sleds of the data storage unit. A network interface of a head node may be connected to a slot on a motherboard of the head node, such as a PCIe slot, so that the mass storage devices of the data storage sleds appears to the operating system of the head node as a local drive, such as an NVMe drive. In some embodiments, a head node may run a Linux operating system or other type of operating system. The operating system may load standard drivers, such as NVMe drivers, without having to change the drivers to communicate with the mass storage devices mounted in the data storage sleds.

In some embodiments, a local control plane may be configured to designate more than one head node as a secondary/back-up head node for a volume or a volume partition and also adjust a number of mass storage devices that make up a RAID array for longer term storage of data for the data volume or volume partition. Thus if increased durability is desired for a particular volume or volume partition, the volume data may be replicated on "N" head nodes and subsequently stored across "M" mass storage devices in data storage sleds of the data storage unit, wherein the number "N" and the number "M" may be adjusted to achieve a particular level of durability. In some embodiments, such an arrangement may allow high levels of durability to be realized without having to store data for a data volume outside of a single data storage unit. Also, in such an arrangement, input/output operations may be performed more quickly because data for a particular volume is stored within a single data storage unit.

Also, a given head node may be designated as a primary head node or a secondary head node for multiple volumes. Furthermore, a zonal control plane of a data storage system or a local control plane of a data storage unit may balance volume placement across head nodes of a data storage unit. Because volumes are distributed amongst the head nodes, variations in peak IOPS to average IOPS may be reduced because while one volume may experience peak load other volumes serviced by a particular head node may experience less than peak IOPS load. In some embodiments, a zonal or local control plane may adjust head node designations or volume assignments to balance loads if volumes on a particular head node experience significantly more IOPS than volumes serviced by other head nodes.

While, FIG. 2 illustrates mass storage devices 210 as solid state drives, any suitable storage device may be used. For example, in some embodiments, storage devices 210 may include hard disk drives. Also, FIG. 2 illustrates networking devices 202 and 204 to be networking switches. However, in some embodiments, other suitable networking devices may be used such as routers, etc.

Example Provider Network System Including a Block-Based Storage Service

In some embodiments, a data storage unit, such as data storage unit 200, may be part of a larger provider network system. Also, in some embodiments more than one data storage unit may be included in a block storage service of a provider network. For example, FIG. 3 illustrates such an example provider network, according to some embodiments.

Figure 3:
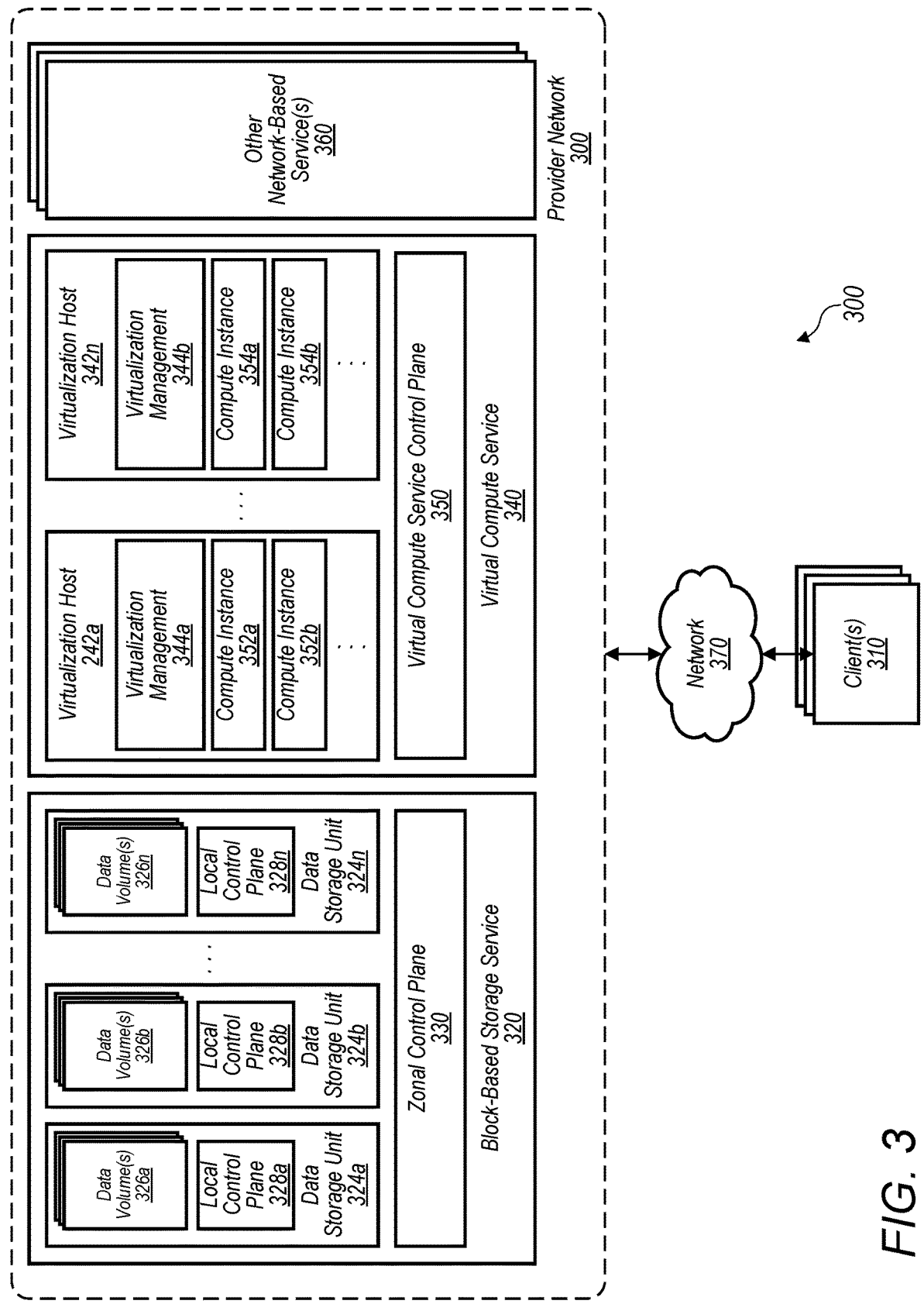
FIG. 3 is a block diagram illustrating a provider network implementing multiple network-based services including a block-based storage service that includes data storage units, according to some embodiments.

FIG. 3 is a block diagram illustrating a provider network that includes multiple network-based services such as a block-based storage service that implements dynamic resource creation to connect with client resources, according to some embodiments. Provider network 300 may be set up by an entity such as a company or a public sector organization to provide one or more services (such as various types of cloud-based computing or storage) accessible via the Internet and/or other networks to clients 310. Provider network 300 may include numerous data centers hosting various resource pools, such as collections of physical and/or virtualized computer servers, storage devices, networking equipment and the like (e.g., computing device 2300 described below with regard to FIG. 23), needed to implement and distribute the infrastructure and services offered by the provider network 300. In some embodiments, provider network 300 may provide computing resources, such as virtual compute service 340, storage services, such as block-based storage service 320, and/or any other type of network-based services 360. Clients 310 may access these various services offered by provider network 300 via network 370. Likewise network-based services may themselves communicate and/or make use of one another to provide different services. For example, computing resources offered to clients 310 in units called "instances," such as virtual or physical compute instances, may make use of particular data volumes 326, providing virtual block-based storage for the compute instances. Also, note that any of the data storage units 324*a*, 324*b*, 324*n* may be data storage units such as data storage unit 200 illustrated in FIG. 2 or may be included in a data storage system, such as data storage system 104 illustrated in FIGS. 1A and 1B.

As noted above, virtual compute service 340 may offer various compute instances, such as compute instances 354*a* and 354*b* to clients 310. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 340 in different embodiments, including special purpose computer servers, storage devices, network devices and the like. In some embodiments instance clients 310 or any other user may be configured (and/or authorized) to direct network traffic to a compute instance. In various embodiments, compute instances may mount, connect, attach or map to one or more data volumes 326 provided by block-based storage service 320 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 310 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 3, a virtualization host, such as virtualization hosts 342*a* and 342*n*, may implement and/or manage multiple compute instances 352*a*, 352*b*, 354*a*, and 354*b* respectively, in some embodiments, and may be one or more computing devices, such as computing device 2300 described below with regard to FIG. 23. Virtualization hosts 342 may also provide multi-tenant hosting of compute instances. For example, in some embodiments, one virtualization host may host a compute instance for one entity (e.g., a particular client or account of virtual computing service 310), while another compute instance hosted at the same virtualization host may be hosted for another entity (e.g., a different account). A virtualization host may include a virtualization management module, such as virtualization management modules 344*a* and 344*b* capable of instantiating and managing a number of different client-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by clients on whose behalf the compute instances run, but may instead be responsible for various administrative or control-plane operations of the provider network, including handling the network traffic directed to or from the compute instances.

Virtual computing service 340 may implement control plane 350 to perform various management operations. For instance, control plane 350 may implement resource management to place compute instances, and manage the access to, capacity of, mappings to, and other control or direction of compute instances offered by provider network. Control plane 350 may also offer and/or implement a flexible set of resource reservation, control and access interfaces for clients 310 via an interface (e.g., API). For example, control plane 350 may provide credentials or permissions to clients 310 such that compute instance control operations/interactions between clients and in-use computing resources may be performed.

In various embodiments, control plane 350 may track the consumption of various computing instances consumed for different virtual computer resources, clients, user accounts, and/or specific instances. In at least some embodiments, control plane 350 may implement various administrative actions to stop, heal, manage, or otherwise respond to various different scenarios in the fleet of virtualization hosts 342 and instances 352, 354. Control plane 350 may also provide access to various metric data for client(s) 310 as well as manage client configured alarms.

In various embodiments, provider network 300 may also implement block-based storage service 320 for performing storage operations. Block-based storage service 320 is a storage system (e.g., such as data storage system 104 illustrated in FIGS. 1A and 1B), composed of one or more computing devices implementing a zonal control plane 330 and a pool of multiple data storage units 324*a*, 324*b* through 324*n* (e.g., data storage units such as data storage unit 200 illustrated in FIG. 2), which provide block level storage for storing one or more sets of data volume(s) 326a, 326b through 326n. Data volumes 326 may be attached, mounted, mapped, or otherwise connected to particular clients (e.g., a virtual compute instance of virtual compute service 340), providing virtual block-based storage (e.g., hard disk storage or other persistent storage) as a contiguous set of logical blocks. In some embodiments, a data volume 326 may be divided up into multiple data chunks or partitions (including one or more data blocks) for performing other block storage operations, such as snapshot operations or replication operations. A volume snapshot of a data volume 326 may be a fixed point-in-time representation of the state of the data volume 326. In some embodiments, volume snapshots may be stored remotely from a data storage unit 324 maintaining a data volume, such as in another storage service 360. Snapshot operations may be performed to send, copy, and/or otherwise preserve the snapshot of a given data volume in another storage location, such as a remote snapshot data store in other storage service 360. In some embodiments, a block-based storage service, such as block-based storage service 320, may store snapshots of data volumes stored in the block-based storage service.

Block-based storage service 320 may implement zonal control plane 330 to assist in the operation of block-based storage service 320. In various embodiments, zonal control plane 330 assists in creating volumes on data storage units 324a, 324b, through 324n and moving volumes between data storage units 324a, 324b, through 324n. In some embodiments, access to data volumes 326 may be provided over an internal network within provider network 300 or externally via network 370, in response to block data transaction instructions.

Zonal control plane 330 may provide a variety of services related to providing block level storage functionality, including the management of user accounts (e.g., creation, deletion, billing, collection of payment, etc.). Zonal control plane 330 may implement capacity management, which may generate and manage a capacity model for storage service 320, and may direct the creation of new volumes on particular data storage units based on the capacity of storage service 320. Zonal control plane 330 may further provide services related to the creation and deletion of data volumes 326 in response to configuration requests.

Clients 310 may encompass any type of client configured to submit requests to provider network 300. For example, a given client 310 may include a suitable version of a web browser, or may include a plug-in module or other type of code module configured to execute as an extension to or within an execution environment provided by a web browser. Alternatively, a client 310 may encompass an application such as a database application (or user interface thereof), a media application, an office application or any other application that may make use of compute instances, a data volume 326, or other network-based service in provider network 300 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 310 may be configured to generate network-based services requests according to a Representational State Transfer (REST)-style network-based services architecture, a document- or message-based network-based services architecture, or another suitable network-based services architecture. In some embodiments, a client 310 (e.g., a computational client) may be configured to provide access to a compute instance or data volume 326 in a manner that is transparent to applications implemented on the client 310 utilizing computational resources provided by the compute instance or block storage provided by the data volume 326.

Clients 310 may convey network-based services requests to provider network 300 via external network 370. In various embodiments, external network 370 may encompass any suitable combination of networking hardware and protocols necessary to establish network-based communications between clients 310 and provider network 300. For example, a network 370 may generally encompass the various telecommunications networks and service providers that collectively implement the Internet. A network 370 may also include private networks such as local area networks (LANs) or wide area networks (WANs) as well as public or private wireless networks. For example, both a given client 310 and provider network 300 may be respectively provisioned within enterprises having their own internal networks. In such an embodiment, a network 370 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and provider network 300. It is noted that in some embodiments, clients 310 may communicate with provider network 200 using a private network rather than the public Internet.

Data Replication Between Head Nodes and Data Storage Sleds

Figure 4:
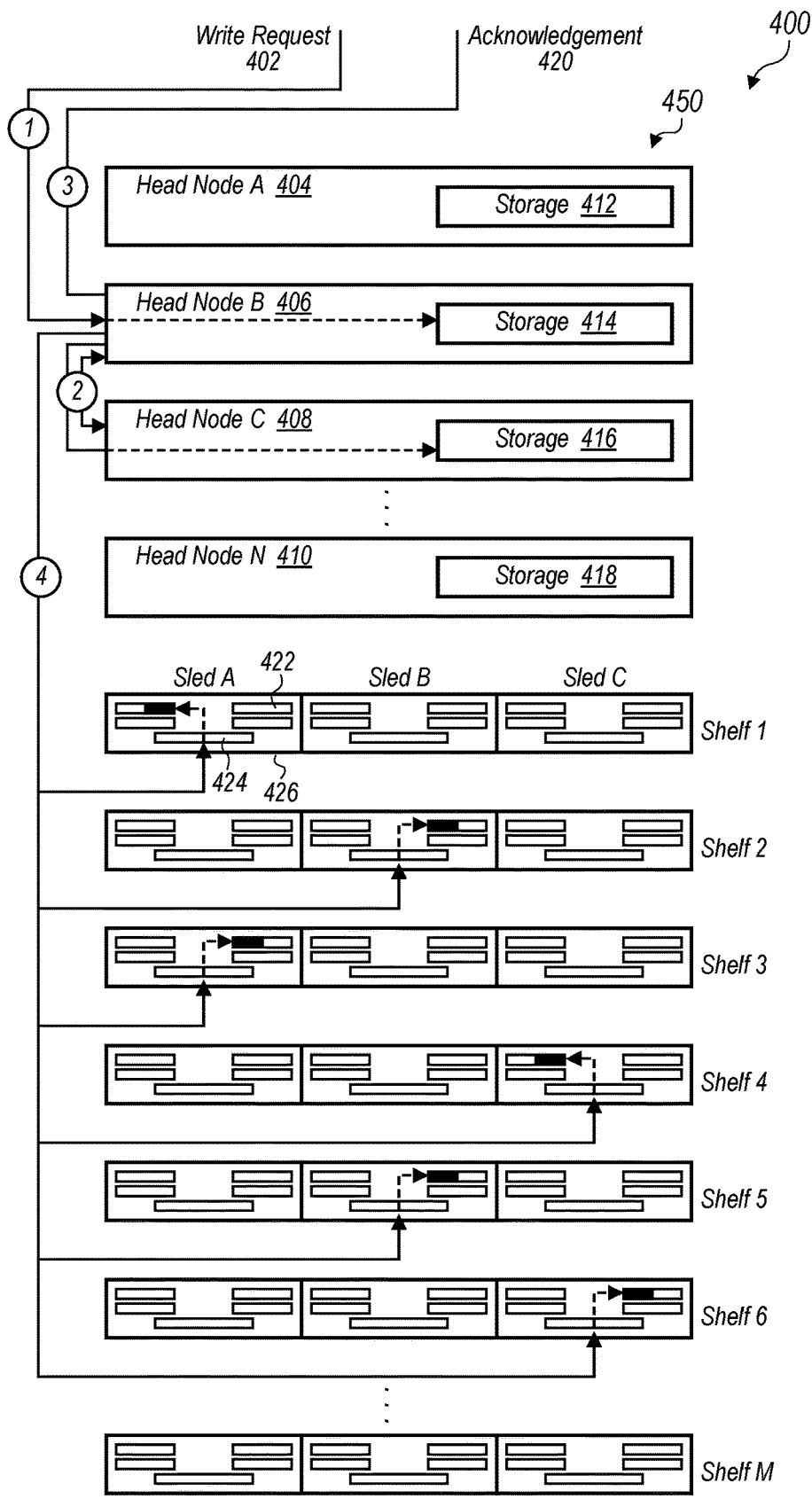
FIG. 4 is a block diagram illustrating head nodes and data storage sleds of a data storage unit storing block storage data in response to a write request, according to some embodiments.

FIG. 4 is a block diagram illustrating head nodes and data storage sleds of a data storage unit storing block storage data in response to a write request, according to some embodiments. Head nodes 406 illustrated in FIG. 4 may be the same as head nodes 106, 116, and 126 illustrated in FIGS. 1A and 1B and head nodes 206 illustrated in FIG. 2. Also, data storage sleds 426 may be the same as data storage sleds 140, 150, and 160 illustrated in FIGS. 1A and 1B and data storage sleds 234-244 illustrated in FIG. 2.

As discussed above, a data storage system that includes a data storage unit, may store volume data in a data storage of a first head node designated as a primary head node for a volume or volume partition and may also replicate the volume data to a second head node designated as a secondary head node for the volume or volume partition. For example, at time 1, a write request 402 is routed to head node 406 that is designated as a primary head node for a volume or volume partition. At time 2 subsequent to the write request being received at head node 406, data included with the write request is stored in storage 414 of primary head node 406 and primary head node 406 causes the data included with the write request to be replicated to storage 416 of secondary head node 408. Replication of the data to secondary head node 406 is performed concurrently or nearly concurrently with storing the data in storage 414 of primary head node 406. Also, as shown in FIG. 4 at time 2, replication of the data to the secondary head node may include the secondary head node sending an acknowledgment back to the primary head node indicating that the data has been replicated to the secondary head node. Subsequently at time 3, which is also nearly concurrent with the data being stored in the storage of the primary head node and the data being replicated to the secondary head node, the primary head node, head node 406, may issue an acknowledgement 420 to the client device that requested write 402 has been committed in data storage system 400.

In some embodiments, a write request, such as write request 402, may be concurrently received at a primary head node and a secondary head node. In such embodiments, the primary head node may verify that the secondary head node has committed the write before acknowledging at time 3 that the write has been committed in the data storage system.

At a later point in time 4, e.g. asynchronous to times 1-3, the primary head node, e.g. head node 306, may cause data stored in storage 414, that includes the data included with the write request and that may include additional data stored before or after the write request, to be flushed to mass storage devices 422 of the data storage sleds 426 of the data storage unit. For example, at time 4 data is flushed to mass storage devices 422 of data storage sleds 426. In some embodiments, data is divided into portions and stored across multiple mass storage devices, each in a different sled and/or on a different shelf of a data storage unit. In some embodiments, data is also erasure encoded when stored in mass storage devices of data storage sleds. For example, data flushed from storage 414 of head node 406 may be divided into six portions where each portion is stored in a different mass storage device of a different data storage sled on a different shelf of a data storage unit 450 of data storage system 400 and is also erasure encoded across the different mass storage devices. For example data portions are stored in sled A of shelf 1, sled B of shelf 2, sled A of shelf 3, sled C of shelf 4, sled B of shelf 5, and sled C of shelf 6.

Additionally, as discussed above in regard to FIGS. 1A and 1B a primary head node, such as head node 406, and a secondary head node, such as head node 408, may cause volume metadata to be check-pointed to the data storage sleds. In some embodiments, a check-point operation may be performed independently of a data flush operation.

Also, as can be seen in FIG. 4, a data storage unit, such as data storage unit 450, may include "M" number of shelves and "N" number of head nodes. The portions of data may be stored on portions of mass storage devices 422 in the respective data storage sleds 426. In order to distinguish between a portion of data and a portion of space on a mass storage device, a portion of space on a mass storage device may be referred to herein as a "column" of a mass storage device. Furthermore, a set of columns of mass storage devices that store different portions of data of a volume such as the columns shown in sled A of shelf 1, sled B of shelf 2, sled A of shelf 3, sled C of shelf 4, sled B of shelf 5, and sled C of shelf 6 may collectively make up what is referred to herein as an "extent." For example, in an erasure encoded RAID six array, an extent may include six columns that collectively make up the RAID array. Four of the columns may store striped data and two of the columns may store parity data. In some embodiments, other replication algorithms other than erasure encoding may be used such as quorum algorithms, etc.

In some embodiments, each column of an extent may be in a different fault domain of a data storage unit. For example, for the extent being stored in FIG. 4 each column is located in a different data storage sled that is mounted on a different shelf of the data storage unit 450. Thus a failure of a sled controller, such as one of sled controllers 424, may only affect a single column. Also if a power supply of a data storage sled fails it may only affect a single data storage sled or if a part of a power distribution system fails it may affect a single shelf. However, because each column of an extent may be located in a different shelf, a shelf level power event may only affect a single column of the extent.

In some embodiments, a head node of a data storage unit, such as one of head nodes 404, 406, 408, or 410, may implement a local control plane. The local control plane may further implement an extent allocation service that allocates extents to head nodes designated as a primary head node for a volume or volume partition. In some embodiments, an extent allocation service may allocate a set of extents to a particular volume referred to herein as a "sandbox." The primary head node for the particular volume may then select extents to store data on during a data flush from the primary head node to data storage sleds of the data storage unit by selecting an extent from the sandbox allocated for the particular volume. In some embodiments, a primary head node and/or a secondary head node may further select extents to store data on as part of a volume metadata check point operation.

In some embodiments, if insufficient space is available in the particular volume's sandbox or if a particular placement would cause a data durability of data to be saved to fall below a minimum required durability for the particular volume, a primary head node or secondary head node for the particular volume may select columns outside of the particular volume's sandbox to write data for the particular volume. For example, a sandbox may include multiple columns that make up multiple extents in different ones of the data storage sleds 426 on different ones of the shelves of a data storage unit 450. A primary head node may be able to flush data to columns within a particular volume's sandbox without having to request extent allocation from a local control plane that implements an extent allocation service. This may further add durability and reliability to a data storage unit because a primary head node for the particular volume may continue to flush data even if communication is lost with a local control plane within the data storage unit. However, if space is not available or a placement would cause durability for a particular volume or volume partition to fall below a minimum threshold, a primary head node may flush data to columns outside of the particular volume's sandbox. In some embodiments, a primary head for a particular volume may flush data to columns outside the primary head node's sandbox without requesting an allocation from a local control plane that implements an extent allocation service. For example, a primary head node may store addresses for each sled controller in a data storage unit and may flush data to any sled controller in the data storage unit that is associated with mass storage devices with available columns. In some embodiments, a primary head node or a secondary head node may utilize a similar allocation process to reserve space on mass storage devices of the data storage sleds of a data storage unit in order to store check point copies of volume metadata to the mass storage devices.

As will be discussed in more detail in regard to FIG. 18, a sled controller of a data storage sled, such as sled controller 424, may implement a fencing protocol that prevents a primary head node from writing to columns for which another primary head node has assumed control after the primary head node has been superseded by another head node assuming the role of primary head node for a particular volume or volume partition. It should be pointed out that a secondary head node or other back-up head nodes may not flush data to data storage sleds and flushing may be limited to only being performed by a primary head node.

Because for a particular volume, the volume's data may be stored in a storage of a primary head node and replicated to a secondary head node and may later be moved to being stored across an extent of mass storage devices in different data storage sleds of a data storage unit, volume metadata comprising an index with pointers to where the data is stored may be used for subsequent read requests and write requests to locate the data. Also in some embodiments, storages of a head node may be log-structured such that incoming write request are written to the head of the log of the head node's log-structured storage. An index entry may be added to volume metadata indicating where the written data is stored in the head node's log and subsequently the index entry in the volume metadata may be updated when the written data is flushed from the log of the primary head node to an extent comprising columns of mass storage devices of the data storage system.

Figure 5A:
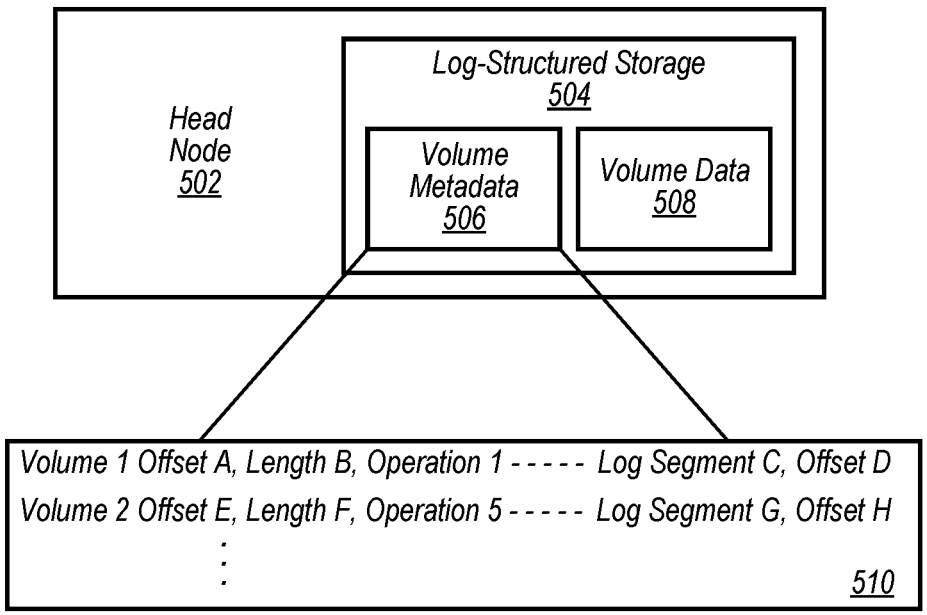
FIGS. 5A-5B are block diagrams illustrating a log-structured storage of a head node comprising a volume metadata portion and a volume data portion, according to some embodiments.
Figure 5B:
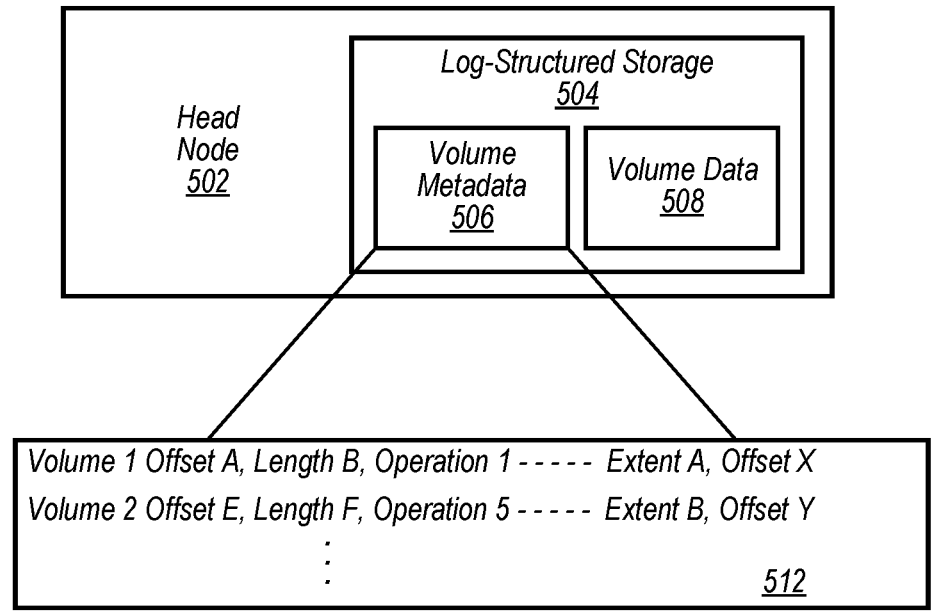

FIGS. 5A-5B are block diagrams illustrating a log-structured storage and an index of a head node storage, according to some embodiments. Head node 502 includes storage 504 that includes volume data portion 508 and volume metadata portion 506. Volume data may be stored in volume data portion 508 prior to being flushed to mass storage devices of a data storage unit. Volume metadata 510 may include an entry for the volume data and a corresponding pointer to where the volume data is stored. For example, volume metadata 510 indicates that data for volume 1, offset A, length B is stored in log-structured storage 504 at log segment C and offset D. In some embodiments, a log of a head node may store data for more than one volume. For example, volume metadata 510 also includes an entry for volume 2 offset E, length F and a corresponding pointer indicating the data for this volume entry is stored in log-structured storage 504 at log segment G, offset H. Additionally, in some embodiments, volume metadata 510 may further include operation numbers for a state-key entry. For example, each entry in volume metadata 510 may correspond to an operation that changed a state of a corresponding volume partition. For example, operation 1 may have been a write to the virtual block volume 1 at Offset A and may have a length B. In response to this write, head node 502 may have stored the volume data for the write at Log Segment C, Offset D of a volume data portion 508 of log-structured storage 504. As another example, operation 5 may have been a write to the virtual block volume 2 at Offset E and have a length F. In response to this other write, head node 502 may have stored the volume data for the other write at Log Segment G, Offset H. As can be seen, in some embodiments, each entry in the volume metadata that changes a state of the volume may include a corresponding operation number (e.g. operation 1 or operation 5).

In some embodiments, volume metadata 506 may further include checksums for volume data referenced in a state-key entry of the volume metadata. In some embodiments, each state-key entry may define a new state-key value for the volume partition. Additionally, in some embodiments, volume metadata, such as volume metadata 506 may include a note key value entry that references a local data ID for the volume data.

While FIGS. 5A-B illustrate volume data portion 508 and volume metadata portion 506 as separate from each other, in some embodiments, volume metadata, such as volume metadata 506, may lay on top of a log or side-by-side with a log, such as a log that stores volume data 508.

When volume data for a volume is moved from a storage of a head node to being stored in an extent across multiple mass storage devices of a data storage unit, the volume data for the volume may be removed from a log-structured storage of a head node storage and an index of the head node storage may be updated to indicate the new location at which the data for the volume is stored. For example, in FIG. 5B, volume metadata 512 indicates that data for volume 1, offset A, length B is now stored at extent A, offset X and data for volume 2, offset E, length F is now stored at extent B, offset Y. Note that the labels "extent A" and "extent B" are used for ease of illustration. In some embodiments, volume metadata may include addresses of data storage sleds where the data for the volume is located, such as local IP addresses of the data storage sleds, and addresses of the columns of the mass storage devices within the data storage sleds. In some embodiments, volume metadata may include another label such as "extent A" where each head node stores information for locating "extent A" or may consult an extent allocation service for locating "extent A." In some embodiments, volume metadata may include addresses of data storage sleds where the data for the volume is located and sled controllers of the data storage sleds may be able to determine the appropriate columns based on volume IDs stored in respective columns allocated to the volume.

When a read request is received by a head node designated as a primary head node for a volume, the head node may consult an index included in volume metadata of a storage of the head node, such as volume metadata 506 of log-structured storage 504, to determine what is the latest version of the volume data for the volume and where the latest version of volume data for the volume is stored. For example a primary head node, such as head node 502, may consult the primary head node's index, such as an index included in volume metadata 506, to determine if the latest version of the volume data for the volume is stored in the head node's log, such as volume data portion 508, or is stored in an extent comprising mass storage devices of the data storage unit.

Figure 6:
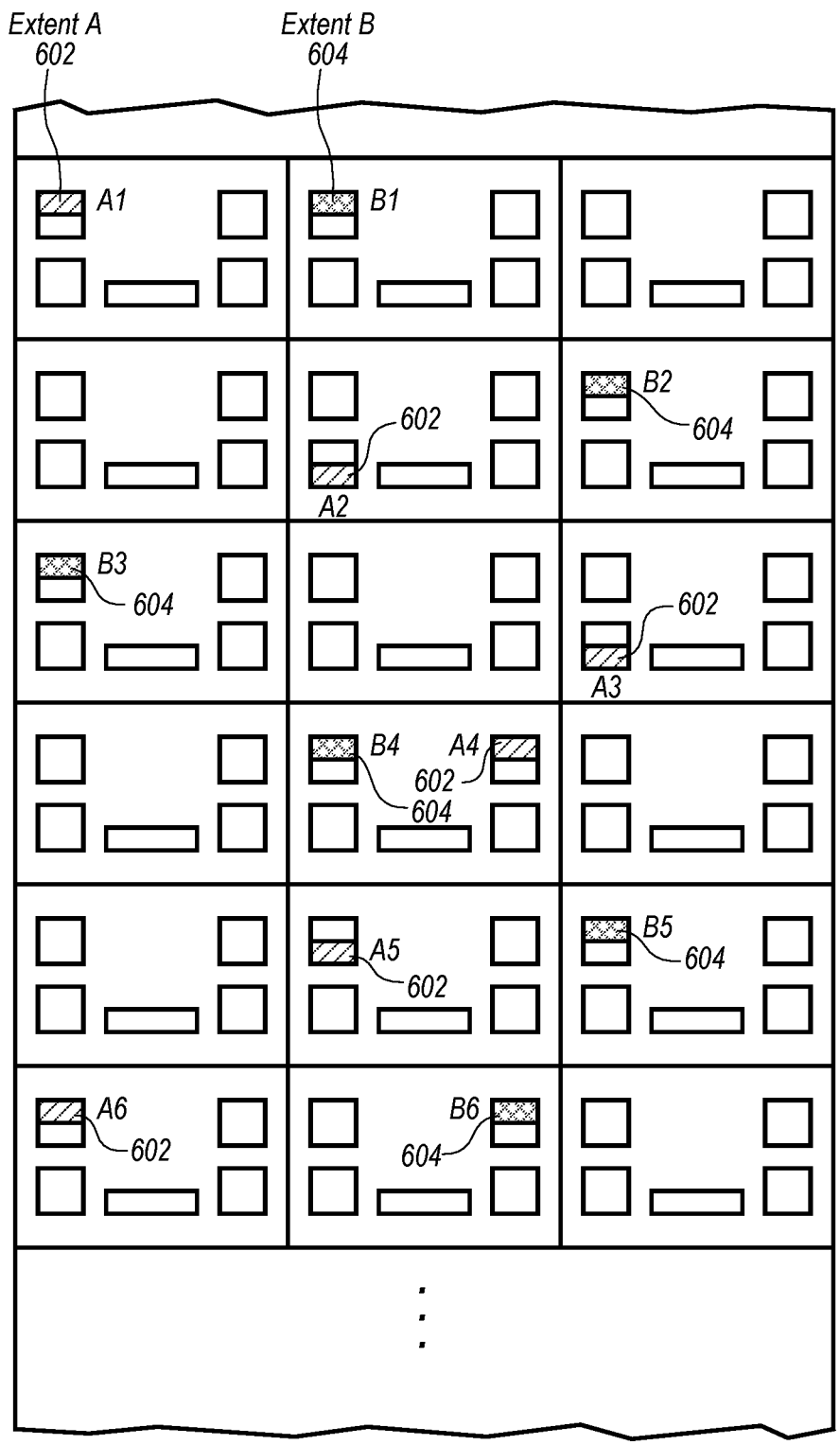
FIG. 6 illustrates a partial view of a data storage unit that stores portions of a volume partition in multiple mass storage devices in multiple data storage sleds on multiple shelves of the data storage unit, according to some embodiments.

FIG. 6 illustrates a partial view of a data storage unit that stores portions of a volume partition in multiple mass storage devices in multiple data storage sleds on multiple shelves of the data storage unit, according to some embodiments. FIG. 6 illustrates an example storage pattern for extent A indicated in volume metadata 512 in FIG. 5B. Extent A indicated in volume metadata 512 illustrated in FIG. 5B is shown as extent A 602 in FIG. 6 Also, an example storage pattern for extent B of volume metadata 512 illustrated in FIG. 5B is shown in FIG. 6 as extent B 604. Note that a data storage sled may include multiple columns of multiple extents. Also, in some embodiments a single mass storage device may include multiple columns of multiple extents.

Figure 7A:
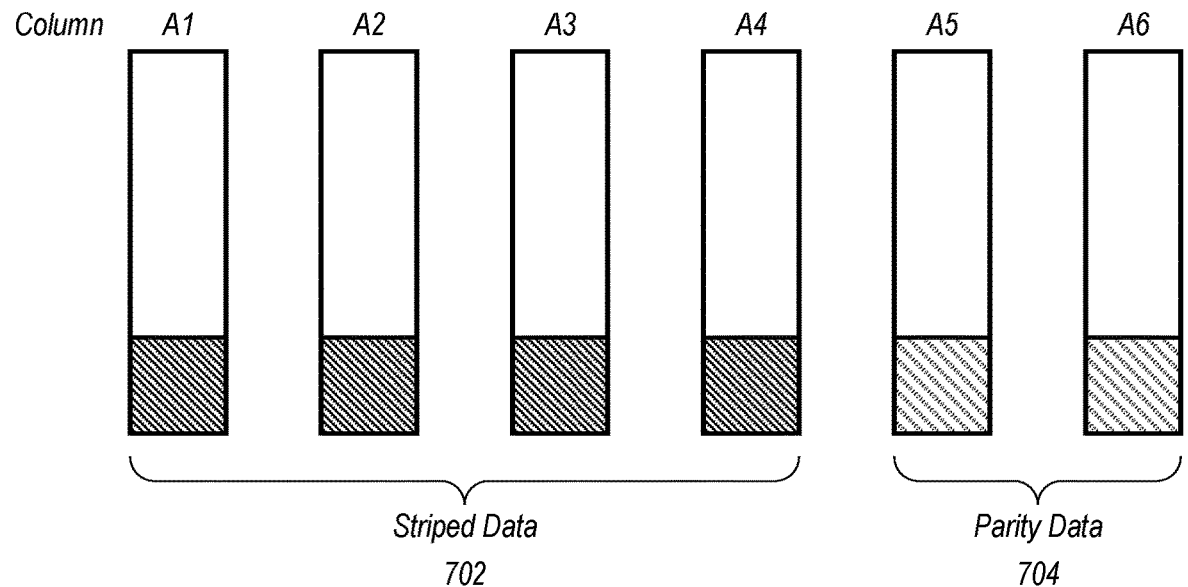
FIGS. 7A-7B illustrate columns of mass storage devices storing different portions of volume data of a volume partition, according to some embodiments.
Figure 7B:
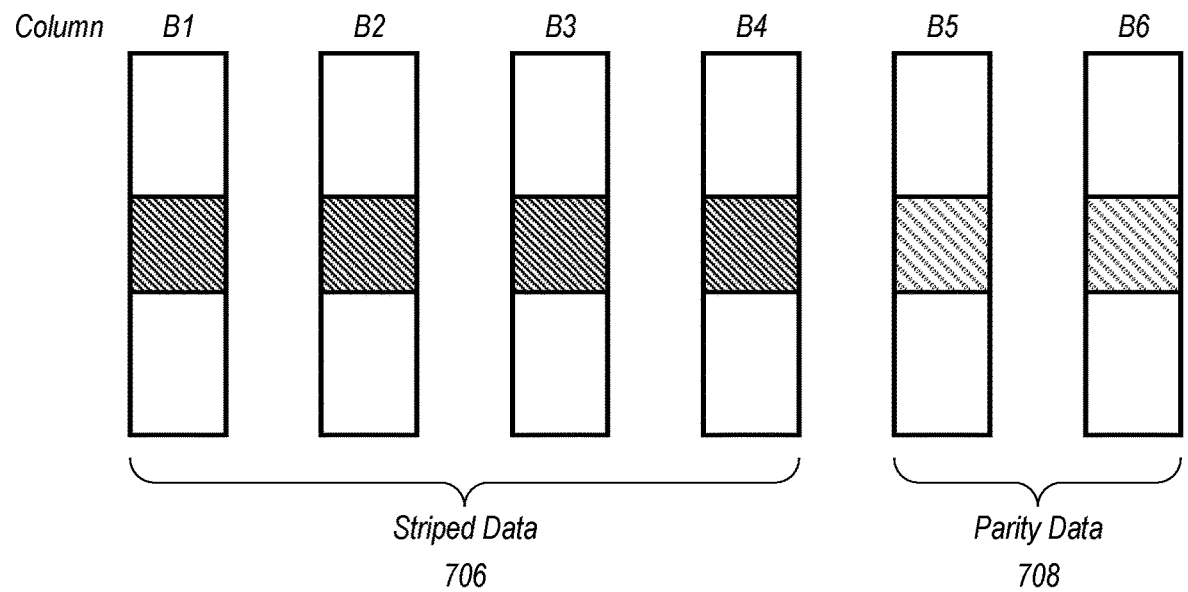

FIGS. 7A-B illustrate columns of mass storage devices storing different portions of a volume partition, according to some embodiments. FIG. 7A illustrates an embodiment in which data flushed to extent A, which may be the same extent A as described in FIGS. 5 and 6, is erasure encoded across 4+2 columns. The striped data 702 may include the original volume data flushed from log-structured storage 504 divided into multiple portions and the parity data 704 may include encoded data that allows the flushed volume data to be recreated in case of failure of one or more of the mass storage devices or sleds that include one of the columns. FIG. 7B illustrates a similar embodiment where extent B is erasure encoded across four striped data columns 706 and two parity columns 708. Note that in FIG. 7B the volume data is stored in a different location in the column than is shown in FIG. 7A. This is intended to illustrate that the columns shown in FIG. 7B may already store volume data previously written to the columns of extent B, whereas the volume data being written to extent A may be the first set of volume data written to extent A. Also, it is worth noting that for a particular volume, multiple extents may be assigned to store volume data of the volume. In some embodiments, an extent may represent a fixed amount of storage space across a set number of columns of mass storage devices. When an extent is filled for a particular volume, another extent may be allocated to the volume by a head node or an extent allocation service. FIGS. 7A and 7B illustrate an example RAID level and erasure encoding technique. However, in some embodiments various other RAID levels may be used and various other data coding techniques may be used to increase durability of stored data. It also worth noting that erasure encoding data may reduce a number of columns needed to achieve a particular level of durability. For example, data stored that is not erasure encoded may require the data to be stored redundantly across 8 columns to achieve a given level of durability, whereas a similar level of durability may be achieved by erasure encoding the data across fewer columns. Thus erasure encoding data may significantly reduce an amount of storage resources that are needed to store data to a particular level of durability. For example, data erasure encoded according to a 4+2 erasure coding scheme may be recreated from any four of the six columns, wherein the six columns include four columns of striped data segments and two columns of parity data segments.

In some embodiments, a data storage system may implement one or more communication protocols between head nodes and data storage sleds of the data storage system that allow for rapid communications between the head nodes and the data storage sleds. Thus, high levels of performance may be provided to clients of a data storage system despite volume data being erasure encoded across multiple columns of mass storage devices in different data storage sleds. In some embodiments, implementation of such protocols may permit data erasure encoded across multiple mass storage devices in multiple different data storage sleds to be read by a head node in a timely manner such that, from a perspective of a client device of the data storage system, performance is comparable to a system that does not erasure encode volume data across multiple mass storage devices or such that performance exceeds a performance of a system that does not erasure encode volume data across multiple mass storage devices.

Failure Detection for Head Nodes

Figure 8:
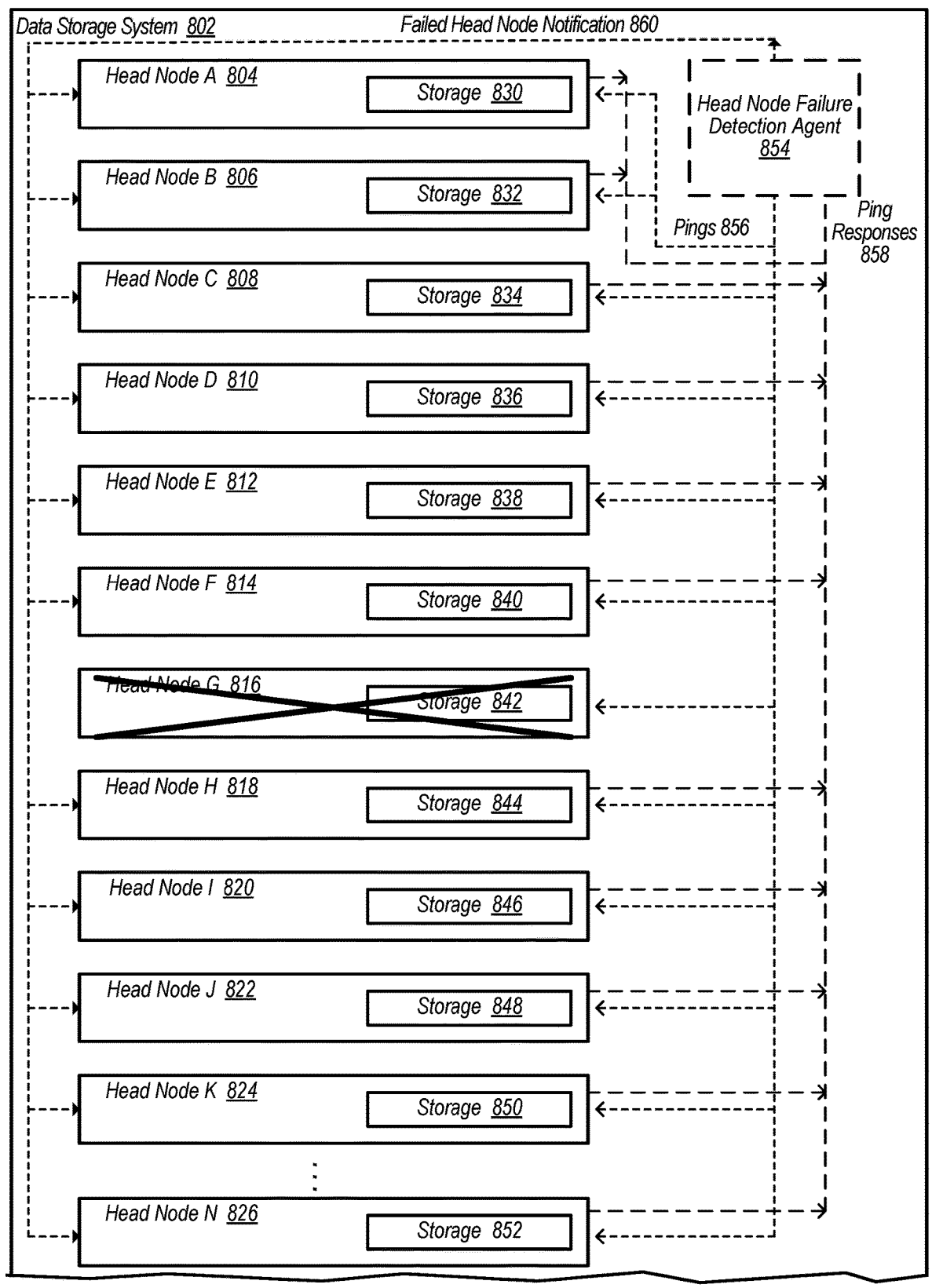
FIG. 8 is a block diagram illustrating head nodes of a data storage unit and a head node failure detection agent of the data storage unit, according to some embodiments.

FIG. 8 is a block diagram illustrating head nodes of a data storage unit and a head node failure detection agent of the data storage unit, according to some embodiments.

Data storage system 802, may be a similar data storage system as data storage system 104 illustrated in FIGS. 1A and 1B and may include one or more data storage units, such as data storage unit 200 illustrated in FIG. 2. Additionally, any of the other data storage systems or data storage units as described herein may include a head node failure detection agent as shown in FIG. 8.

In some embodiments, a local control plane of a data storage unit or data storage system may implement a head node failure detection, such as head node failure detection agent 854. In some embodiments, the local control plane and the head node failure detection agent may be implemented as software modules executing on one or more head nodes of a data storage unit. Also, in some embodiments a separate computer may implement a head node failure detection agent, such as head node failure detection agent 854.

In some embodiments, a head node failure detection agent, such as head node failure detection agent 854, may regularly or periodically issue pings, such as pings 856, to head nodes of a data storage unit, such as head nodes 804, 806, 808, 810, 812, 814, 816, 818, 820, 822, 824, and 826. Each of the head nodes may include a respective log-structured storage such as storages 830, 832, 834, 836, 838, 840, 842, 844, 846, 848, 850, and 852. In some embodiments, a given storage of a given head node may store respective primary replicas for multiple volume partitions stored in data storage system 802 and multiple secondary replicas for volume partitions stored in data storage system 802. In some embodiments, placement of primary replicas and secondary replicas may be restricted such that for each volume partition, the volume partition's primary replica and secondary replica are stored in storages of different head nodes.

In some embodiments, a head node failure detection agent, such as head node failure detection agent 854, may ping the head nodes using a shallow ping, an intermediate ping, or a deep ping. For example, a "shallow" ping may verify that there is an active network connection to a head node being pinged. In some embodiments, an intermediate ping may query an operating system of a head node being pinged and/or query a log drive, without querying each individual replica stored in the log drive. Also, in some embodiments a "deep" ping may be used wherein the "deep" ping is directed to individual replicas for volume partitions stored on a head node being pinged. In some embodiments, a "shallow" ping may not interact with each replica stored on a head node being pinged and may thus utilize less head node overhead capacity and network capacity than a "deep" ping. For example, a "shallow" ping may not appreciably interfere with a capacity of a head node to service read and write requests, perform replications, or store metadata.

In some embodiments, in response to receiving a ping 856, each of the head nodes that is not failed may issue a ping response 858. Thus, a head node failure detection agent, such as head node failure detection agent 854, may quickly identify a failed head node, such as failed head node 816, due to the lack of a ping response from the failed head node. In some embodiments, a ping and ping response may be functionally achieved using other messages that are sent between a local control plane and each head node. For example, FIG. 17 discusses a local control plane collecting performance information from head nodes of a data storage unit. In some embodiments, a request for performance information as discussed in FIG. 17 may function as a ping, and a head node reporting performance information may function as a ping response.

Figure 9:
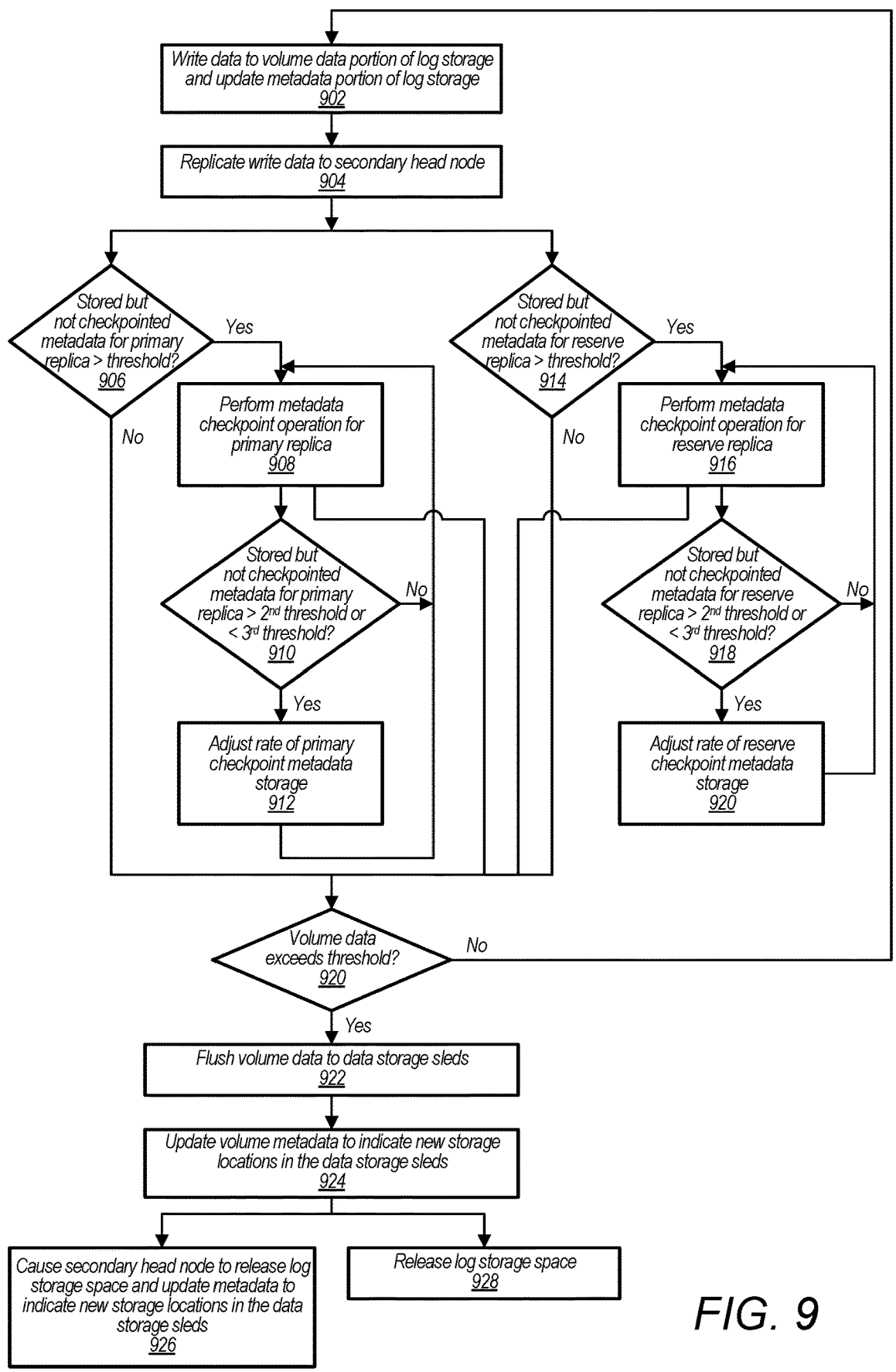
FIG. 9 is a high-level flowchart illustrating operations performed by a head node of a data storage unit, including storing a volume metadata checkpoint, according to some embodiments.

In some embodiments, upon identifying a failed head node, a head node failure detection agent, such as head node failure detection agent 854, may send a failed head node notification 860 to the surviving head nodes (e.g. the head nodes that have not failed), such as head nodes 804, 806, 808, 810, 812, 814, 818, 820, 822, 824, and 826. Additionally, each of the head nodes may identify volume partitions stored by the head node that have primary or secondary replicas stored on the failed head node. For such volume partitions, the surviving head nodes in coordination with a local control plane may initiate re-mirroring to replacement head nodes for the replicas that were stored on the failed head node FIG. 9 is a high-level flowchart illustrating operations performed by a head node of a data storage unit, including storing a volume metadata checkpoint, according to some embodiments.

At 902, upon receiving a write request from a client device, wherein the write request is directed to a particular volume for which the head node is functioning as a primary head node, the head node writes data included with the write request to the log of the head node and updates the index of the head node to include an entry for the volume data and a pointer indicating where the volume data is stored. For example, this may include adding volume data included with the write request to a volume data portion of a log-structured storage and updating a volume metadata portion of the log-structured storage.

At 904, the primary head node causes the volume data included with the write request to be replicated to the secondary head node. The secondary head node then stores the volume data in a log of the secondary head node and updates an index of a storage of the secondary head node to include an entry for the volume data and a pointer indicating where the volume data is stored. This may include adding volume data included with the replicated write request to a volume data portion of a log-structured storage of the secondary head node and updating a volume metadata portion of the log-structured storage of the secondary head node. The secondary head node may then send an acknowledgement to the primary head node indicating that the data has been replicated in the secondary head node's storage. In some embodiments, the primary head node then issues an acknowledgement to the client device indicating that the requested write has been persisted in the data storage system. In some embodiments, replication between head nodes could be primary and secondary e.g. master/slave replication. In some embodiments, other replication techniques such as a Paxos protocol, other consensus protocol, etc. may be used to replicate data between head nodes.

At 906, the primary head node determines if an amount of metadata stored for the volume partition or another volume partition, by the primary head node, but not yet check-pointed to the data storage sleds, exceeds a threshold amount of stored but not yet check-pointed metadata. If not, the primary head node proceeds to 920, which is further discussed below. If the stored but not yet check-pointed metadata exceeds the metadata threshold, at 908, the primary head node performs a metadata checkpoint operation to store the not yet check-pointed metadata to one or more data storage sleds as a primary replica volume metadata checkpoint copy. At 910, the primary head node determines if an amount of stored but not yet check-pointed metadata stored on the primary head node is between a second and third threshold. For example, the primary head node may continue to perform operations, such as write operations, that generate new metadata entries while performing a metadata checkpoint operation. At 912, the primary head node may adjust a rate at which volume metadata is being stored to the data storage sleds as volume metadata checkpoint copies. For example, if the amount of volume metadata currently stored is greater than the second threshold, the primary head node may increase a storage rate to reduce an amount of stored but not yet check pointed metadata stored on the primary head node. Conversely if the amount of stored but not yet check pointed metadata is less than a third threshold, the primary head node may reduce a storage rate to free up system resources, such as IOPS to perform other operations.

In a similar manner, at 914, the secondary head node determines if an amount of metadata stored for the volume partition or another volume partition, by the secondary head node, but not yet check-pointed to the data storage sleds exceeds a threshold amount of stored but not yet check-pointed metadata. If not, the secondary head node proceeds to 920, which is further discussed below. If the stored but not yet check-pointed metadata exceeds the metadata threshold, at 916, the secondary head node performs a metadata check point operation to store the not yet check pointed metadata to one or more data storage sleds as a secondary replica volume metadata checkpoint copy. At 918, the secondary head node determines if an amount of stored but not yet check-pointed metadata stored on the secondary head node is between a second and third threshold. For example, the secondary head node may continue to perform operations, such as replicated write operations, that generate new metadata entries while performing a metadata checkpoint operation. At 920, the secondary head node adjusts a rate at which volume metadata is being stored to the data storage sleds as volume metadata checkpoint copies. For example, if the amount of volume metadata currently stored is greater than the second threshold, the secondary head node may increase a storage rate to reduce an amount of stored but not yet check pointed metadata stored on the secondary head node. Conversely if the amount of stored but not check pointed metadata is less than a third threshold, the secondary head node may reduce a storage rate to free up system resources, such as IOPS to perform other operations.

In some embodiments, a primary head node and a secondary head node may be controlled to store checkpoint metadata copies at different rates for a variety of reasons. For example, the primary head node and the secondary head node, while both storing a replica for the particular volume whose metadata is being check-pointed, may additionally store replicas for other volume partitions. Moreover, a mix of replicas stored for other volume partitions by the primary head node and the secondary head node may be different. Thus, memory capacity used to store volume data and metadata for other replicas of other volume partitions may vary between the primary head node and the secondary head node. This may cause a head node with less memory capacity to be controlled to increase a rate at which checkpoint metadata copies are stored. Additionally, the different mix of replicas stored for other volume partitions by the primary head node and the secondary head node may utilize more or less IO capacity of a given one of the head nodes as compared to the other. This may also affect a rate at which check-point metadata copies are stored. For example, a primary or secondary head node may throttle a rate at which check-point metadata copies are stored in the background to free-up additional I/O capacity, or if memory is limited a head node may throttle client IOs to reduce an amount of metadata stored in the limited memory that has not yet been check-pointed and to increase an amount of IO that can be allocated to store check-point metadata copies, thus increase a rate at which check-point metadata copies are stored.

At 920, the primary head node determines if the volume data stored in the log-structured storage of the primary head node exceeds a threshold that would trigger the volume data or a segment of the primary head node's volume data to be flushed to extents that include columns of mass storage devices of data storage sleds of a data storage unit that includes the head node. In some embodiments, a threshold to trigger data to be flushed may include: an amount of volume data stored in the log or in a segment of the log, an amount of time that has elapsed since the volume data was last accessed or altered, a frequency at which the volume data is accessed or altered, or other suitable thresholds. In some embodiments, volume data flushed from a log of a head node may only include a portion of the volume data written to the log of the head node or a segment of the log of the head node. For example, older volume data stored in a log of a head node may be flushed while more recently written data may remain in the log of the head node. In some embodiments, a frequency of flush operations from a log of a head node may be throttled based on a variety of factors, such as a fill rate of the log of the head node or based on an amount of write requests being received by the head node or being received for a particular volume serviced by the head node.

In response to determining the threshold has not been met, the primary head node continues to write data to the log and reverts to 902.

At 922, in response to determining that the threshold has been met or exceeded, the primary head node causes volume data stored in the log of the primary head node or a segment of the log of the primary head node to be flushed to columns of mass storage devices in different ones of a plurality of data storage sleds of the data storage unit.

At 924, the primary head node updates the volume metadata of the log of the primary head node to include a pointer for the volume data indicating that the flushed volume data is now stored in particular columns of mass storage devices or an extent that includes multiple columns of mass storage devices.

At 926, the primary head node causes the secondary head node to update an index included in volume metadata stored in a log of the secondary head node to indicate the new location of the volume data. The secondary head node also releases the log space in the secondary head node that previously stored the replicated volume data.

At 928, the head node acting as primary head node also releases space in the primary head node's log. In some embodiments, a garbage collection mechanism may cause log space to be released based on inspecting an index of a storage of a head node. In some embodiments, releasing log storage space may be performed concurrently with flushing volume data or may be performed at some time subsequent to flushing volume data.

Figure 10:
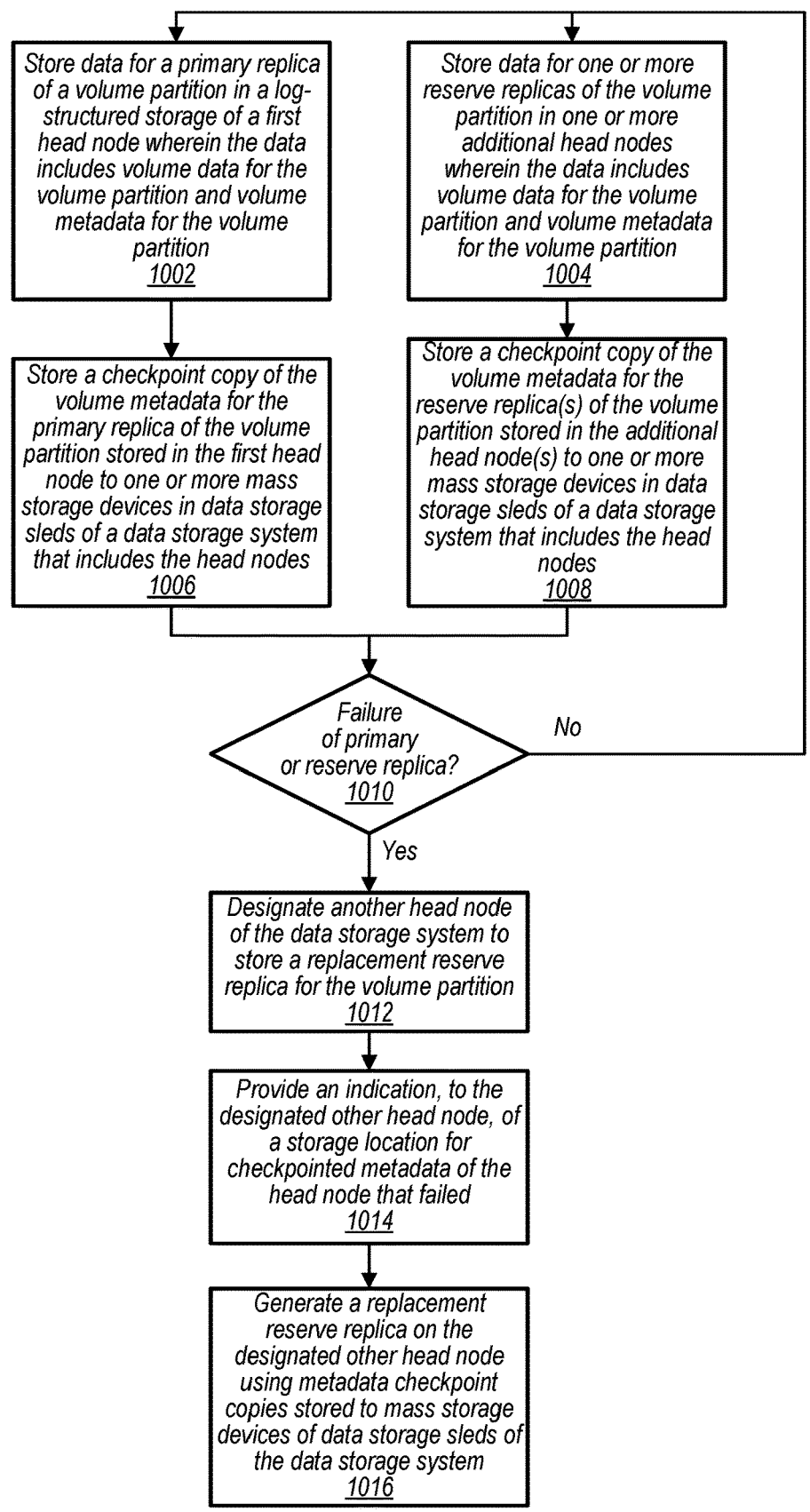
FIG. 10 is a high-level flowchart illustrating operations performed by components a data storage unit to store write data and respond to a failure of a primary or reserve head node of the data storage unit, according to some embodiments.

FIG. 10 is a high-level flowchart illustrating operations performed by components of a data storage unit to store write data and respond to a failure of a primary or reserve head node of the data storage unit, according to some embodiments.

At 1002, a head node of a data storage system stores data for a primary replica of a volume partition in a log-structured storage of the primary head node. The data stored for the primary replica includes both volume data and volume metadata for the volume partition.

At 1004, another head node of the data storage system stores data for a secondary, or reserve, replica of the volume partition. Note that in some embodiments multiple head nodes may each store a respective reserve replica for a volume partition. The data stored for the secondary, or reserve, replica includes both volume data and volume metadata for the volume partition.

At 1006, the head node storing the primary replica stores a check-point copy of the volume metadata for the primary replica to one or more mass storage devices in one or more data storage sleds of the data storage system.

At 1008, the head node storing the secondary, or reserve, replica stores a check-point copy of the volume metadata for the secondary, or reserve, replica to one or more mass storage devices in one or more data storage sleds of the data storage system.

At 1010, it is determined whether there has been a failure of one of the head nodes storing the primary replica or the secondary, or reserve, replica for the volume partition. For example this determination may be made in response to receiving an indication from a head node failure detection agent that a head node of a data storage system has failed. If neither of the head nodes storing the primary or secondary, or reserve, replica for the volume partition has failed, the system continues to store the primary and secondary replicas on the same respective head nodes.

At 1012, in response to determining one of the head nodes storing the primary replica or the secondary replica has failed, a control plane of the data storage system designates another head node of the data storage system to store a replacement reserve replica (or replacement secondary replica) for the volume partition.

At 1014, a surviving head node, either the head node originally storing the primary replica or a head node previously storing the secondary replica that has been promoted to primary, provides an indication to the newly designated replacement reserve replica head node of a storage location for check pointed copies of volume metadata of the head node that failed.

At 1016, the replacement reserve replica head node generates the replacement reserve replica using metadata checkpoint copies stored to the mass storage devices. For example, the replacement reserve replica may copy volume metadata into the replacement reserve replica in batches from the stored volume metadata check points. Additionally, the replacement reserve replica may mirror volume metadata from the surviving head node for operations performed since the most recent volume metadata checkpoint copy. In addition, the replacement reserve replica may mirror volume data from the surviving head node that has not yet been flushed to the data storage sleds.

Figure 11:
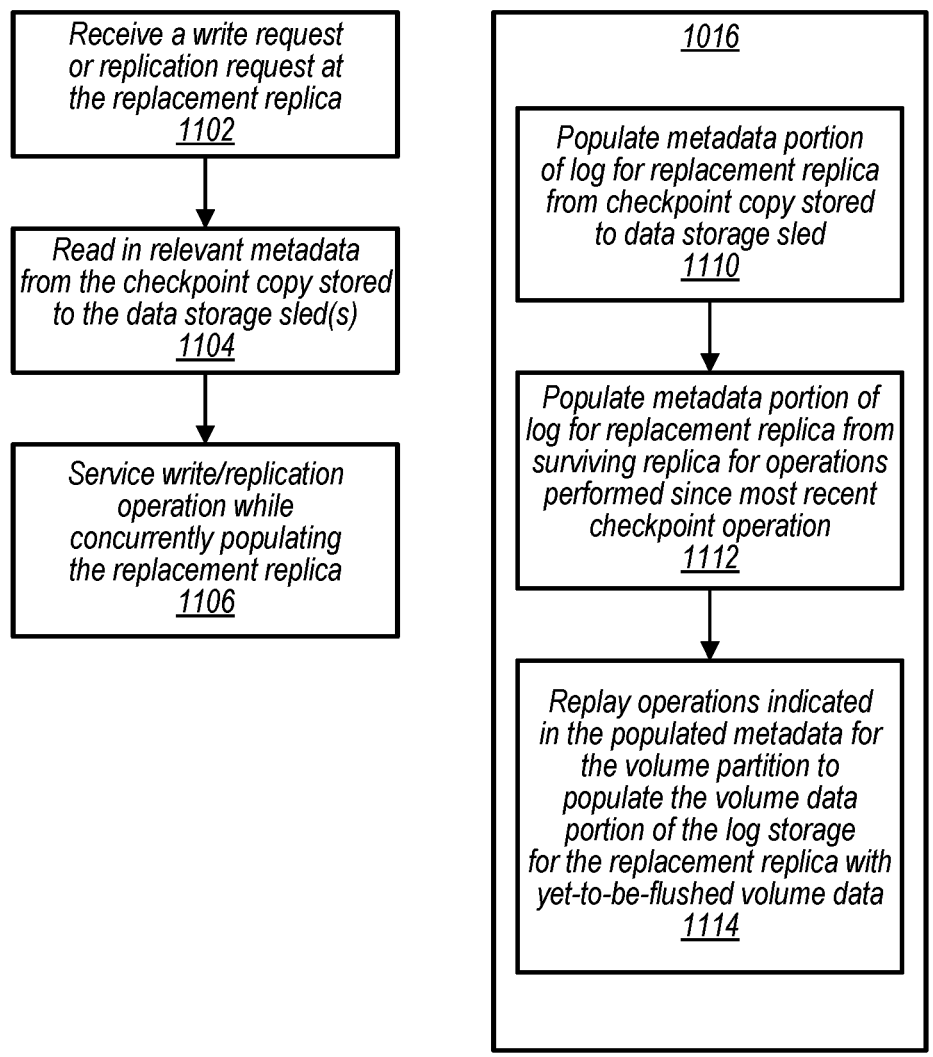
FIG. 11 is a high-level flowchart illustrating a head node designated to implement a replacement reserve replica servicing incoming data replication writes while performing tasks to populate the replacement reserve replica, according to some embodiments.

FIG. 11 is a high-level flowchart illustrating a head node designated to implement a replacement reserve replica servicing incoming data replication writes while performing tasks to populate the replacement reserve replica, according to some embodiments.

At 1102, a replacement secondary head node (e.g. a replacement reserve replica head node) receives a write request or replication request. Concurrently, at 1016 the replacement secondary head node is generating the replacement secondary replica for the volume partition. In some embodiments, generating the replacement secondary, or reserve, replica may include populating a metadata portion of a log for the replacement replica from a checkpoint copy stored to mass storage devices in the data storage sleds (1110), populating the metadata portion of the log for the replacement replica from volume metadata stored in a surviving head node for operations performed since the most recent check point (1112), and replaying the operations indicated in the populated metadata for the volume partition to populate the volume data portion of the log of the replacement replica with yet-to-be flushed volume data stored in the surviving head node (1114).

While 1016 is ongoing, at 1104, the replacement secondary head node may read in relevant metadata from the checkpoint copy or copies in order to perform the write or replicated write operation received at 1102. Also, while 1016 is ongoing, the replacement secondary head node may service at 1106, the write/replication operation while concurrently populating the replacement secondary, or reserve replica. For example, a head node may "demand page" pages of data as needed from the check-pointed metadata copies stored in the data storage sleds to service reads and perform writes and replicated writes.

Figure 12A:
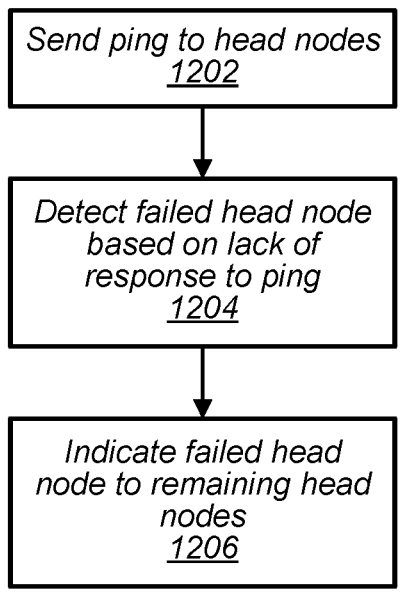
FIG. 12A is a high-level flowchart illustrating a failure detection agent monitoring head nodes of a data storage unit, according to some embodiments.

FIG. 12A is a high-level flowchart illustrating a failure detection agent monitoring head nodes of a data storage unit, according to some embodiments.

At 1202, a head node failure detection agent sends a ping to each head node of a data storage unit or data storage system monitored by the head node failure detection agent.

At 1204, the head node failure detection agent detects a failed head node based on the lack of a response to a ping sent at 1202.

At 1206, the head node failure detection agent indicates the failed head node to the remaining non-failed head nodes of a given data storage unit that includes the failed head node.

Figure 12B:
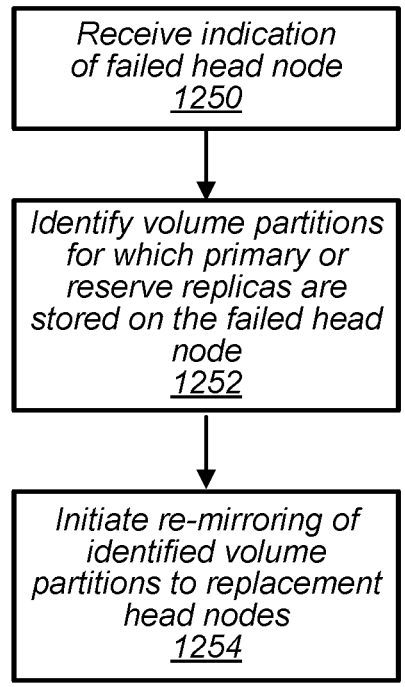
FIG. 12B is a high-level flowchart illustrating a head node of a data storage unit responding to a notification that another head node of the data storage unit has failed, according to some embodiments.

FIG. 12B is a high-level flowchart illustrating a head node of a data storage unit responding to a notification that another head node of the data storage unit has failed, according to some embodiments.

At 1250, each of the non-failed head nodes receives an indication of the failed head node from the head node failure detection agent.

At 1252, each of the respective non-failed head nodes identifies volume partitions for which a primary or secondary replica was stored on the failed head node.

At 1254, in conjunction with a local control plane, the surviving head nodes initiate re-mirroring operations to re-mirror the replicas that were stored on the failed head node to replacement head nodes selected from the surviving head nodes.

Figure 13A:
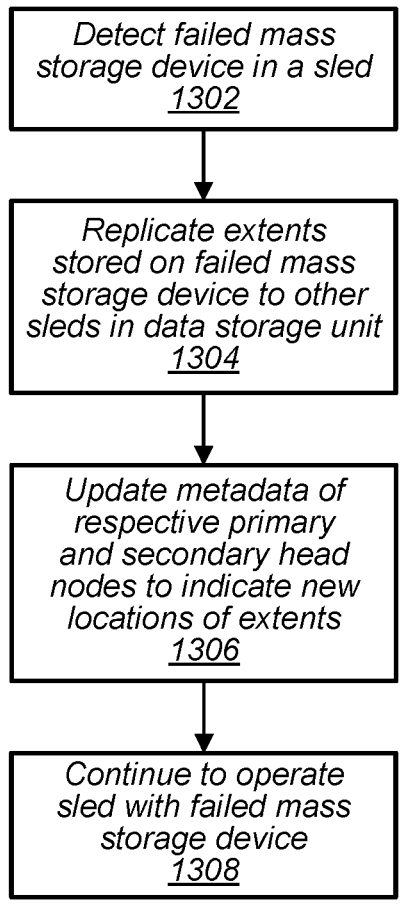
FIG. 13A is a high-level flowchart illustrating operations performed by a head node in response to a failed mass storage device in a data storage sled of a data storage unit, according to some embodiments.

FIG. 13A is a high-level flowchart illustrating operations performed by a head node in response to a failed mass storage device in a data storage sled of a data storage unit, according to some embodiments.

At 1302, a head node or a sled controller detects a failed mass storage device in a particular data storage sled. For example, a data storage sled may include multiple mass storage devices, such as solid state storage drives, and one of the mass storage devices may fail. In some embodiments, a data storage sled may include disk drives and one of the disk drives may fail. In some embodiments, a data storage sled may include other types of mass storage devices.

At 1304, a head node acting as a primary head node for a volume with extents that include one or more columns on the failed mass storage device or a local control plane for the data storage unit causes the extents that include columns on the failed mass storage device to be replicated to other extents that include columns on other mass storage devices in other sleds of the data storage unit. For example, in a 4+2 erasure coding scheme data from any one lost mass storage drive can be recreated based on data stored on the other mass storage devices that make up an extent. Thus, data previously stored on the failed mass storage device can be recreated and replicated to data storage sleds that do not include a failed mass storage device.

At 1306, indexes of a primary head node and a secondary head node that are designated for each volume that included an extent in the failed mass storage device are updated to indicate the new locations of the data for the volumes.

In some embodiments, a data storage system may continue to operate a data storage sled that includes a failed mass storage device, such as the failed mass storage device at 808. In some embodiments, step 1306 may be omitted and all extents stored on mass storage devices in the data storage sled that includes the failed mass storage device may be replicated to other data storage sleds. Because the extents that include columns on the failed mass storage device have been replicated to data storage sleds that do not include failed mass storage devices, the durability of the data previously stored on the failed mass storage device has been recovered to the original level of durability. For example in a RAID configuration of six segments, the number of segments is returned to six by replicating the data from the failed mass storage device to other mass storage devices in the data storage unit.

Figure 13B:
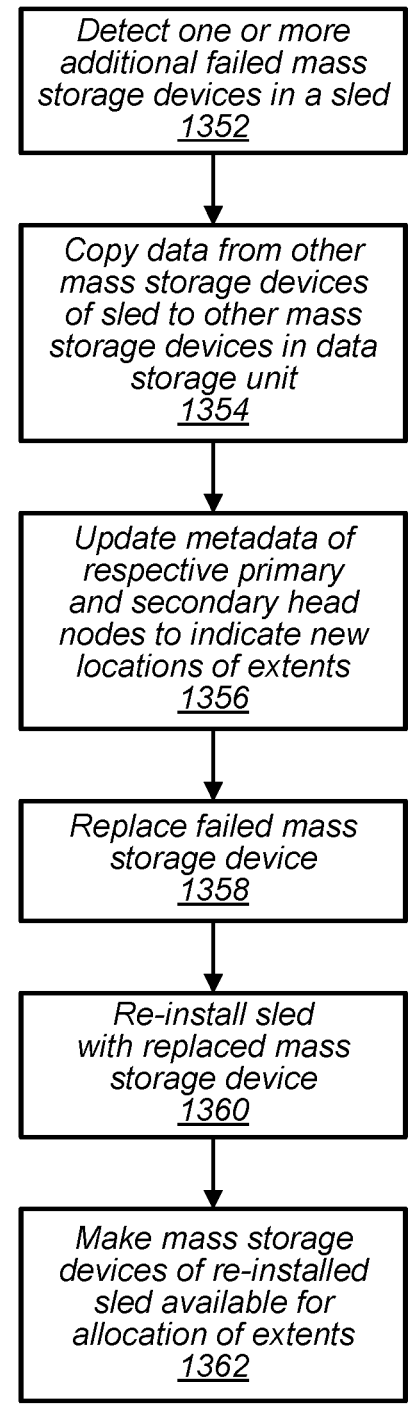
FIG. 13B is a high-level flowchart illustrating operations performed by a head node in response to a failed mass storage device in a data storage sled of a data storage unit, according to some embodiments.

FIG. 13B is a high-level flowchart illustrating operations performed by a head node in response to a failed mass storage device in a data storage sled of a data storage unit, according to some embodiments.

In some embodiments, a data storage system may tolerate one or more failed mass storage devices in a particular sled before the mass storage devices are replaced. For example, at 1352 one or more additional failed mass storage devices are detected in a data storage sled. In some embodiments the additional failed mass storage devices may be in the same data storage sled as the failed mass storage device described in FIG. 13A or may be in a different data storage sled of the data storage unit.

At 1354, data from other non-failed mass storage devices each in a data storage sled that includes a failed mass storage device is copied to other mass storage devices in other data storage sleds of the data storage unit. In some embodiments, only data from non-failed mass storage devices that are included in a data storage sled that is to be repaired may be copied. In some embodiments, copying the data from the non-failed mass storage devices may include recreating the data from a set of columns stored on remaining non-failed mass storage devices and then erasure encoding the data across another set of columns of mass storage devices of a replacement extent. For example, in a 4+2 erasure encoding scheme, data of an extent may be recreated from any four of the six columns of the extent. After being recreated, the data may be erasure encoded across another set of 4+2 columns of a replacement extent.

At 1356, indexes of a primary head node and a secondary head node that are designated for each volume that included an extent in the affected mass storage devices are updated to indicate the new locations of the data for the volumes that has been copied to other mass storage devices in the data storage unit.

At 1358, the data storage sled(s) that includes the failed mass storage device is at least partially removed from the data storage unit and the failed mass storage device is replaced. Because data previously stored on the non-failed mass storage devices of the data storage sled being removed has been copied to other mass storage devices of the data storage unit, the data remains available even while the data storage sled is at least partially removed from the data storage unit.

At 1360, the data storage sled with the replaced mass storage device is re-installed in the data storage unit. At 1362 mass storage devices of the replaced data storage sled are made available for allocation of columns on the mass storage devices of the data storage sled. In some embodiments, data storage space of the non-failed mass storage devices of the data storage sled may be released and made available to store data for newly allocated extents. In some embodiments, the non-failed mass storage devices may still store volume data that has been copied to other mass storage devices in the data storage unit. In some embodiments, the indexes of the respective head nodes may be updated to indicate volume data that is still stored on the non-failed mass storage devices.

In some embodiments, a data storage system may include multiple data storage units. Management of the data storage system may be performed by a multi-tiered control plane. For example, in some embodiments a zonal control plane may determine which data storage units new volumes are to be allocated to and may perform migration of volumes between data storage units to balance loads. Also, in some embodiments, a local control plane of a data storage unit may determine which head nodes of the data storage unit are to be assigned to a particular volume or volume partition as a primary head node and a secondary head node. Also, a local control plane may manage allocation of extents within a data storage unit via a "sandbox" technique and may perform fail over operations in response to a failure of a head node, a mass storage device, or a data storage sled. In some embodiments, a data storage unit may operate autonomously from a zonal control plane subsequent to a volume being assigned to the data storage unit. Because data storage units may operate autonomous from a zonal control plane, a failure of a zonal control plane may not impact a data storage unit's ability to respond to read and write requests or perform fail-over operations in response to a failure of a head node or a mass storage device. Also, because a local control plane of a data storage unit only affects a single data storage unit, a failure of a local control plane may have a blast radius that is limited to a single data storage unit. Furthermore, a data storage unit may implement a local control plane on one or more head nodes of a data storage unit and implement a lease protocol to allow for fail over of the local control plane from one head node to another head node in response to a failure of a head node implementing the local control plane. In some embodiments, a local control plane may utilize a distributed value store that is distributed across the plurality of head nodes of the data storage unit. Thus, when a particular head node implementing a local control plane fails, another head node taking over implementation of the local control plane may utilize the distributed value store without values in the value store being lost due to the failure of the head node previously implementing the local control plane.

Figure 14A:
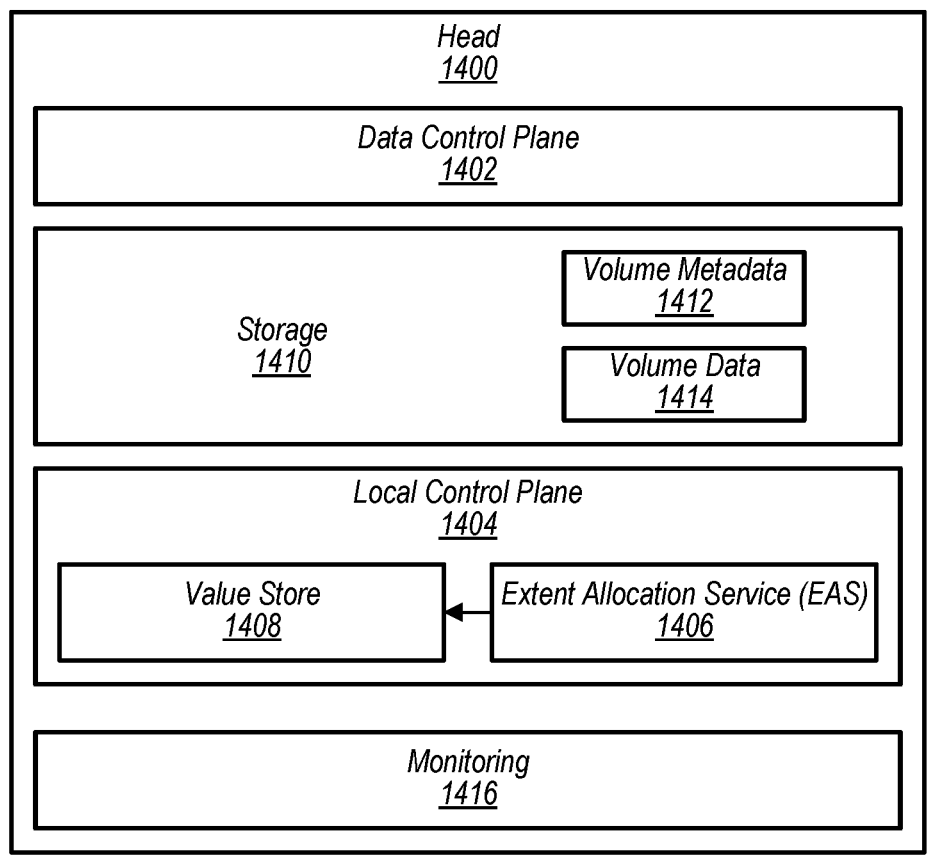
FIG. 14A is a block diagram of a head node, according to some embodiments.
Figure 14B:
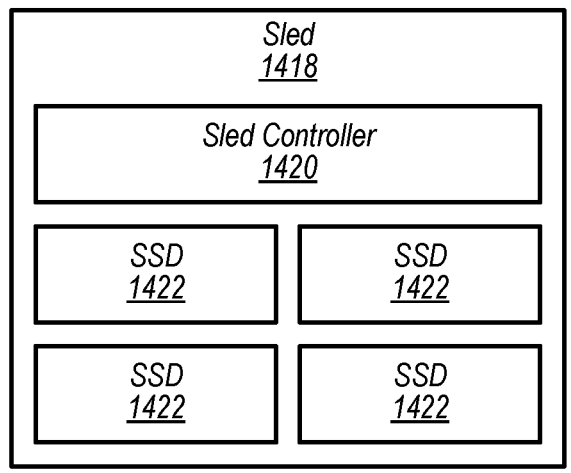
FIG. 14B is a block diagram of a data storage sled, according to some embodiments.

FIG. 14A is a block diagram of a head node, according to some embodiments. Head node 1400 may be any of the head nodes described in FIG. 1-13 or 15-22. Head node 1400 includes a data control plane 1402, storage 1410, local control plane 1404, and monitoring module 1416. A data control plane of a head node, such as data control plane 1402, may service read and write requests directed to the head node. For example, a data control plane may store one or more public IP addresses of the head node and provide the public IP addresses of the head node to client devices to allow the client devices to communicate with the head node. A storage of a head node, such as storage 1410, may include a volume metadata portion, such as volume metadata portion 1412, and a volume data portion, such as volume data portion 1414. Volume data portion 1414 and volume metadata portion 1412 may be similar to volume data portion 508 and volume metadata portion 506 as described in regard to FIGS. 5A and 4B and may store pointers for volume data indicating where the volume data is stored. In some embodiments, a data control plane, such as data control plane 1402, may consult an index, such as may be included in volume metadata portion 1412, in order to service read and write requests directed at a particular volume for which the head node is functioning as a primary head node. In some embodiments, an index, such as may be included in volume metadata portion 1412 may indicate whether a portion of volume data for a volume is stored in a log of the head node, such as volume data portion 1412, or is stored in an extent across multiple data storage sleds, such as mass storage devices 1422 of data storage sled 1418 illustrated in FIG. 14B that also includes sled controller 1420. In addition, a head node may include program instructions for implementing a local control plane that are logically isolated from the data control plane of the head node.

In some embodiments, a local control plane includes an extent allocation service, such as extent allocation service 1406, and a distributed value store, such as value store 1408. An extent allocation service may provide "sandbox" recommendations to head nodes of a data storage unit that include sets of columns from which the head nodes may select new extents. A value store may store extent allocation information and may also store head node assignment information. In some embodiments, a local control plane may provide sequence numbers to newly assigned primary head nodes. In some embodiments, a distributed value store, such as value store 1408, may be implemented over all or a portion of the head nodes of a data storage unit. This may provide fault tolerance such that if any one or more of the head nodes fail, the remaining head nodes may include data from the distributed data store, such that data from the distributed data store is not lost due to the failure of the one or more head nodes.

In some embodiments, a head node includes a monitoring module, such as monitoring module 1416. Monitoring module may collect performance and/or usage metrics for the head node. In some embodiments, a monitoring module, such as monitoring module 1416 may interact with a head node failure detection agent, such as head node failure detection agent 854 described in regard to FIG. 8. A head node, such as head node 1400 may provide performance and/or usage metrics to a local control plane, such as local control plane 1404, or may provide performance and/or usage metrics to a zonal control plane.

Figure 15A:
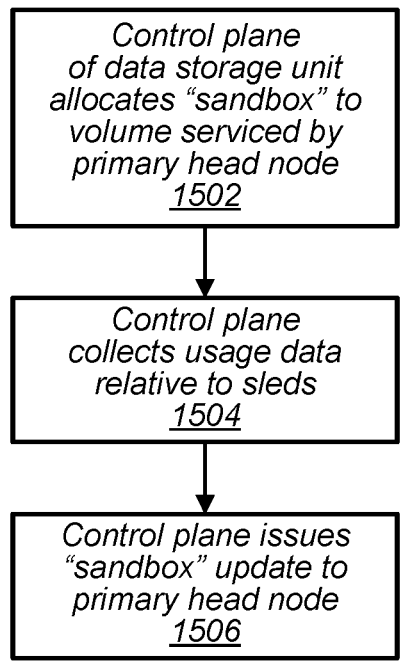
FIG. 15A is a high-level flowchart illustrating a control plane of a data storage unit providing storage recommendations to a head node of the data storage unit for locations to store data in data storage sleds of the data storage unit for a volume serviced by the head node, according to some embodiments.

FIG. 15A is a high-level flowchart illustrating a local control plane of a data storage unit providing storage recommendations to a head node of the data storage unit for locations to store data in data storage sleds of the data storage unit for a given volume, according to some embodiments.

At 1502, a local control plane of a data storage unit allocates a "sandbox" to a particular volume serviced by a primary head node functioning as primary head node for the particular volume. The sandbox may include a set of columns of mass storage devices from which the head node is recommended to select extents for the particular volume. In some embodiments, the sandbox may include extents that already include corresponding columns in multiple mass storage devices and the head node may be recommended to select extents for the particular volume from the extents included in the sandbox recommendation.

At 1504, the local control plane collects performance metrics from data storage sleds and/or head nodes in the data storage unit.

At 1506, the local control plane issues "sandbox" updates to the primary head node functioning as a primary head node for the particular volume. The sandbox updates may be based on the collected performance metrics collected at 1504. A local control plane may allocate sandbox recommendations and update sandbox recommendations to avoid heat collisions wherein multiple head nodes are attempting to access the same data storage sleds at the same time. In some embodiments, a sandbox recommendation may be a loose constraint and a head node functioning as a primary head node may select columns or extents that are not included in a sandbox recommendation. It should also be noted that sandbox recommendation and performance and/or usage metrics collection may be performed outside of the I/O path. Thus, if there is a failure or corruption of the local control plane, reads and writes may continue to be processed by non-affected head nodes of a data storage unit. Also, a sandbox allocated to a particular volume may remain with the particular volume during a failover of head nodes. For example, if a primary head node for a particular volume fails, the sandbox allocated for the particular volume may move with the particular volume that will now be serviced by a former secondary head node. Subsequent to a head node failover, sandbox updates, such as the sandbox updates described at 1506, may be issued from the local control plane to the new primary head node for the volume.

Figure 15B:
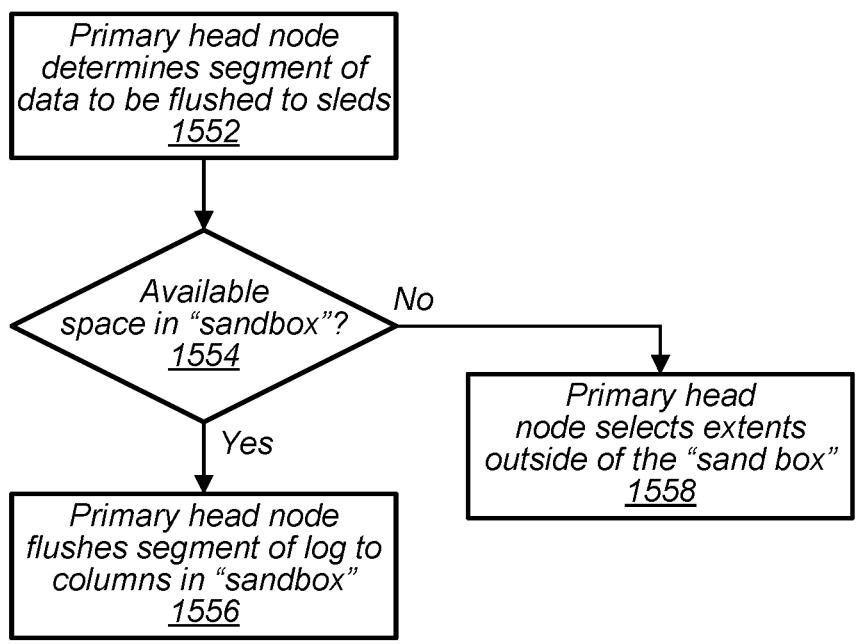
FIG. 15B is a high-level flowchart illustrating a head node of a data storage unit storing data in data storage sleds of the data storage unit, according to some embodiments.

FIG. 15B is a high-level flowchart illustrating a head node of a data storage unit storing data in data storage sleds of the data storage unit, according to some embodiments.

At 1552, a primary head node determines a segment of data to be flushed to mass storage devices in data storage sleds of a data storage unit. For example, exceeding one or more thresholds, such as an amount of data stored in a log, an age of data stored in a log, or an infrequency at which the data is accessed in a log, may trigger a primary head node to flush data to data storage sleds.

At 1554, a primary head node may determine if there is available space in a sandbox allocated to a volume serviced by the primary head node. At 1556, in response to determining there is sufficient space in the sandbox, the primary head node flushes the data to extents that include columns in the allocated sandbox allocated for the volume. At 1558, in response to determining there is insufficient space in the sandbox or in response to determining a placement in the sandbox will violate a placement restriction, such as a durability level, the primary head node selects extents outside of the sand box.

Figure 16:
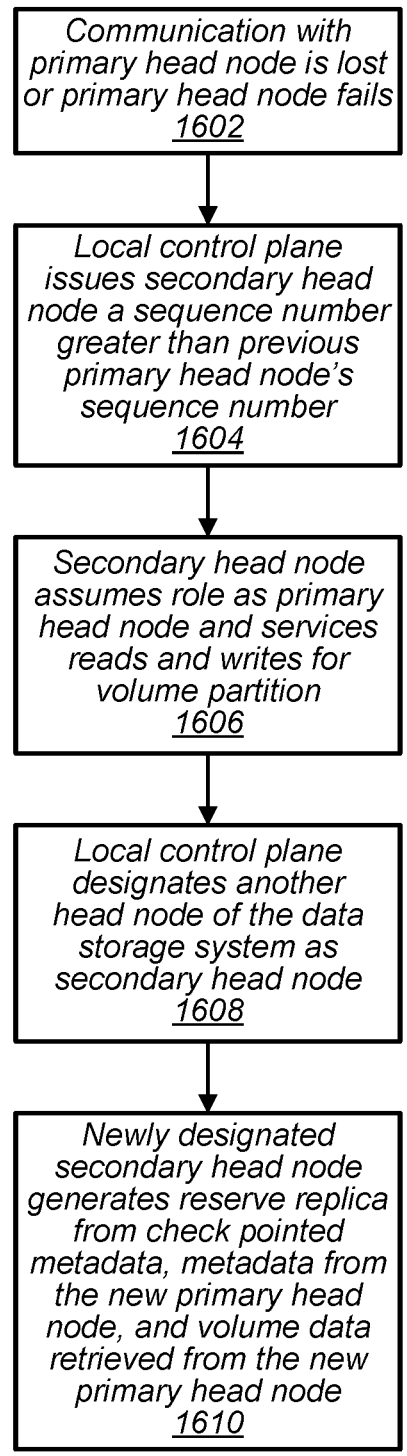
FIG. 16 is a high-level flowchart illustrating head nodes of a data storage unit performing a fail over operation in response to a failure of or loss of communication with one of the head nodes of the data storage unit, according to some embodiments.

FIG. 16 is a high-level flowchart illustrating head nodes of a data storage unit performing a fail over operation in response to a failure of or loss of communication with one of the head nodes of the data storage unit, according to some embodiments.

At 1602 communication with a primary head node is lost or the primary head node fails. In some embodiments, a client device may lose contact with a primary head node and the client device may contact the secondary head node. This may trigger the secondary head node to attempt to take over as primary head node.

At 1604, in response to the secondary head node attempting to take over as primary head node, the local control plane issues a new sequence number to the secondary head node. The new sequence number may be greater than a sequence number previously issued to the previous primary head node. The new sequence number may be used by the secondary head node to gain write access to extents that were previously reserved for write access only by the previous primary head node.

At 1606, the secondary head node assumes the role of primary head node and begins to service writes directed to the volume. In some embodiments, the secondary head node may assume the role of primary head node by presenting the new sequence number received from the local control plane to sled controllers of the data storage system and receiving, from the sled controllers, credentials for writing to columns that store data of the volume.

At 1608, the local control plane designates another head node of the data storage unit to function as a secondary head node for the volume or volume partition. Note that the previous secondary head node has assumed the role of primary head node, such that the volume is without a secondary head node causing the local control plane to designate a new secondary head node.

At 1610, the new primary head node (previous secondary head node) replicates log and index data for the volume to the newly designated secondary head node. In some embodiments, replicating log and index data may include replicating index data for the volume including pointers for volume data stored in data storage sleds of a data storage unit and volume data stored in the log of the new primary head node (previous secondary head node) that has not yet been flushed to the data storage sleds.

Figure 17:
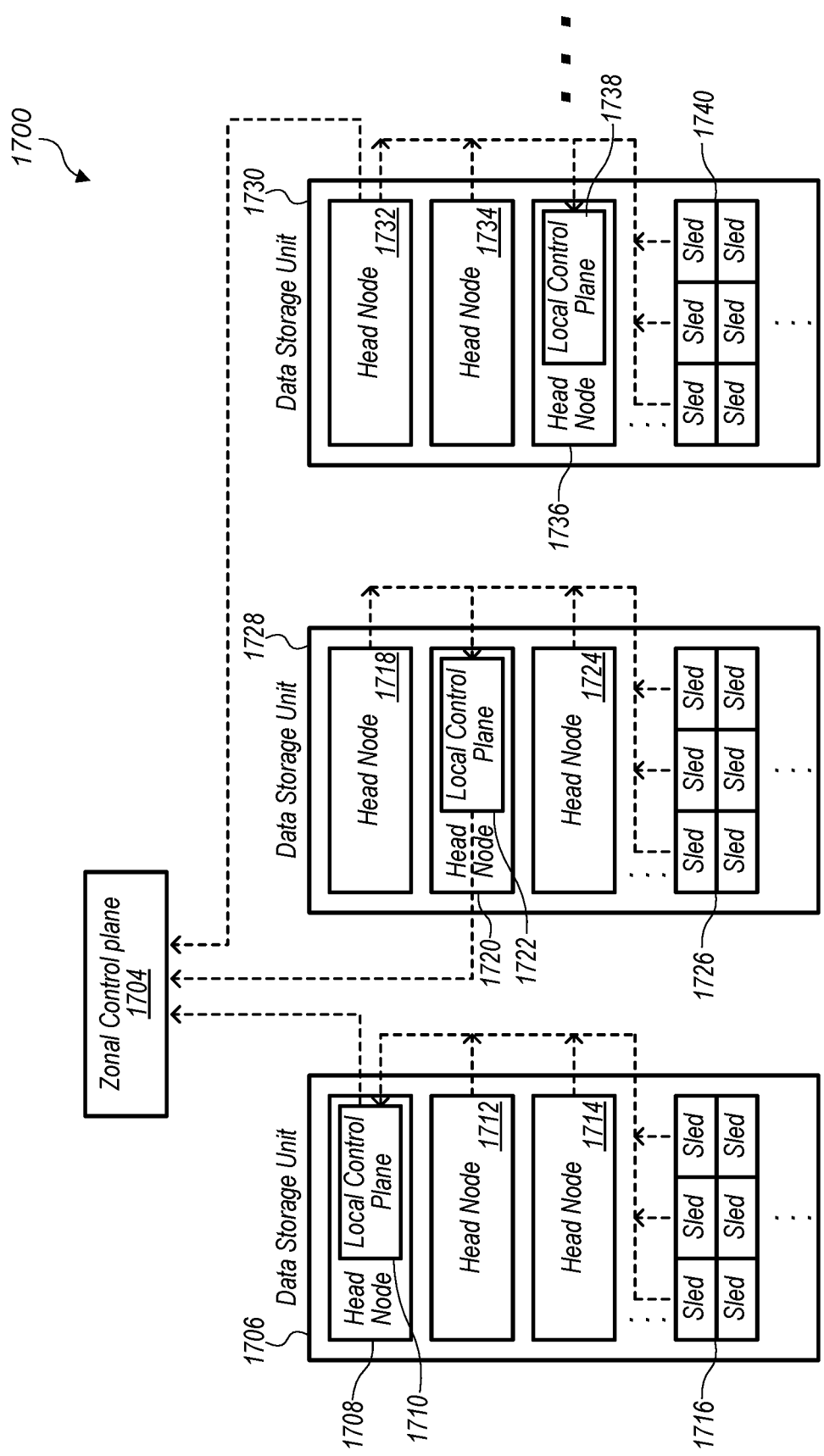
FIG. 17 is a block diagram illustrating performance and/or usage metrics being collected and accumulated in a data storage unit, according to some embodiments.

FIG. 17 is a block diagram illustrating performance and/or usage metrics being collected and accumulated in a data storage unit, according to some embodiments.

Data storage system 1700 includes zonal control plane 1704 and data storage units 1706, 1728, and 1730. In some embodiments, data storage sleds and head nodes of a data storage unit may report performance and usage metrics to a local control plane for the data storage unit. For example, head nodes 1708, 1712, and 1714 of data storage unit 1706 report performance and usage metrics to local control plane 1710 of data storage unit 1706. Also, a sled controller of each of data storage sleds 1716 may report performance and usage metrics to local control plane 1710. In a similar manner, data storage sleds 1726 and head nodes 1718, 1720, and 1724 of data storage unit 1728 may report performance and usage metrics to local control plane 1722 of data storage unit 1728. Likewise, data storage sleds 1740 and head nodes 1732, 1734, and 1736 of data storage unit 1730 may report performance and usage metrics to local control plane 1738. In some embodiments, each local control plane of a data storage unit may in turn report accumulated performance and usage metrics to a zonal control plane for the data storage system. For example, local control planes 1710, 1722, and 1738 report performance and usage metrics to zonal control plane 1704. In some embodiments local control planes may use performance and usage metrics to balance loads between head nodes and to update sandbox recommendations that indicate recommended data storage sleds from which head nodes should select extents for a given volume. Also, a zonal control plane may use cumulative performance and usage metrics to balance volume assignments and/or move volumes between data storage units. In some embodiments, performance and usage metrics may be used by a local control plane to balance loads within a given data storage unit and accumulated performance and usage metrics may be used by a zonal control plane to balance loads between data storage units.

Input/Output Fencing of Mass Storage Devices from Unauthorized Head Nodes

In some embodiments, a sled controller of a data storage sled may implement a fencing protocol that prevents unauthorized head nodes from writing data to columns of mass storage devices located in a data storage sled along with the sled controller. In some embodiments, a sled controller may issue credentials or tokens to head nodes for accessing columns allocated to a particular volume serviced by the respective head nodes. The sled controller may only issue a new token to a head node if a column associated with the credential or token is not currently reserved or if a head node seeking to access the column presents a sequence number greater than a sequence number stored for the column that indicates a sequence number of a previous head node that requested to access the column. For example, a newly designated primary head node for a given volume may receive from a local or zonal control plane a sequence number for the given volume that is greater than a previously issued sequence number for the given volume. The newly designated primary head node may then present the new sequence number to sled controllers of data storage sleds that include columns allocated for the volume. The sequence number of the newly designated primary head node may be greater than a sequence number stored in the columns that corresponded to a sequence number of a previous primary head node that accessed the columns. Upon determining that the newly designated primary head node has presented a sequence number greater than a stored sequence number, the sled controllers may issue a new token to the newly designated primary head node for accessing the columns.

Figure 18:
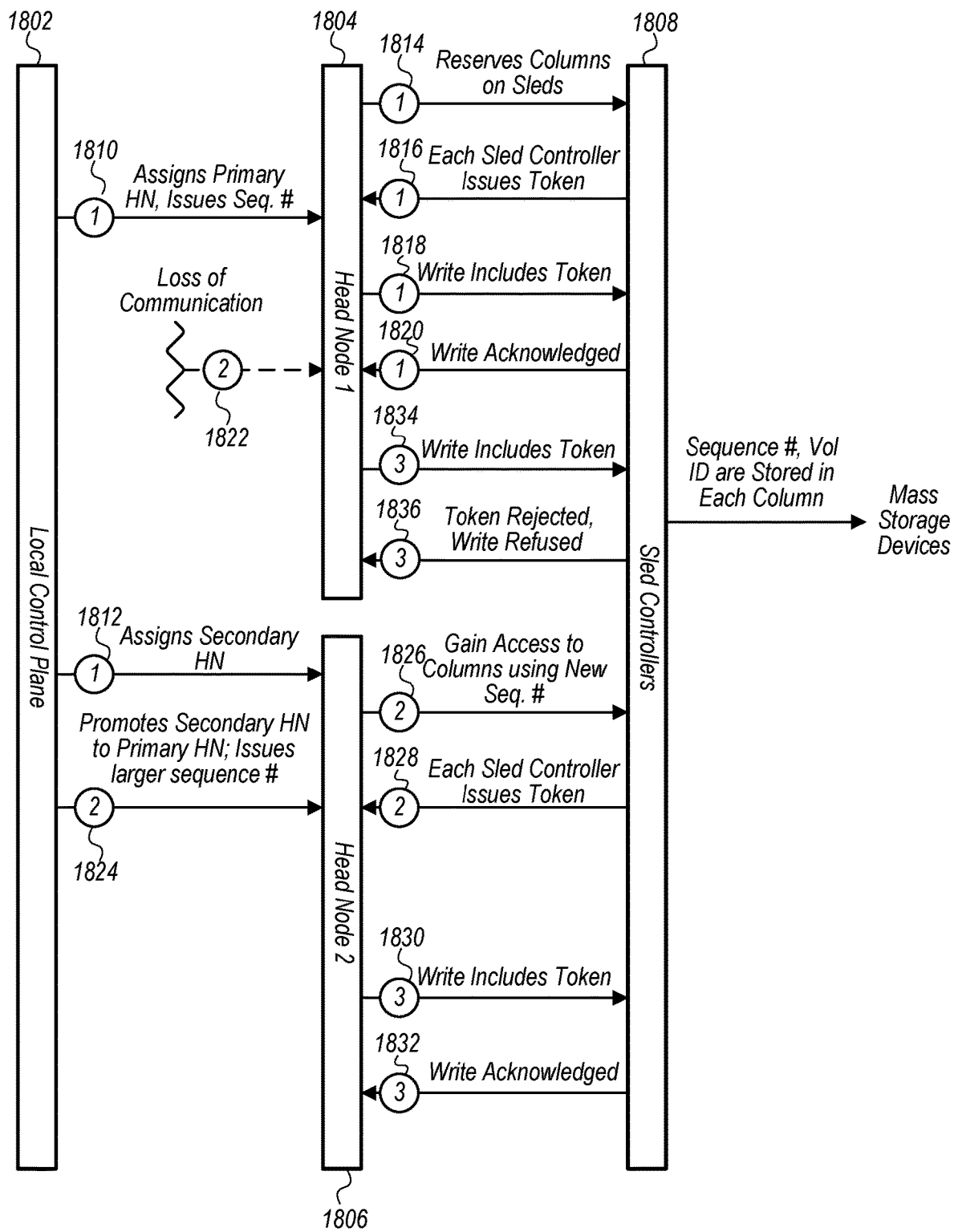
FIG. 18 illustrates interactions between a control plane, head nodes, and data storage sleds of a data storage unit in relation to writing data to mass storage devices of a data storage sled of a data storage unit, according to some embodiments.

For example, FIG. 18 illustrates interactions between a local control plane, head nodes, and data storage sleds of a data storage unit in relation to writing data to mass storage devices of a data storage sled of the data storage unit, according to some embodiments. Various interactions are illustrated between local control plane 1802 of data storage unit, head nodes 1804 and 1806 of the data storage unit and sled controllers 1808 of the data storage unit. Any of the data storage units described herein may include a local control plane, head nodes and sled controllers of data storage sleds that function as described in FIG. 18.

Phases 1, 2, and 3 are illustrated to show interactions that take place at different phases of operation of a data storage system. For example, phase 1 may be a normal phase in which a head node is assuming the role of primary head node for a volume or volume partition and functioning as the primary head node for the volume or volume partition. Phase 2 may represent a failover phase in which a secondary head node is assuming the role of primary head node for the volume, and phase 3 may represent a new normal phase wherein a newly designated primary head node is functioning as a primary head node for the volume.

At phase 1, local control plane 1802 assigns (1810) head node 1804 to be a primary head node for a volume and assigns (1812) head node 1806 to be a secondary head node for the volume. Assignment 1810 may include a new sequence number that is a monotonically increasing number that is greater than all sequence numbers previously issued by the local control plane 1802. At phase 1, in order to reserve columns of mass storage devices in different ones of multiple data storage sleds of a data storage unit, head node 1804 presents (1814) the new sequence number to sled controllers 1808 and reserves (1814) columns on mass storage devices located in data storage sleds that include the sled controllers 1808. At 1816, the sled controllers issue credentials or tokens to head node 1804 indicating that the columns are reserved for the volume and that head node 1804 is functioning as primary head node for the volume. At 1818, head node 1804 then issues a write request to sled controllers 1808 and includes along with the write requests the tokens or credentials issued by the sled controllers. The sled controllers verify that the credentials or tokens included with the write request are valid, perform the requested write, and at 1820 issue a write acknowledgement to head node 1804. Also the sled controllers store the sequence number and volume ID or volume partition ID in each column along with the data included with the write request.

During phase 2 or the fail over phase, communication is lost with head node 1804 at 1822. In some embodiments, loss of communication with a primary head node may be triggered by a client device failing to be able to reach the primary head node and instead contacting the secondary head node. In such embodiments, the secondary head node may attempt to take over as primary head node (not illustrated in FIG. 18). In some embodiments, a local control plane may determine that a primary head node has been lost. In response to determining that a primary head node has failed or there is a loss of communication with a primary head node, at 1824, local control plane 1802 promotes head node 1806 to primary head node for the volume and issues a new sequence number to head node 1806. Head node 1806 then, at 1826, presents the new sequence number issued to head node 1806 to sled controllers 1808 and requests access to the columns that store data for the volume for which head node 1806 is now the primary head node. The new sequence number issued to head node 1806 is greater than the sequence number issued to head node 1804 at 1810. At 1828, the sled controllers issue a new token or credential to head node 1806 that supersedes the token or credential issued to head node 1804 at 1816.

During phase 3, head node 1806 functions as a primary head node for the volume. At 1830 head node 1806 includes with subsequent write requests the tokens issued from the sled controllers at 1828. At 1832 sled controllers acknowledge subsequent writes from head node 1806. Also, at 1834 head node 1804 that has lost communication with control plane 1802 and/or head node 1806 attempts to perform a write to columns assigned to the volume. However, subsequent to the failover, head node 1804 is no longer the primary head node for the volume and head node 1806 is functioning as primary head node for the volume. Thus, head node 1806 has exclusive access to columns of mass storage devices of extents allocated to the volume. Thus, at 1834 when head node 1804 attempts to access the columns sled controllers 1808 decline (1836) to perform the write. In addition, at 1836 the head node 1804 may read the volume ID and new sequence number stored in the columns assigned to the volume. The columns may store the new sequence number issued to head node 1806 during the failover. Upon determining that a new sequence number has been stored that supersedes the sequence number last issued to head node 1804, head node 1804 may determine that it is no longer primary head node for the volume and may assume a role of secondary head node for the volume.

Note that each column stores a volume or volume partition ID for a volume for which the column is allocated along with a most recent sequence number. The volume ID and sequence number may be saved in persistent memory of the column. Also, a sled controller may store volume ID and sequence number information in a volatile memory of the sled controller. However, when a sled controller is reset, e.g. loses power, the volume and sequence number stored in the sled controller may be lost. However, volume and sequence number information stored in columns of mass storage devices may be persisted. This avoids complications that may arise if mass storage devices are moved between data storage sleds. For example, if a mass storage device is moved within a data storage sled or amongst data storage sleds, sled controller volume ID and sequence number information may become inaccurate. However, because volume ID and sequence number information is lost from a sled controller whenever power is lost to the sled controller, the sled controller may be reset when a sled is removed from a data storage unit to access mass storage devices in the data storage sled avoiding such complications. Thus, subsequent to a reboot of a sled controller, head nodes serving as primary head nodes for volumes that have columns allocated on a sled that includes the sled controller may need to reclaim the columns. For example the head nodes may present respective sequence numbers issued to the head nodes and the sled controllers may issue new credentials or tokens to the head nodes if the sequence numbers presented have not be superseded, e.g. the sequence numbers stored in the columns are not greater than the sequence numbers being presented by the head nodes.

Figure 19:
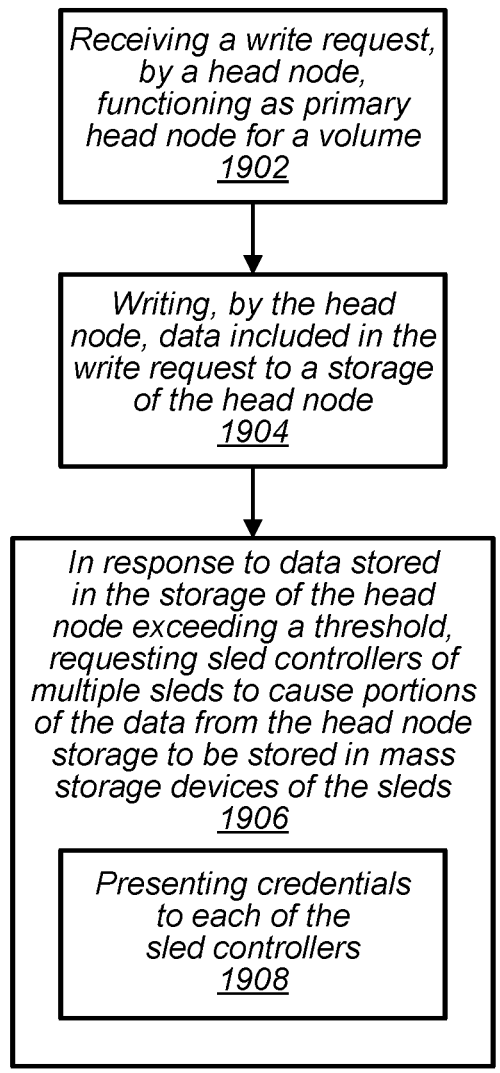
FIG. 19 is a high-level flowchart of a head node of a data storage unit flushing data stored in a storage of the head node to a data storage sled of the data storage unit, according to some embodiments.

FIG. 19 is a high-level flowchart of a head node of a data storage unit flushing data stored in a storage of the head node to a data storage sled of the data storage unit, according to some embodiments.

At 1902, a head node functioning as a primary head node for a volume receives a write request. At 1904, the head node writes data included with the write request to a storage of the head node, such as a log of the head node.

At 1906, in response to determining data stored in the storage of the head node exceeds a threshold, the head node requests sled controllers of multiple data storage sleds cause portions of the data stored in the storage of the head node be stored in multiple portions of different mass storage devices in different ones of the data storage sleds of the data storage unit. Requesting the sled controllers to store the data may further include presenting credentials (1908), such as credentials described in FIG. 18, to each of the sled controllers.

Figure 20:
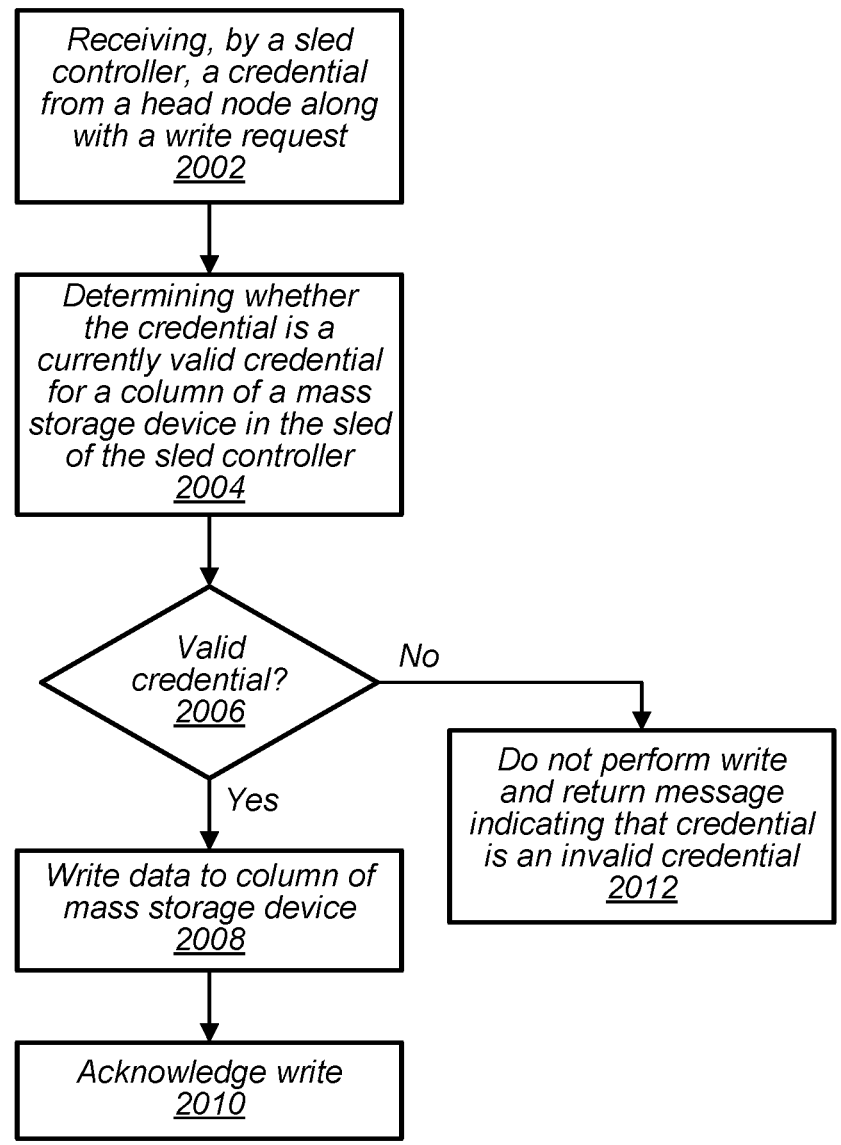
FIG. 20 is a high-level flowchart of a sled controller of a data storage sled processing a write request, according to some embodiments.

FIG. 20 is a high-level flowchart of a sled controller of a data storage sled processing a write request, according to some embodiments.

At 2002, a sled controller receives a credential from a head node along with a write request. At 2004 and 2006, the sled controller determines if the credential received at 2002 is a currently valid credential for a column of a mass storage device in a data storage sled that includes the sled controller. A sled controller may compare a sequence number and/or volume ID included in the credential with a sequence number and/or volume ID saved in the column for which access is requested. If the sequence number and/or volume ID included in the credential match the sequence number and/or volume ID stored in the column the sled controller may determine that the credential is valid. In some embodiments, a sled controller may store information that corresponds with a token or credential, such as a token number. If the information that corresponds with the token stored by the sled controller matches information included in the token, the sled controller may determine the credential or token is a valid credential. If a sequence number included in the credential or token is inferior to a sequence number stored in the column, the sled controller may determine that the credential or token is invalid. In some embodiments, a head node may not currently have credentials for a particular column and may present a sequence number that is greater than a stored sequence number stored for the column and the sled controller may issue credentials that supersede all previously issued credentials for the column, such as a new token that supersedes all tokens previously issued for the column.

At 2012, in response to determining at 2006 that the credential included with the write request is an invalid credential, the sled controller does not perform the requested write and returns a message to the head node indicating that the credential is invalid.

At 2008, in response to determining the credential is valid, the sled controller performs the requested write to the requested column of a mass storage device in the data storage sled along with the sled controller. At 2010 the sled controller acknowledges the write has been performed to the head node.

Data Storage Unit Design with Redundant Networks and Redundant Power

In some embodiments, a data storage unit may include redundant network and redundant power supplies and power distribution systems. Such redundant systems may reduce probabilities of failure thus allowing, for example, a single rack to store all parts of a volume while still meeting customer requirements for reliability and data durability. However, in some embodiments, a volume or volume partition may be stored in more than one data storage unit.

FIGS. 21A-D illustrate a data storage unit with redundant network paths within the data storage unit, according to some embodiments. Data storage unit 2150 illustrated in FIGS. 21A-D may be the same as data storage unit 200 illustrated in FIG. 2, or any other data storage unit described herein. FIGS. 21A-D further illustrate communication paths between network switches 2102 and 2104, head nodes 2106-2108, and data storage sleds 2134-2144. As can be seen, at least two redundant networks, including internal network 2152 and internal network 2154, are implemented within data storage unit 2150. Note that paths between components of data storage unit 2150 are illustrated on either side of data storage unit 2150 for clarity, but in practice paths between components of a data storage unit may be within the data storage unit over wires, cables, busways, etc. of the data storage unit.

Figure 21A:
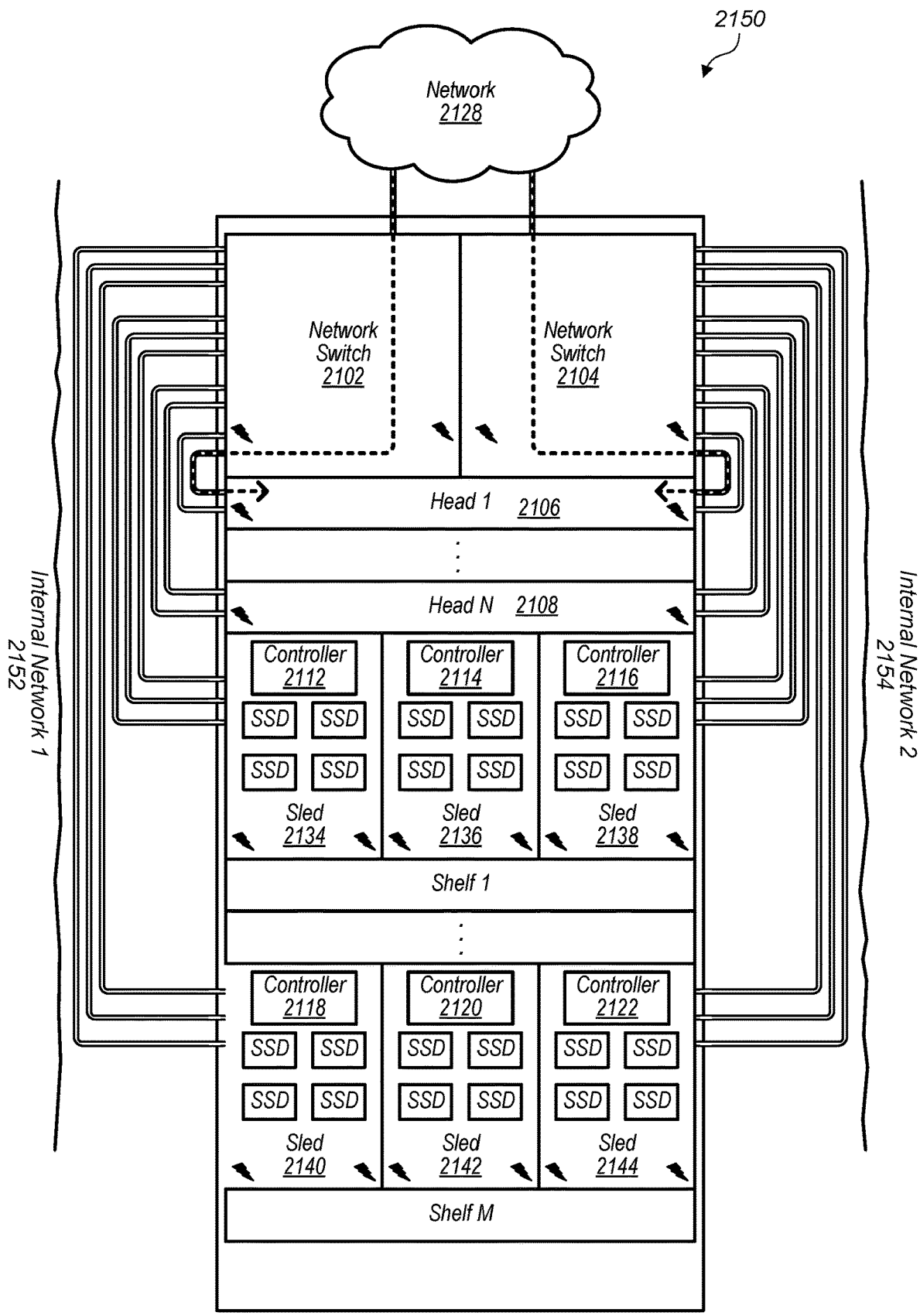
FIGS. 21A-D illustrate a data storage unit with redundant network paths within the data storage unit, according to some embodiments.

In FIG. 21A redundant communication paths are established between head node 2106 and network 2128 via network switches 2102 and 2104. In some embodiments, a head node, such as head node 2106, may be assigned redundant network addresses routable from devices external to data storage unit 2150, such as public IP addresses, and may be reachable via either one of the network address using either one of network switches 2102 and 2104.

Figure 21B:
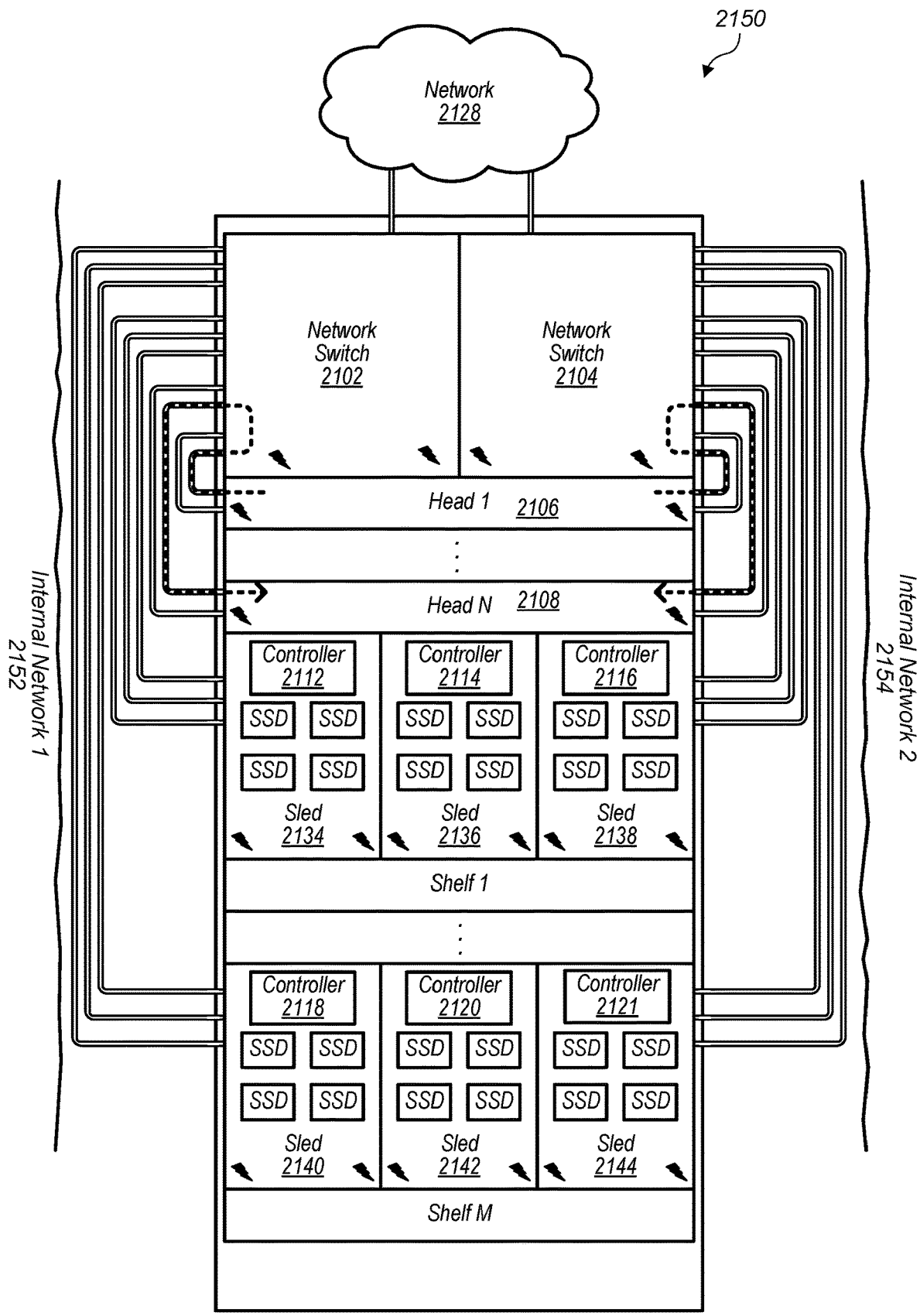

FIG. 21B illustrates redundant network paths between head nodes. For example head node 2106 may reach head node 2108 via internal network 2152 or internal network 2154, wherein internal network 2152 is via network switch 2102 and internal network 2154 is via network switch 2104. Note that there is a single network hop between head node 2106 and head node 2108 via network switch 2102 or network switch 2104. In some embodiments, a data storage unit may have a single network hop between head nodes and data storage sleds so that input/output operations do not require multiple network hops to retrieve or write data, thus improving IOPS performance and latency.

Figure 21C:
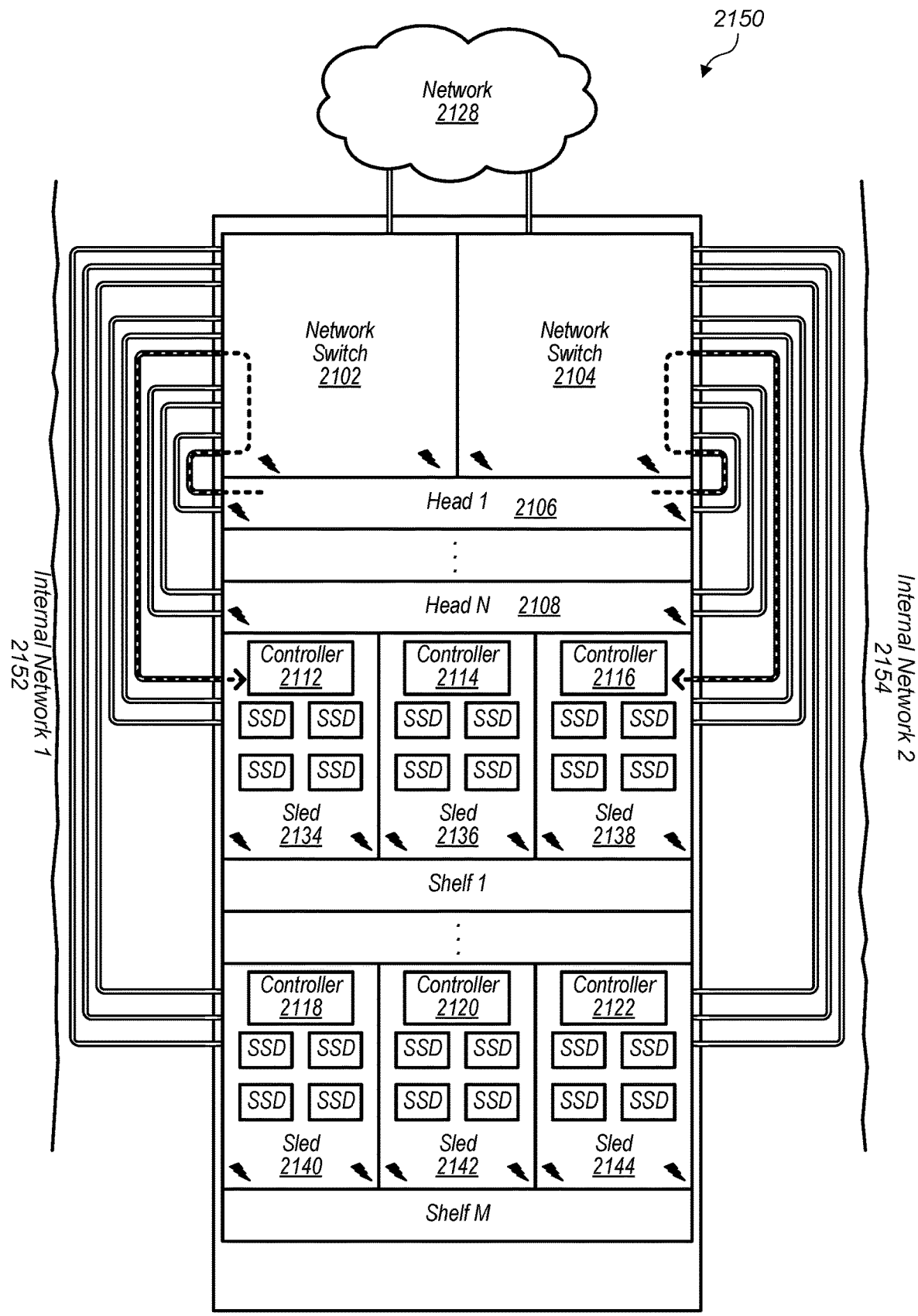
Figure 21D:
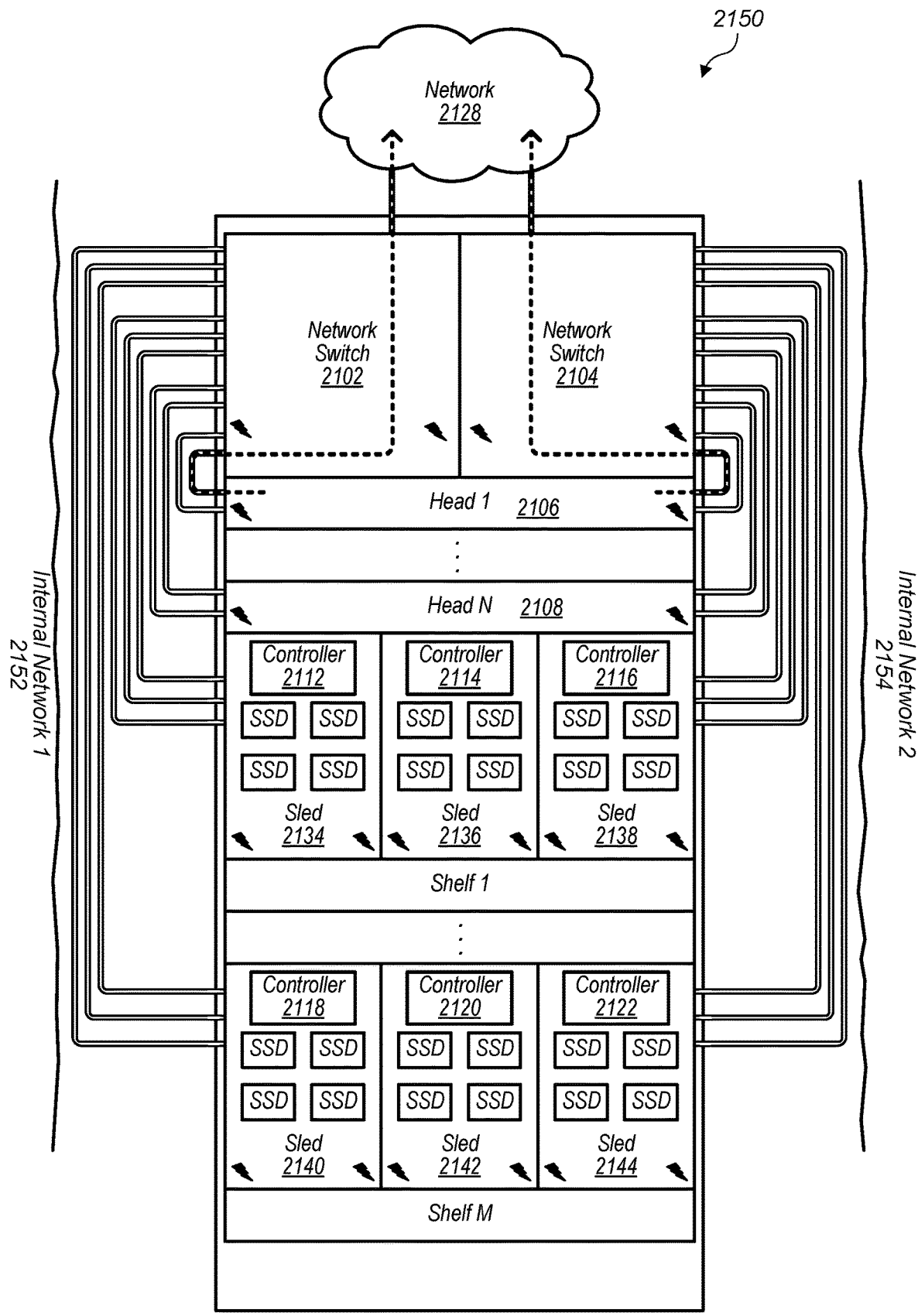

FIG. 21C illustrates redundant network paths between head nodes and data storage sleds. For example, head node 2106 may reach any of data storage sleds 2134-2144 via sled controllers 2112-2122. Each sled controller may include two network ports that each are connected to different ones of internal networks 2152 or 2154 via either one or network switches 2102 or 2104. In some embodiments, each head node may be assigned at least two private network addresses and each sled controller may be assigned at least two private network addresses. The private network addresses assigned to the head nodes and sled controllers of the data storage sleds may enable the head nodes and sled controllers to communicate with each other via either one of internal networks 2152 or 2154. FIG. 21D illustrates a head node sending a response communication to a client device via either one of internal networks 2152 or 2154.

In some embodiments, a data storage unit may be configured to accept more or less head nodes in a rack of the data storage unit or to accept more or less data storage sleds in the rack of the data storage unit. Thus, compute capacity and data storage capacity of a data storage unit may be adjusted by varying a quantity of head nodes and/or data storage sleds that are included in the data storage unit.

Figure 22A:
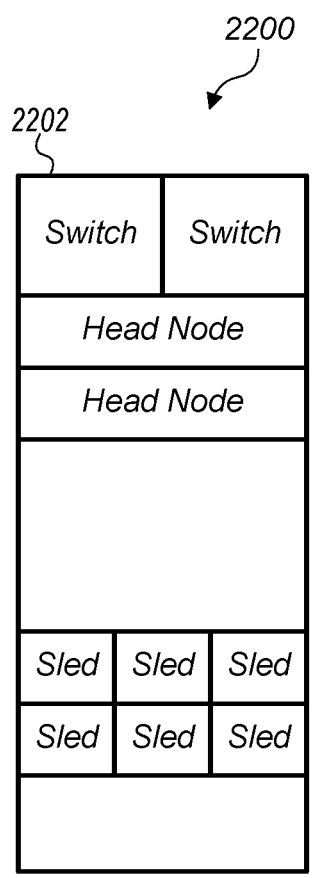
FIGS. 22A-C illustrate a data storage unit configured to allow scaling of storage capacity and processing capacity, according to some embodiments.
Figure 22B:
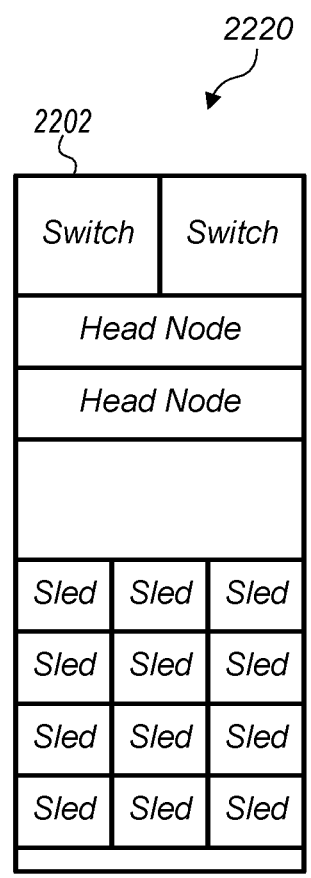
Figure 22C:
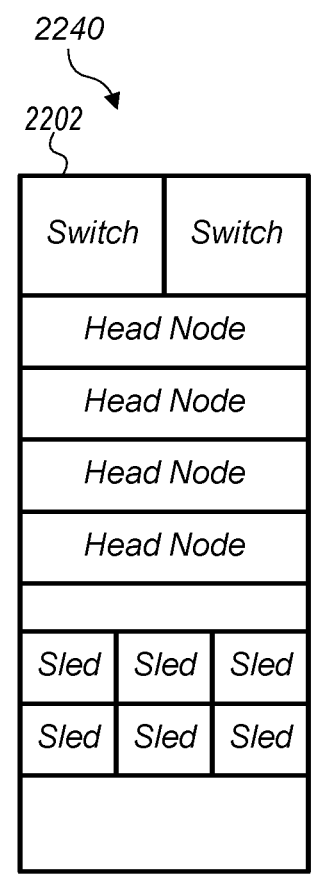

FIGS. 22A-C illustrate a data storage unit configured to allow scaling of storage capacity and processing capacity, according to some embodiments. For example, data storage unit 2202 is shown in arrangement 2200 in FIG. 22A and in arrangement 2220 in FIG. 22B. In arrangement 2220 data storage unit 2202 includes more data storage sleds than in arrangement 2200. Also, in arrangement 2240, data storage unit 2202 includes more head nodes than in arrangement 2200. In some embodiments, a ratio of head nodes to data storage sleds may be adjusted to meet customer needs.

Example Computer System

Figure 23:
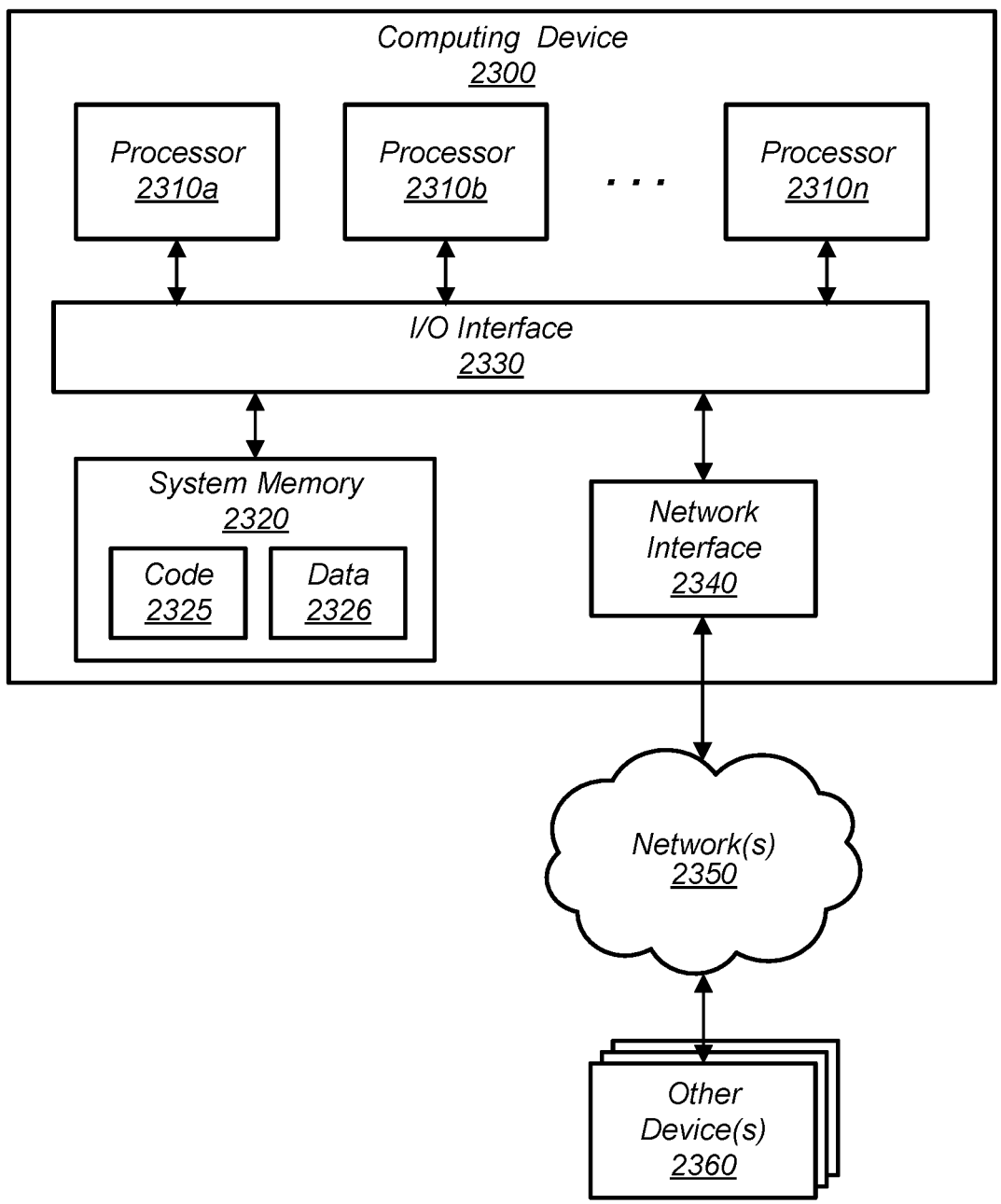
FIG. 23 is a block diagram illustrating an example computing system, according to some embodiments.

FIG. 23 is a block diagram illustrating an example computer system, according to various embodiments. For example, computer system 2300 may be configured to implement storage and/or head nodes of a data storage unit, storage and/or a sled controller of a data storage sled, other data stores, and/or a client, in different embodiments. Computer system 2300 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2300 includes one or more processors 2310 (any of which may include multiple cores, which may be single or multi-threaded) coupled to a system memory 2320 via an input/output (I/O) interface 2330. Computer system 2300 further includes a network interface 2340 coupled to I/O interface 2330. In various embodiments, computer system 2300 may be a uniprocessor system including one processor 2310, or a multiprocessor system including several processors 2310 (e.g., two, four, eight, or another suitable number). Processors 2310 may be any suitable processors capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA. The computer system 2300 also includes one or more network communication devices (e.g., network interface 2340) for communicating with other systems and/or components over a communications network (e.g. Internet, LAN, etc.).

In the illustrated embodiment, computer system 2300 also includes one or more persistent storage devices 2360 and/or one or more I/O devices 2380. In various embodiments, persistent storage devices 2360 may correspond to disk drives, tape drives, solid state memory, other mass storage devices, block-based storage devices, or any other persistent storage device. Computer system 2300 (or a distributed application or operating system operating thereon) may store instructions and/or data in persistent storage devices 2360, as desired, and may retrieve the stored instruction and/or data as needed. For example, in some embodiments, computer system 2300 may host a storage unit head node, and persistent storage 2360 may include the SSDs that include extents allocated to that head node.

Computer system 2300 includes one or more system memories 2320 that are configured to store instructions and data accessible by processor(s) 2310. In various embodiments, system memories 2320 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2320 may contain program instructions 2325 that are executable by processor(s) 2310 to implement the methods and techniques described herein. In various embodiments, program instructions 2325 may be encoded in platform native binary, any interpreted language such as Java™ byte-code, or in any other language such as C/C++, Java™, etc., or in any combination thereof. For example, in the illustrated embodiment, program instructions 2325 include program instructions executable to implement the functionality of a storage node, in different embodiments. In some embodiments, program instructions 2325 may implement multiple separate clients, nodes, and/or other components.

In some embodiments, program instructions 2325 may include instructions executable to implement an operating system (not shown), which may be any of various operating systems, such as UNIX, LINUX, Solaris™, MacOS™, Windows™, etc. Any or all of program instructions 2325 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2300 via I/O interface 2330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2300 as system memory 2320 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2340.

In some embodiments, system memory 2320 may include data store 2345, which may be configured as described herein. In general, system memory 2320 (e.g., data store 2345 within system memory 2320), persistent storage 2360, and/or remote storage 2370 may store data blocks, replicas of data blocks, metadata associated with data blocks and/or their state, configuration information, and/or any other information usable in implementing the methods and techniques described herein.

In one embodiment, I/O interface 2330 may be configured to coordinate I/O traffic between processor 2310, system memory 2320 and any peripheral devices in the system, including through network interface 2340 or other peripheral interfaces. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments, some or all of the functionality of I/O interface 2330, such as an interface to system memory 2320, may be incorporated directly into processor 2310.

Network interface 2340 may be configured to allow data to be exchanged between computer system 2300 and other devices attached to a network, such as other computer systems 2390, for example. In addition, network interface 2340 may be configured to allow communication between computer system 2300 and various I/O devices 2350 and/or remote storage 2370. Input/output devices 2350 may, in some embodiments, include one or more display terminals, keyboards, keypads, touchpads, scanning devices, voice or optical recognition devices, or any other devices suitable for entering or retrieving data by one or more computer systems 2300. Multiple input/output devices 2350 may be present in computer system 2300 or may be distributed on various nodes of a distributed system that includes computer system 2300. In some embodiments, similar input/output devices may be separate from computer system 2300 and may interact with one or more nodes of a distributed system that includes computer system 2300 through a wired or wireless connection, such as over network interface 2340. Network interface 2340 may commonly support one or more wireless networking protocols (e.g., Wi-Fi/IEEE 802.11, or another wireless networking standard). However, in various embodiments, network interface 2340 may support communication via any suitable wired or wireless general data networks, such as other types of Ethernet networks, for example. Additionally, network interface 2340 may support communication via telecommunications/telephony networks such as analog voice networks or digital fiber communications networks, via storage area networks such as Ethernet, Fibre Channel SANs, or via any other suitable type of network and/or protocol. In various embodiments, computer system 2300 may include more, fewer, or different components than those illustrated in FIG. 23 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A data storage system, comprising:
a plurality of head nodes;
a plurality of mass storage devices,
wherein for a volume partition stored in the data storage system, a first and second head node of the plurality of head nodes are configured to:
store data for a replica of the volume partition in a log-structured storage of the respective first or second head node, wherein the log-structured storage comprises a volume data portion and a metadata portion; and
wherein the first head node is configured to store, to one or more of the plurality of mass storage devices, a copy of the metadata portion of the volume partition;
a failure detection agent configured to:
detect a failed one of the plurality of head nodes based on a failure of the failed head node to respond to a ping from the failure detection agent; and
indicate to a plurality of remaining ones of the plurality of head nodes that the failed head node has failed,
wherein the plurality of remaining ones of the plurality of head nodes are each configured to:
identify volume partitions for which replicas are stored on the failed head node; and
initiate, for the identified volume partitions, the designation of a replacement replica for the identified volume partitions on respective ones of the remaining head nodes.

2. The data storage system of claim 1, wherein the plurality of remaining ones of the plurality of head nodes are further configured to:
generate a log-structured storage for the replacement replica based on one or more copies of the metadata portions stored on the one or more mass storage devices.

3. The data storage system of claim 1, wherein the first head node is configured to perform a metadata checkpoint operation,
wherein the storing of the copy of the metadata portion of the log-structured storage to the one or more mass storage devices is part of the metadata checkpoint operation performed by the first head node, and
wherein the first head node is configured to independently perform the metadata checkpoint operation, independent from performing a flush operation.

4. The data storage system of claim 1, wherein the ping comprises:
a verification that an active network connection exists to a respective head node being pinged.

5. The data storage system of claim 1, wherein the ping comprises:
a query to an operating system of a respective head node being pinged.

6. The data storage system of claim 1, wherein the ping comprises:
a set of queries directed to individual replicas stored on a respective head node being pinged.

7. The data storage system of claim 1, wherein the ping comprises:
a request for performance information directed to a respective head node being pinged,
wherein a failure to provide the requested performance information is interpreted as an indication of a failure at the respective head node being pinged.

8. The data storage system of claim 1, wherein the first head node is configured to:
perform said store a copy of the metadata portion of the log-structured storage for the primary replica based on an amount of metadata stored in the first head node, but not yet copied to the mass storage devices, exceeding a threshold amount of stored but not yet copied metadata, and
perform a flush operation based on an amount of volume data stored in the log-structured storage for the primary replica exceeding a threshold amount of stored volume data.

9. The data storage system of claim 8, wherein the first head node is further configured to perform a flush operation, wherein to perform the flush operation, the first head node is configured to:
read data stored for the volume partition from the volume data portion of the log-structured storage of the first head node;
cause the data read from the volume data portion of the log-structured storage of the first head node to be written to a set of the mass storage devices; and
update the metadata portion of the log-structured storage of the first head node to indicate one or more locations at which the data read from the volume data portion is stored on the set of mass storage devices.

10. The data storage system of claim 9, wherein the first head node is configured to perform said storing the copy of the metadata portion, for the replica of the volume partition, to the mass storage devices independently of performing the flush operation for the replica of the volume partition.

11. A method, comprising:
storing data for respective replicas of respective volume partitions in log-structured storages of respective head nodes of a data storage system, wherein the log-structured storages of the head nodes comprise a volume data portion and a metadata portion;
storing, to one or more mass storage devices of the data storage system, respective copies of the metadata portions of the volume partitions;
detecting a failed one of the plurality of head nodes based on a failure of the failed head node to respond to a ping; and
initiating, for one or more identified volume partitions having a replica stored on the failed head node, one or more replacement replicas for the one or more identified volume partitions,
wherein the one or more replacement replicas are implemented on one or more respective remaining head nodes of the data storage system that were not detected to be failed, and
wherein volume metadata for the one or more replacement replicas is re-mirrored from one or more of the respective copies of the metadata portions stored on the one or more mass storage devices of the data storage system.

12. The method of claim 11, further comprising:
generating a log-structured storage for the one or more replacement replicas based on the one or more copies of the metadata portions stored on the one or more mass storage devices of the data storage system.

13. The method of claim 11, wherein the ping comprises:
a verification that an active network connection exists to a respective head node being pinged.

14. The method of claim 11, wherein the ping comprises:
a query to an operating system of a respective head node being pinged.

15. The method of claim 11, wherein the ping comprises:
a set of queries directed to individual replicas stored on a respective head node being pinged.

16. The method of claim 11, wherein the ping comprises:
a request for performance information directed to a respective head node being pinged,
wherein a failure to provide the requested performance information is interpreted as an indication of a failure at the respective head node being pinged.

17. A non-transitory, computer-readable medium storing program instructions that, when executed on or across one or more processors, cause the one or more processors to:
detect a failed one of a plurality of head nodes of a data storage system based on a failure of the failed head node to respond to a ping; and
initiate, for one or more identified volume partitions having a replica stored on the failed head node, generation of one or more replacement replicas for the one or more identified volume partitions,
wherein the one or more replacement replicas are implemented on one or more respective remaining head nodes of the data storage system that were not detected to be failed, and
wherein volume metadata for the replacement replicas is re-mirrored from one or more of respective copies of metadata portions stored on one or more mass storage devices of the data storage system.

18. The non-transitory computer-readable media of claim 17, wherein the program instructions, when executed on or across the one or more processors, further cause the one or more processors to:
issue respective pings to the plurality of head nodes of the data storage systems, wherein the respective pings comprise:
a verification that an active network connection exists to a respective head node being pinged.

19. The non-transitory computer-readable media of claim 17, wherein the program instructions, when executed on or across the one or more processors, further cause the one or more processors to:
issue respective pings to the plurality of head nodes of the data storage systems, wherein the respective pings comprise:
a query to an operating system of a respective head node being pinged.

20. The non-transitory computer-readable media of claim 17, wherein the program instructions, when executed on or across the one or more processors, further cause the one or more processors to:
issue respective pings to the plurality of head nodes of the data storage systems, wherein the respective pings comprise:
a set of queries directed to individual replicas stored on a respective head node being pinged.

* * * * *